United States Patent
Ogata et al.

(10) Patent No.: US 7,577,076 B2
(45) Date of Patent: Aug. 18, 2009

(54) TILT SENSOR USING DIFFRACTION GRATING

(75) Inventors: Tetsuya Ogata, Tokyo (JP); Shigeru Oohchida, Tokyo (JP); Junichi Kitabayashi, Kanagawa (JP); Suguru Douwaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 676 days.

(21) Appl. No.: 10/798,362

(22) Filed: Mar. 12, 2004

(65) Prior Publication Data

US 2004/0213109 A1 Oct. 28, 2004

(30) Foreign Application Priority Data

| Mar. 14, 2003 | (JP) | 2003-070509 |
| Aug. 12, 2003 | (JP) | 2003-292010 |
| Sep. 30, 2003 | (JP) | 2003-340394 |

(51) Int. Cl.
G11B 7/135 (2006.01)

(52) U.S. Cl. ............... 369/112.03; 369/53.19

(58) Field of Classification Search ....... None
See application file for complete search history.

(56) References Cited

U.S. PATENT DOCUMENTS

| 5,015,835 A | | 5/1991 | Ohuchida et al. |
| 5,065,380 A | * | 11/1991 | Yokota ................ 369/44.12 |
| 5,101,389 A | | 3/1992 | Ohuchida et al. |
| 5,107,359 A | | 4/1992 | Ohuchida |
| 5,144,684 A | | 9/1992 | Inada et al. |
| 5,231,620 A | | 7/1993 | Ohuchida |
| 5,243,583 A | | 9/1993 | Ohuchida et al. |
| 5,257,131 A | * | 10/1993 | Yoshida et al. ............... 359/485 |
| 5,278,817 A | | 1/1994 | Maeda et al. |
| 5,281,802 A | | 1/1994 | Kitabayashi |
| 5,325,348 A | | 6/1994 | Maeda et al. |
| 5,428,588 A | | 6/1995 | Ohuchida |
| 5,487,058 A | | 1/1996 | Kitabayashi |
| 5,684,779 A | | 11/1997 | Ohuchida et al. |
| 5,956,302 A | | 9/1999 | Maeda et al. |
| 6,184,984 B1 | | 2/2001 | Lee et al. |
| 6,584,060 B1 | | 6/2003 | Oohchida |

(Continued)

FOREIGN PATENT DOCUMENTS

JP 57179954 A 11/1982

(Continued)

OTHER PUBLICATIONS

J. Koyama, et al. "Light Wave Electronics", *Corona*, Jul. 15, 1993; pp. 117-132.

*Primary Examiner*—Joseph H Feild
*Assistant Examiner*—Tawfik Goma
(74) *Attorney, Agent, or Firm*—Dickstein Shapiro LLP

(57) ABSTRACT

A tilt sensor for detecting information related to a tilt of an object to a reference plane is disclosed. The tilt sensor includes a diffraction element disposed that diffracts an incident light at diffraction efficiency depending on the incident angle, and a photo detector that detects a diffraction light diffracted by said diffraction element and outputs an photoelectric signal. Since the diffraction efficiency of the diffraction element changes as the incident angle changes, the intensity of the diffraction light from the diffraction element changes. As a result, the photoelectric signal output from the photo detector contains the information related to the tilt of the object.

5 Claims, 60 Drawing Sheets

U.S. PATENT DOCUMENTS

| | | |
|---|---|---|
| 6,738,324 B2 * | 5/2004 | Saimi et al. .............. 369/44.37 |
| 6,876,621 B2 | 4/2005 | Ohuchida et al. |
| 2002/0018432 A1 | 2/2002 | Ohuchida |
| 2002/0018433 A1 | 2/2002 | Ohuchida |
| 2002/0041542 A1 | 4/2002 | Sano et al. |
| 2002/0093902 A1 | 7/2002 | Hirai et al. |
| 2003/0072047 A1 | 4/2003 | Funato et al. |
| 2003/0193876 A1 | 10/2003 | Oohchida et al. |
| 2003/0214898 A1 | 11/2003 | Ogata et al. |
| 2004/0013076 A1 | 1/2004 | Funato et al. |

FOREIGN PATENT DOCUMENTS

| | | |
|---|---|---|
| JP | 61-86826 | 6/1986 |
| JP | 62-22727 | 2/1987 |
| JP | 03-037837 | 2/1991 |
| JP | 02-68734 | 3/1991 |
| JP | 05006561 A | 1/1993 |
| JP | 05006562 A | 1/1993 |
| JP | 07-270723 | 10/1995 |
| JP | 08320217 A | 12/1996 |
| JP | 2002-190125 | 7/2002 |
| JP | 2002-543381 | 12/2002 |
| JP | 2003-043254 | 2/2003 |
| JP | 2003-195023 | 7/2003 |
| JP | 2003-203379 | 7/2003 |
| JP | 2003-257051 | 9/2003 |

* cited by examiner

TILT SENSOR USING DIFFRACTION GRATING

BACKGROUND OF THE INVENTION

1. Field of the Invention

The present invention generally relates to a tilt sensor, an optical pickup apparatus, and an optical disk apparatus. The present invention relates more particularly to a tilt sensor that detects the tilt of an object to a reference plane. The present invention further relates to a tilt measurement apparatus and an optical pickup that includes the tilt sensor, and to an optical disk apparatus that includes the optical pickup.

2. Description of the Related Art

Optical disk drives such as CD (compact disk) drives and DVD (digital versatile disk) drives are widely used as large capacity storage apparatuses for computers. An optical disk drive includes an optical pickup. The optical pickup records data on an optical disk by forming fine spots along spiral or concentric tracks preformed on the optical disk with a laser beam. The optical pickup reproduces the data by applying a laser beam to the optical disk and detecting the reflective light from the optical disk.

An optical pickup generally includes a light source, a photo detector, and an optical system. The optical system includes an object lens. The optical system leads a light beam emitted by the light source and forms a light spot on the recording surface of the optical disk. The optical system also leads the reflective light reflected by the recording surface of the optical disk to the photo detector. A signal detected by the photo detector includes not only the data but also information (servo information) required for controlling the optical pickup. The optical pickup is controlled in accordance with the servo information so that the optical pickup forms the light spot of a predetermined shape on a predetermined position on the optical disk.

The optical axis of the object lens is desired to be perpendicular to the recording surface of the optical disk so as to form the light spot of a predetermined size at a predetermined position on the recording surface and to detect the reproduced data and the servo information at high accuracy. However, the optical axis of the object lens may be slanted to the recording surface of the optical disk due to bend and eccentricity of the recording medium. If the optical axis of the object lens is too much slanted to the recording medium, the light spot may be degraded, and the signal including the reproduced data and the servo information may be degraded.

There is a laser auto collimator for detecting the slant of an object using a light beam. As shown in FIG. 23, the laser auto collimator generally includes a light source LD, a polarization beam splitter PBS, a $\lambda/4$ plate PX, an object lens L, and a position sensor PSD. The light source LD is a laser diode, for example. The light emitting point of the light source LD is positioned at the focal point of the object lens L. The polarization beam splitter PBS is positioned on the optical path of a light beam emitted by the light source LD, and is distant from the light source LD by a distance "b". The polarization beam splitter PBS splits a reflective light from an object M traveling through the object lens L. The $\lambda/4$ plate PX is disposed between the polarization beam splitter PBS and the object lens L. The position sensor PSD is positioned on the optical path of the light beam split by the polarization beam splitter PBS, and is distant from the polarization beam splitter PBS by a distance "b".

The light beam emitted by the light source travels to the object M through the polarization beam splitter PBS, the $\lambda/4$ plate PX, and the object lens L. If the object M is slanted to the plane perpendicular to the light axis of the object lens L by an angle $\theta$, a reflective light from the object M goes into the object lens L with a deviation of an angle of $2\theta$ from the light beam traveling to the object M. The reflective light further travels to the position sensor PSD via the $\lambda/4$ plate PX and the polarization beam splitter PBS. The angle $\theta$ is obtainable based on the following formula:

$$\theta = d/2f \qquad (1)$$

where d is the position of the reflective light detected by the position sensor PSD, and $f(=a+b)$ is the focal distance of the object lens L.

However, a laser auto collimator requires an expensive position sensor and an object lens having a long focal distance. As a result, the using of the laser auto collimator holds back the cost reduction and down sizing of optical disk apparatuses.

Various tilt sensors have been proposed that do not hold back the cost reduction and down sizing of optical disk apparatuses.

Japanese Laid-Open Patent Application No. 57-179954 (document 1) discloses one of such tilt sensors.

The document 1 discloses an optical disk apparatus (referred to as an optical disk player therein) in which a photo detector split into two portions receives a reflective light from a recording medium, and each portion of the photo detector outputs optoelectronic signal. The tilt of the recording medium is determined based on a differential signal of the two optoelectronic signals.

It is actually difficult to position the photo detector at a designed position at high precision. As a result, the photo detector may fail to determine the tilt accurately due to offset imposed in the differential signal by the error in positioning. Change over time and change in temperature may also cause offset in the differential signal.

By the way, the amount of information to be stored in an optical disk is increasing year by year. The use of short wavelength laser is studied as one of techniques for increasing the recording density of an optical disk.

However, if the wavelength of laser beam is shortened without changing the shape of optical disk, the effect of wave front aberration (especially coma aberration) caused by a deviation between the directions of an object lens axis and the directions perpendicular to the recording surface (media tilt) increases. As a result, the shape of light spot may be degraded, and a signal output by the photo detector containing reproduced information and servo information may be degraded.

In the case of 660 nm wavelength laser, only media tilt in the directions perpendicular to a tangent of a track (radial tilt) is taken into consideration. However, if the wavelength of laser beam is further shortened, media tilt in the directions of the tangent of a track (tangential tilt) needs to be taken into consideration.

To solve these problems, various sensors for independently detecting tilts of an object in two directions are proposed in the following documents: Japanese Patent Laid-Open Applications No. 5-006561, No. 5-006562, and No. 8-320217.

Tilt sensors (tilt detection apparatuses) disclosed in the above documents, however, fail to solve the following problem, that is, since the reflective light from the object is received by a photo detector including multiple photo detecting units, and the tilt of the object is determined based on the position of a light spot, if the photo detector is disposed at a deviated position, the output signal from the photo detector may contain offset, and as a result, the tilt of the object can not be determined with high precision.

SUMMARY OF THE INVENTION

Accordingly, it is a general object of the present invention to provide a novel and useful tilt sensor in which at least one of the above problems is eliminated.

More specifically, an object of the present invention is to provide a compact and low cost tilt sensor that can output an accurate signal including information related to the tilt of an object.

Another object of the present invention is to provide a compact and low cost tilt measuring apparatus that can determine the tilt of an object at high precision.

Yet another object of the present invention is to provide an optical pickup apparatus that can output an accurate signal including information required for adjusting the position of the optical pickup apparatus or an object lens provided therein.

Yet another object of the present invention is to provide an optical disk apparatus that can access a recording medium accurately and stably.

Yet another object of the present invention is to provide a tilt sensor that can output a signal containing information related to the tilt of an object in two directions with high precision.

Yet another object of the present invention is to provide an optical pickup apparatus that can output a signal containing information related to the tilt of an object in two directions with high precision.

Yet another object of the present invention is to provide an optical disk apparatus that can access an optical disk stablly with high precision.

To achieve at least one of the above objects, a tilt sensor for determining information related to a tilt of an object to a reference plane, according to an aspect of the present invention, comprising:

a diffraction element disposed at a position on an optical path of a light beam from the object, the position determined in accordance with a positional relation with the object, wherein the diffraction element diffracts diffraction light at a diffraction efficiency depending on an incident angle of the light beam; and a photo detector that receives the diffraction light diffracted by said diffraction element and outputs an photoelectric signal.

The information related to tilt may refer to not only the tilt angle, but also information that can be converted into the tilt angle and information that changes as the tilt angle changes.

The light beam from the object enters the diffraction element, and is diffracted at a diffraction efficiency depending on the incident angle. The diffraction light from the diffraction element is received by the photo detector, and a photo-electric signal depending on the amount of received diffraction light is output from the photo detector. If the object is tilted to the reference plane, since the diffraction element is disposed keeping a specific positional relation to the reference plane, the incident angle of the light beam that hits the diffraction element changes in accordance with the tilt angle of the object. Since the diffraction efficiency of the diffraction element changes as the incident angle changes, the intensity of the diffraction light from the diffraction element changes as the incident angle of the light beam. As a result, the amount of the diffraction light received by the photo detector changes. That is, the photoelectric signal output from the photo detector contains the information related to the tilt of the object. As described above, since the amount of the diffraction light received by the photo detector contains the information related to the tilt of the object, the photo detector can be disposed with a wider tolerance, which result in assembly process, adjusting process, and inspection process of the tilt sensor being made simple. That is, fabrication cost is reduced. Additionally, change over time and temperature dependency of the tilt sensor can be reduced. Accordingly, although compact and inexpensive, the tilt sensor can output a signal containing the information related to tilt with high precision.

A tilt sensor for detecting information related to a tilt of an object to a reference plane, according to another aspect of the present invention, includes:

a diffraction unit disposed at a position on an optical path of a light beam via the object, the position determined in accordance with a positional relation with the reference plane, wherein said diffraction unit diffracts the light beam in first directions at a diffraction efficiency determined by an incident angle of the light beam in the first directions, and diffracts the light beam in second directions at a diffraction efficiency determined by an incident angle of the light beam in the second directions; and a photo detection unit that receives a diffraction light from said diffraction unit, and outputs a photo-electric signal.

The light beam via the object enters the diffraction unit, is diffracted in the first directions at the diffraction efficiency determined by the incident angle of the light beam in the first directions, and is diffracted in the second directions at the diffraction efficiency determined by the incident angle of the light beam in the second directions. The photo detection unit outputs the photo-electric signal in response to reception of the light beam diffracted by the diffraction unit. Since the diffraction unit is disposed at the position determined in accordance with the positional relation with the reference plane, if the object tilts in the first directions, for example, the incident angle of the light beam to the diffraction unit in the first directions changes. The diffraction efficiency of the diffraction unit changes in accordance with the incident angle in the first directions. As a result, the light intensity of the diffraction light from the diffraction unit changes in accordance with the incident angle relative to the first directions.

If the object tilts relative to the second directions, for example, the incident angle of the light beam to the diffraction unit relative to the second directions changes. The diffraction efficiency of the diffraction unit changes in accordance with the incident angle relative to the second directions. As a result, the light intensity of the diffraction light from the diffraction unit changes in accordance with the incident angle relative to the second directions.

Accordingly, the photo-electric signal output by the photo detector contains information related to the tilt of the object relative to the first directions and information related to the tilt of the object relative to the second directions. Because the amount of the diffraction light received by the photo detector does contain the information, the tilt sensor can output a signal containing the information related to the tilt of the object relative to the two directions.

According to yet another aspect of the present invention, a tilt sensor for detecting information related to a tilt of an object to a reference plane, comprises:

a diffraction element having a diffraction grating disposed at a position on an optical path of a light beam from the object, the position determined in accordance with a positional relation with the object, wherein the diffraction grating diffracts the light beam at a diffraction efficiency depending on an incident angle of the light beam;

a photo detector that receives a $\pm 1^{st}$ order diffraction lights diffracted by said diffraction element and outputs an photo-electric signal; and a differential signal generation unit that generates a differential signal between the +1$^{st}$ order diffraction signal and −1$^{st}$ order diffraction signal, wherein the tilt sensor is set to detect incident angle within a detectible range between ±θ, θ being Bragg's angle, $$\sin\theta = \frac{\lambda}{2\Lambda}$$

where λ denotes a wavelength of the light beam, and Λ denotes a pitch of the diffraction grating.

Although the tilt sensor is compact and inexpensive, the tilt sensor can detect the information related to the tilt of the object within the detectible range of incident angle with high precision.

Other objects, features, and advantages of the present invention will become more apparent from the following detailed description when read in conjunction with the accompanying drawings.

DETAILED DESCRIPTION OF THE PREFERRED EMBODIMENTS

A detailed description of the preferred embodiments is given below with reference to the drawings.

Figure 1:
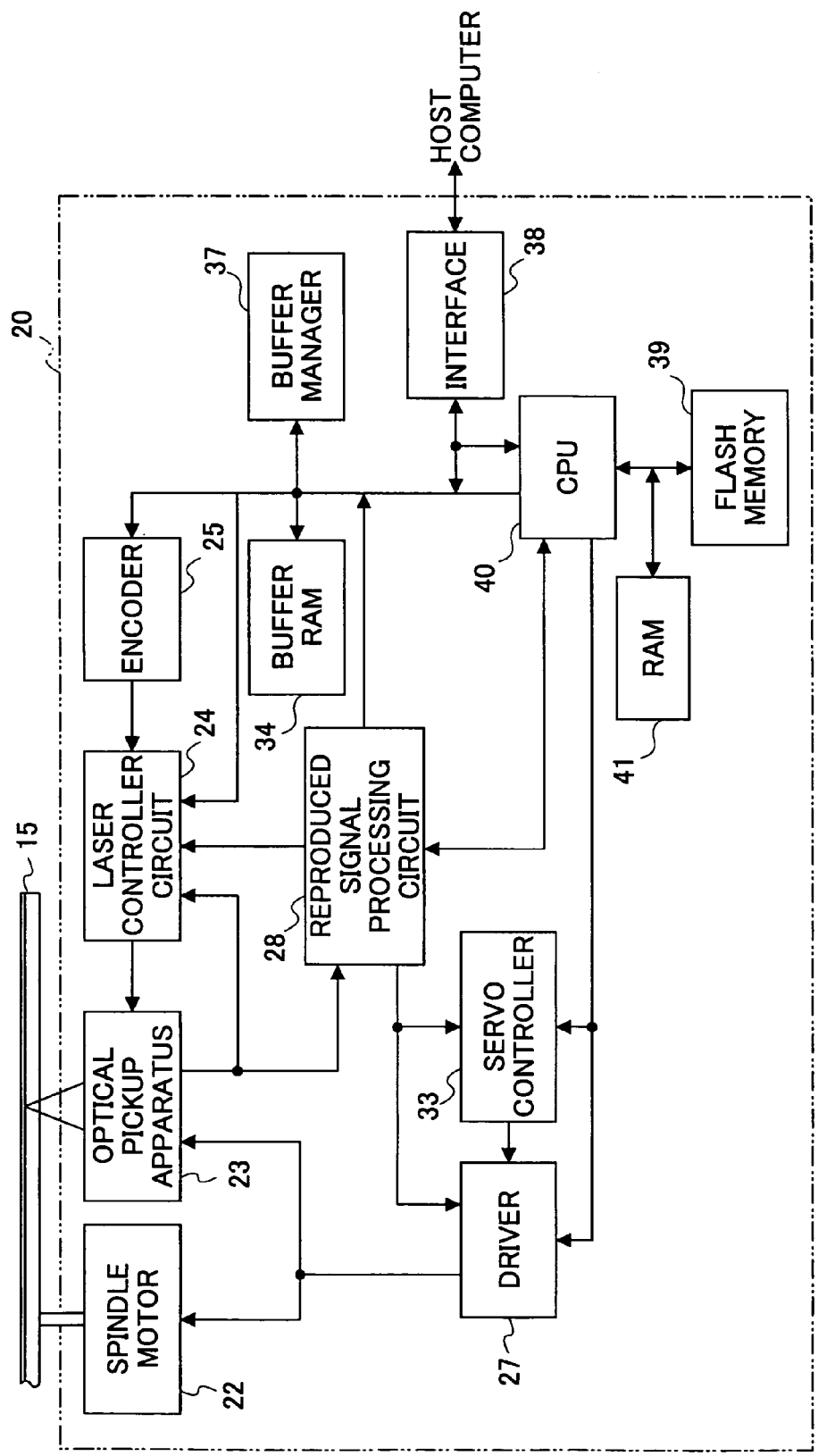
FIG. 1 is a block diagram showing the configuration of an optical disk apparatus according to an embodiment of the present invention.

FIG. 1 is a block diagram showing an optical disk apparatus 20 according to an embodiment of the present invention.

The optical disk apparatus 20 shown in FIG. 1 includes the following: a spindle motor 22, an optical pickup apparatus 23, a laser controller circuit 24, an encoder 25, a driver 27, a reproduced signal processing circuit 28, a servo controller 33, a buffer RAM 34, a buffer manager 37, an interface 38, a flash memory 39, a CPU 40, and a RAM 41. The spindle motor 22 rotates an optical disk 15 provided as a recording medium (object). Although not all flows of signals and information are shown in FIG. 1, typical flows are indicated as arrows connecting blocks. The optical disk 15 is assumed to comply with the requirements of a digital versatile disk (DVD).

Figure 2:
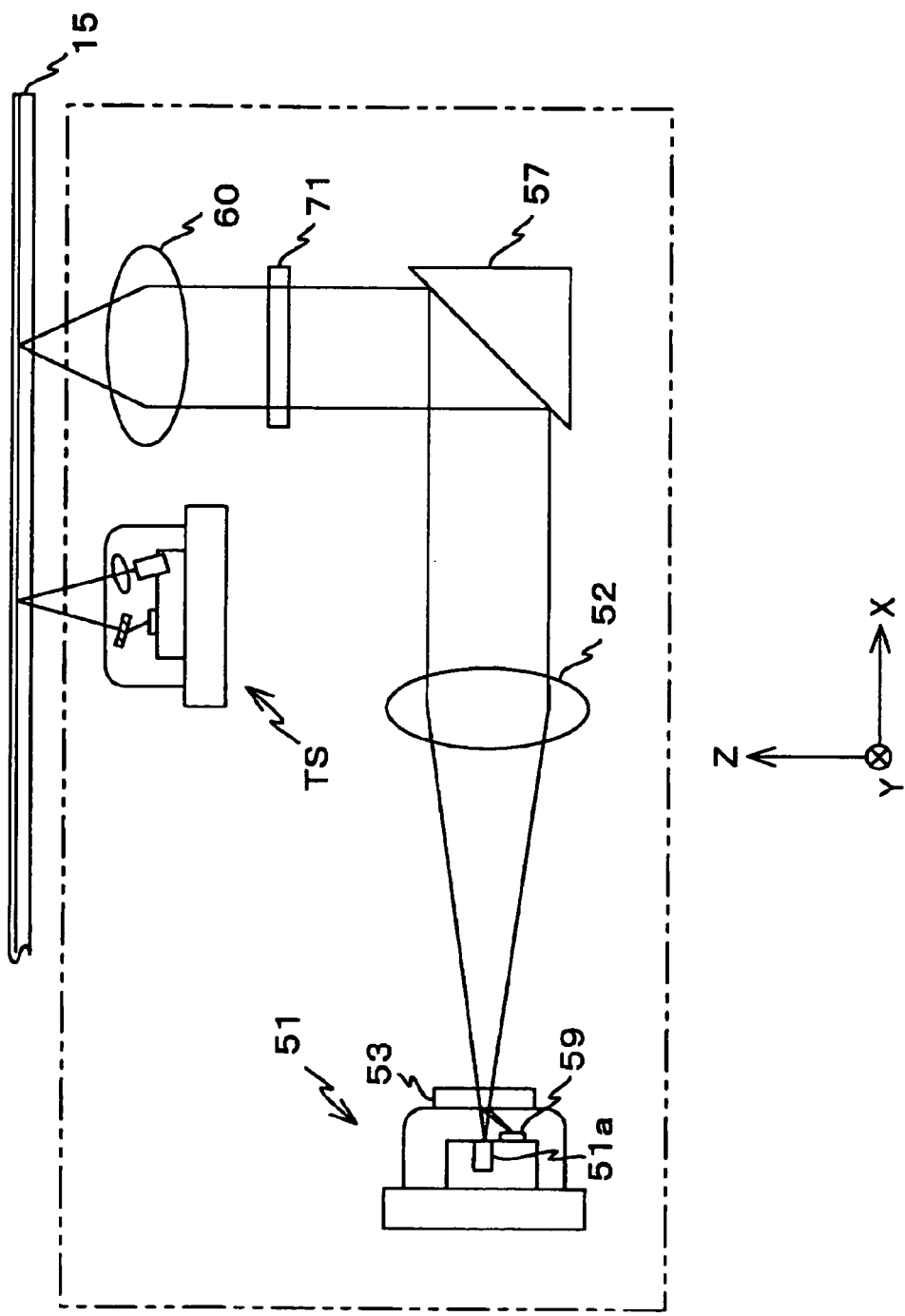
FIG. 2 is a schematic diagram showing the configuration of an optical pickup apparatus shown in FIG. 1 according to an embodiment.

The optical pickup apparatus 23 applies a laser beam to the recording surface of the optical disk 15 on which a spiral track or concentric tracks are formed, and receives a reflective light reflected by the recording surface. As shown in FIG. 2, the optical pickup apparatus 23 includes the following: a light emitting/receiving module 51, a collimation lens 52, a hologram element 53, a deflection mirror 57, an electro-optic element 71, an object lens 60, and a tilt sensor TS. Although not shown in FIG. 2, the optical pickup apparatus 23 includes a focusing actuator, a tracking actuator, and a seek motor, for example.

The light emitting/receiving module 51 includes a semiconductor laser 51a for emitting a laser beam, and a photo detector 59 for receiving the reflective light.

The semiconductor laser 51a emits a light beam (a laser beam) of which the wavelength is 660 nm. In the following description, the direction at which the light emitting/receiving module 51 emits the greatest light beam is referred to as a "+X" direction.

The photo detector 59 is disposed in the neighborhood of the semiconductor laser 51a for receiving the reflective light (reflective light beam) reflected by the recording surface of the optical disk 15. The photo detector 59 includes multiple photo detecting elements that output wobble signal information, reproduced data information, focus error information, and track error information, for example.

The hologram element 53 is built in the light emitting/receiving module 51 on the "+X" side thereof. The hologram element 53 splits the reflective light beam to the direction of the light receiving surface of the photo detector 59 from the common optical path.

The collimation lens 52 is disposed on the "+X" side of the hologram element 53, and makes the light beam traveling through the hologram element 53 substantially parallel.

The deflection mirror 57 is disposed on the "+X" side of the collimation lens 52, and deflects the substantially paralleled light beam from the collimation lens 52 to a "+Z" direction.

The electro-optic element 71 is disposed on the "+Z" side of the deflection mirror 57. The electro-optic element 71 is provided with a voltage by the driver 27, and changes the phase of the light beam based on the provided voltage.

The object lens 60 is disposed on the "+Z" side of the electro-optic element 71. The object lens 60 converges the light beam traveling through the electro-optic element 71, and forms a light spot on the recording surface of the optical disk 15.

The tilt sensor TS is disposed near the object lens 60. The tilt sensor TS outputs a signal containing information related to the tilt of the optical disk 15 to a plane (reference plane) perpendicular to the light axis of the object lens 60. The configuration of the tilt sensor TS is described below.

The function of the optical pickup apparatus 23 configured as described above is described briefly below. Light beam emitted by the light emitting/receiving module 51 enters the hologram element 53. The light beam traveling through the hologram element 53 is made parallel by the collimator lens 52, and is reflected to the "+Z" direction by the deflection mirror 57. The electro-optic element 71 imposes optical phase difference in the light beam in accordance with applied voltage. The light beam is converged by the object lens 60 on the recording surface of the optical disk 15.

The light beam is reflected by the recording surface of the optical disk 15. The reflective light beam is made substantially parallel by the object lens 60. The electro-optic element 71 further imposes optical phase difference in the reflective light beam in accordance with the applied voltage. The reflective light beam is reflected to the "−X" direction by the deflection mirror 57, and travels through the collimator lens 52 to the hologram element 53. The reflective light beam is diffracted by the hologram element 53, and hits the photo detector 59. In response to receipt of the reflective light beam, the photo detecting elements configuring the photo detector 59 output signals depending on the intensity of the reflective light beam to the reproduced signal processing circuit 28.

As described above, the tilt sensor TS outputs the signal containing information related to tilt to the reproduced signal processing circuit 28.

Figure 3:
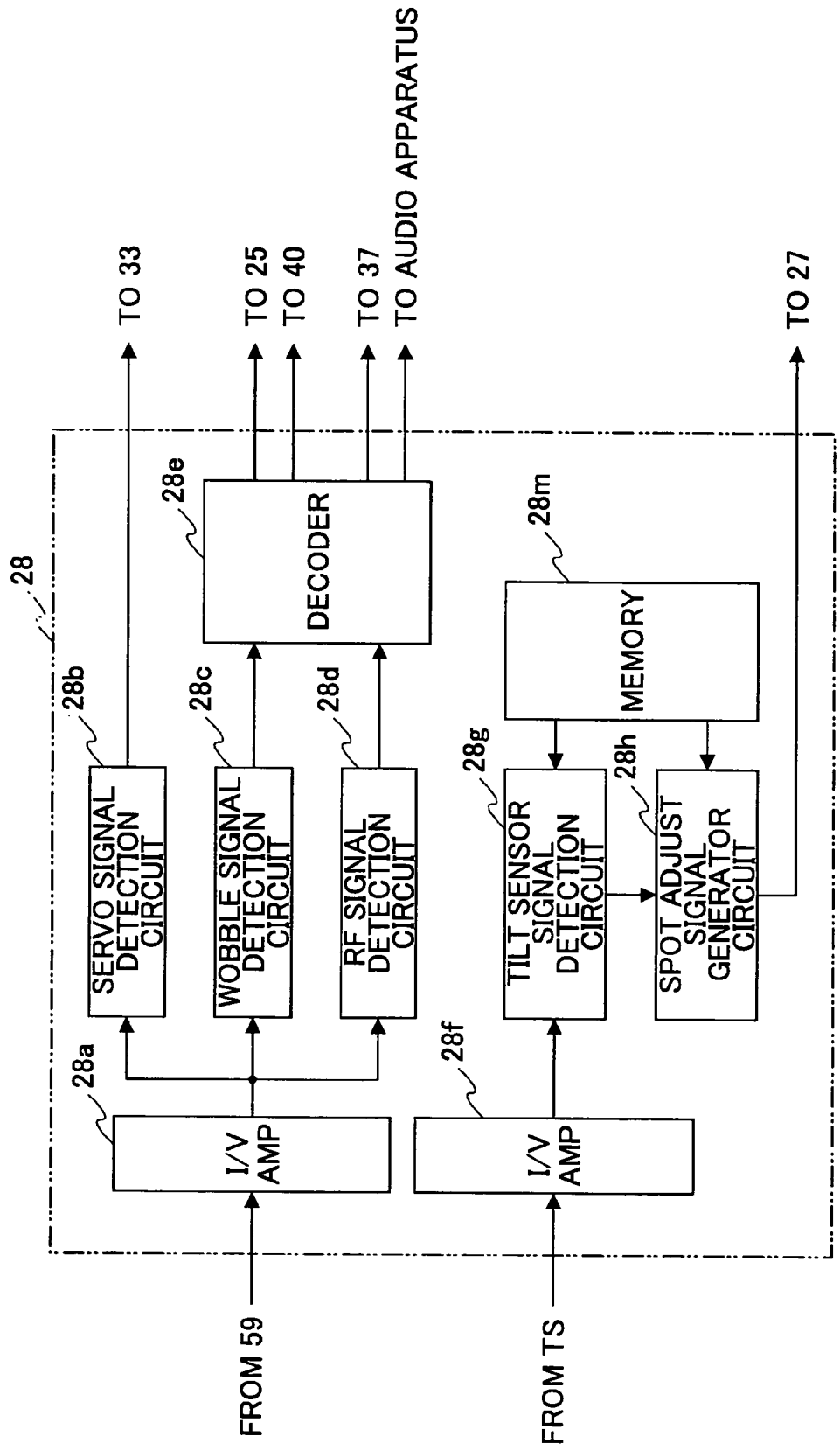
FIG. 3 is a block diagram showing the configuration of a reproduced signal processing circuit shown in FIG. 1 according to an embodiment.

As shown in FIG. 3, the reproduced signal processing circuit 28 includes the following: I/V amps 28a and 28f, a servo signal detection circuit 28b, a wobble signal detection circuit 28c, a RF signal detection circuit 28d, a decoder 28e, a tilt sensor signal detection circuit 28g, a spot adjustment signal generator circuit 28h, and a memory 28m.

The I/V amp 28a converts a current signal output by the photo detector 59 into a voltage signal, and amplifies the voltage signal at a predetermined gain. The servo signal detection circuit 28b detects servo signals (a focus error signal and a tracking error signal, for example) contained in the output signal from the I/V amp 28a. The servo signals detected by the servo signal detection circuit 28b are output to the servo controller 33. The wobble signal detection circuit 28c detects a wobble signal contained in the output signal from the I/V amp 28a. The RF signal detection circuit 28d detects a RF signal contained in the output signal from the I/V amp 28a.

The decoder 28e extracts Address In Pregroove (ADIP) information and a sync signal from the wobble signal detected by the wobble signal detection circuit 28c. The extracted ADIP information is output to the CPU 40, and the extracted sync signal is output to the encoder 25. The decoder 28e decodes the RF signal detected by the RF signal detection circuit 28d, and corrects errors contained in the decoded data (reproduced data). The decoded data are stored in the buffer RAM 34 via the buffer manager 37. If the reproduced data are music data, the reproduced data are output to an external audio apparatus, for example.

The I/V amp 28f converts a current signal output by the tilt sensor TS into a voltage signal, and amplifies the voltage signal at a predetermined gain.

The memory 28m stores various items of information such as tilt conversion information and tilt compensation information (to be described below).

The tilt sensor signal detection circuit 28g detects a tilt sensor signal corresponding to the tilt angle (tilt value) of the optical disk 15 to the reference plane based on the output signal from the I/V amp 28f and the tilt conversion information stored in the memory 28m.

The spot adjust signal generator circuit 28h generates a spot adjust signal based on the tilt sensor signal and the tilt compensation information stored in the memory 28m, and outputs the spot adjust signal to the driver 27. The spot adjust signal corresponds to the applied voltage to the electro-optic element 71. In response to receipt of the spot adjust signal, the electro-optic element 71 imposes optical phase difference in the light beam for canceling wave aberration caused by the tilt of the optical disk 15 and adjusting the shape of a spot to be formed on the recording surface of the optical disk 15.

Returning to FIG. 1, the servo controller 33 generates a focus control signal for adjusting focusing using the focus error signal provided from the reproduced signal processing circuit 28. The servo controller 33 also generates a track control signal for adjusting tracking using the track error signal provided from the reproduced signal processing circuit 28. The focus control signal and the track control signal are output to the driver 27.

The driver 27 outputs a signal for driving the focusing actuator to the optical pickup apparatus 23 based on the focus control signal, and outputs a signal for driving the tracking actuator to the optical pickup apparatus 23 based on the track control signal. As described above, the servo signal detection circuit 28b, the servo controller 33, and the driver 27 control tracking and focusing of the optical pickup apparatus 23. The driver 27 applies a voltage to the electro-optic element 71 of the optical pickup apparatus 23 using the spot adjust signal provided from the spot adjust signal generator circuit 28h. The driver further outputs a signal for driving the spindle motor 22 and a signal for driving the seek motor thereto.

The buffer RAM 34 temporarily stores data to be recorded on the optical disk 15 and data read from the optical disk 15, for example.

The buffer manager 37 controls the inputting of data into and the outputting of data from the buffer RAM 34. When the amount of data exceeds a predetermined value, the buffer manager 37 informs the CPU 40.

The encoder 25 retrieves data stored in the buffer RAM 34 via the buffer manager 37 in response to an instruction provided by the CPU 40. Then, the encoder 25 modulates the retrieved data and attaches error correction codes to the modulated data thereby to generate a write signal to be written on the optical disk 15. The encoder 25 outputs the generated write signal to the laser controller circuit 24 in synchronization with the sync signal provided from the reproduced signal processing circuit 28.

The laser controller circuit 24 outputs a control signal for controlling the light emitting power of the semiconductor laser 51a to the optical pickup apparatus 23 based on the write signal provided from the encoder 25 and the instruction provided by the CPU 40.

The interface 38 is a bi-directional communication interface for communicating with a host computer such as a personal computer (PC). The interface 38 may comply with AT Attachment Packet Interface (ATAPI), for example.

The flash memory 39 stores computer programs described in codes readable and executable by the CPU 40.

The CPU 40 executes the computer programs stored in the flash memory 39 thereby to control the operations of components described above. The RAM 41 temporarily stores data needed for controlling the components, for example.

Figure 4:
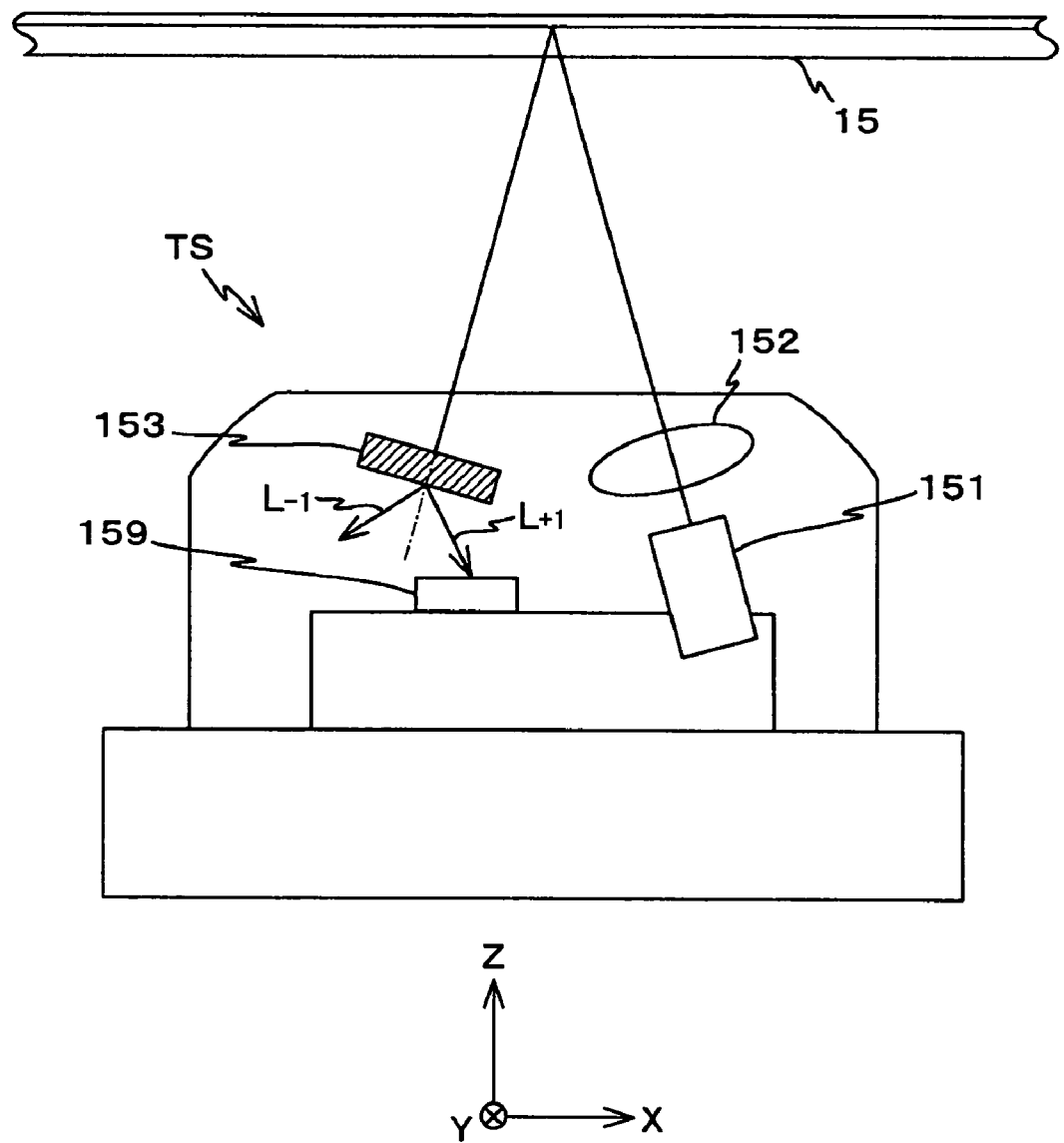
FIG. 4 is a schematic diagram showing the configuration of a tilt sensor shown in FIG. 2 according to an embodiment.

The structure of the tilt sensor TS is described below. As shown in FIG. 4, the tilt sensor TS includes the following: a light emitting diode 151, a collimator lens 152, a hologram element 153, and a photo detector 159.

In response to an instruction provided from the CPU 40, the light emitting diode 151 emits a light beam for detecting tilt (tilt detection light beam) to a direction forming a fixed angle with the reference plane.

The collimator lens 152 is disposed on an optical path through which the tilt detection light beam travels from the light emitting diode 151 to the optical disk 15. The collimator lens 152 makes the tilt detection light beam substantially parallel.

The hologram element 153 is disposed on the optical path of the tilt detection light beam reflected by the optical disk 15 (a reflective tilt detection light beam), and further disposed at a position having a predetermined positional relation with the reference plane. The hologram element 153 diffracts the reflective tilt detection light beam. The hologram element 153 is a so-called volume hologram on which a grooved grating is formed, the grooved grating being 3.7±1 μm deep and 1.4±0.1 μm pitch.

A description is given about the volume hologram below. Holograms are described in detail in, for example, Koyama, J. and Nishihara, H., "Light Wave Electronics", Colona, 1978, pp. 117-132, the entire contents of which are hereby incorporated by reference. Holograms are generally classified into plane holograms and volume holograms. A determination can be made of whether a hologram is a plane hologram or a volume hologram using a Q-factor computed as follows:

$$Q=2\pi\lambda T/(nP^2) \quad (2)$$

where λ indicates the wavelength of incident light, T indicates the groove depth of the grooved grating, n indicates a refractive index, and P indicates the groove pitch.

Figure 5:
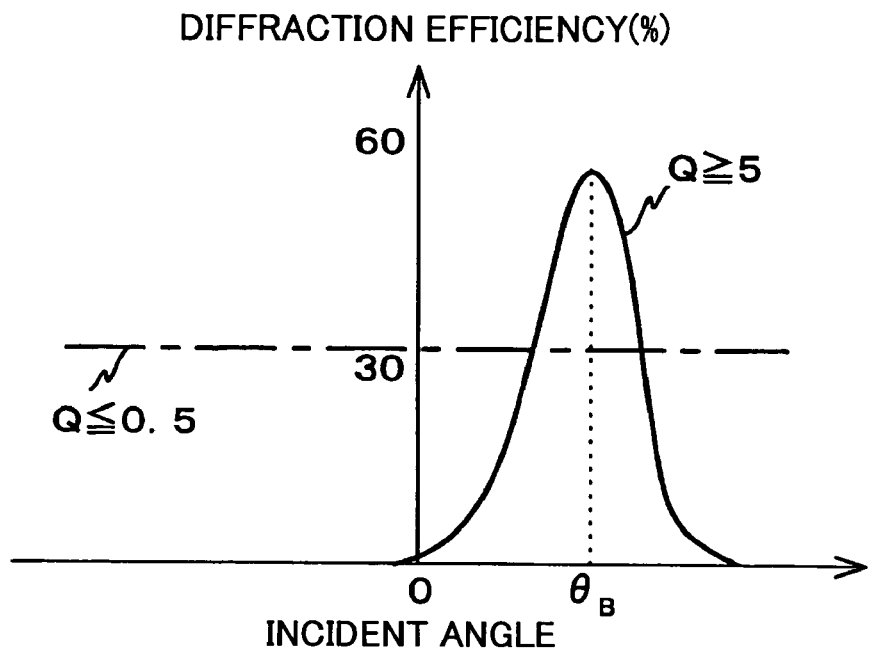
FIG. 5 is a graph for explaining a volume hologram.

A hologram of $Q \leq 0.5$ is referred to as a plane hologram, and a hologram of $Q \geq 5$ is referred to as a volume hologram. The plane hologram and the volume hologram are different, for example, in the dependency of diffraction efficiency on incident angle. As shown in FIG. 5, for example, the diffraction efficiency of a plane hologram is substantially fixed irrespectively to the incident angle. The diffraction efficiency of a volume hologram, however, greatly changes depending on the incident angle. The diffraction efficiency of the volume hologram hits the maximum value at a particular incident angle $\theta_B$ (Bragg angle).

Figure 6:
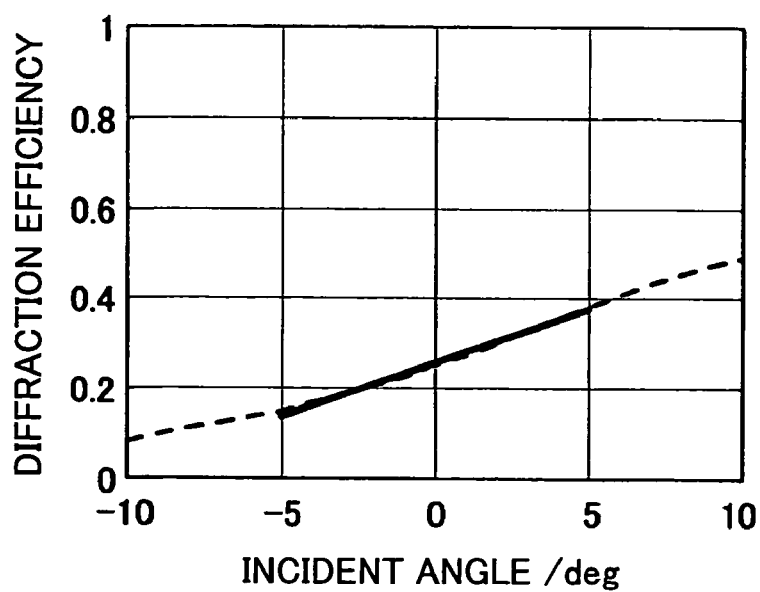
FIG. 6 is a graph for explaining the incident angle dependency of diffraction efficiency of a hologram element provided in a tilt sensor.

The diffraction efficiency of the hologram element 153 depends on the incident angle as shown in FIG. 6. FIG. 6 shows the case of +1st order diffraction light. The diffraction efficiency is related to the incident angle substantially linearly. In the following description, an assumption is made that the diffraction efficiency Df is related to the incident angle θ in the manner as described as follows:

$$Df=a1*\theta+k1, \quad (3)$$

where a1 and k1 are constants.

An incident angle at which the tilt of the optical disk 15 to the reference plane becomes 0 order is referred to as θ0. When the incident angle θ=θ0, the diffraction efficiency Df is expressed as follows:

$$Df0=a1*\theta0+k1 \quad (4)$$

If the optical disk 15 is tilted clock-wise by θm to the reference plane, the incident angle becomes θ0+2θm. The diffraction efficiency Dfm is expressed as follow:

$$Dfm=a1*(\theta0+2\theta m)+k1 \quad (5)$$

A change in the diffraction efficiency is obtained by subtracting the equation (4) from the equation (5) as follows:

$$Dfm-Df0=2*a1*\theta m \quad (6)$$

The equation (6) indicates that the change in the diffraction efficiency is proportional to the change in the tilt value.

The directions along the tangent of a track are referred to as tangential directions, and the directions perpendicular to the tangential directions are referred to as radial directions. In the following description of an embodiment, an assumption is made that the hologram element 153 is arranged so that, if the optical disk 15 tilts in the radial directions, the diffraction efficiency of the hologram element 153 changes. As a result, the tilt sensor TS outputs a signal containing information related to a radial tilt. The hologram element 153 is further arranged so that, if the tilt value is 0, the incident angle of the reflective tilt detection light beam becomes substantially 0.

The photo detector 159 receives the diffracted light from the hologram element 153, and outputs an photo-electric signal to the reproduced signal processing circuit 28. Accordingly, the output signal of the photo detector 159 depends on the diffraction efficiency of the hologram element 153. The output signal I output from the photo detector 159 can be expressed using the diffraction efficiency Df as follows:

$$I=a2*Df+k2 \quad (7)$$

where a2 and k2 are constants.

If the tilt value is 0, the output signal I0 can be expressed as follows:

$$I0 = a2(a1 * \theta0 + k1) + k2 \quad (8)$$
$$= A * \theta0 + K$$

where A=a1*a2, and K=a2*k1+k2.

For example, if the optical disk 15 is tilted clock-wise by θm, the output signal Im can be expressed as follows:

$$Im = a2(a1(\theta0 + 2\theta m) + k1) + k2 \quad (9)$$
$$= A * \theta0 + 2a2 * \theta m + K$$

An equation (10) described below is obtained by subtracting the equation (8) from the equation (9).

$$Im - I0 = 2a2 * \theta m \quad (10)$$

The equation (10) indicates that a change in the output signal from the photo detector 159 is proportional to the tilt value. If the values of I0 and a2 are determined experimentally in advance, the tilt value θm may be computed. The output signal from the photo detector 159 is converted into a voltage signal by the reproduced signal processing circuit 28. The equation (11) is obtained by converting the current signal into a voltage signal in accordance with the characteristics of the I/V amp 28f.

$$Vm - V0 = B * \theta m \quad (11)$$

V0 and B are constants, and are stored in the memory 28m as the tilt conversion information.

The tilt sensor signal detection circuit 28g determines the tilt value based on the equation (11) and the tilt conversion information.

The relation between the tilt value and the voltage applied to the electro-optic element 71 is stored in the memory 28m as the tilt compensation information. The spot adjust signal generator circuit 28h sets the voltage applied to the electro-optic element 71 based on a determined tilt value and the tilt compensation information.

According to the present embodiment, the photo detector 159 receives the +1st order diffraction light L+1 as shown in FIG. 4. L-1 shown in FIG. 4 indicates -1st order diffraction light.

An operation in which the optical disk apparatus 20 records user data on the optical disk 15 is described below.

The CPU 40 outputs a control signal for controlling the rotation of the spindle motor 22 in accordance with a designated rotative speed in response to receipt of a command (a record request command) for requesting to record the user data provided by the host computer. The CPU 40 informs the reproduced signal processing circuit 28 of the receipt of the record request command. The CPU 40 requests the buffer manager 37 to stored the user data received from the host computer to the buffer RAM 34.

After the rotation of the optical disk 15 reaches a predetermined linear speed, the optical disk apparatus 20 begins to control tracking and focusing. The optical disk apparatus 20 keeps controlling the tracking and the focusing until the recording of the user data is completed. The reproduced signal processing circuit 28 obtains the ADIP information based on the output signal of the photo detector 59, and informs the CPU 40 of the ADIP information. Until the recording of the user data is completed, the reproduced signal processing circuit 28 periodically acquires the ADIP information, and informs the CPU 40 of the ADIP information.

The CPU 40 outputs to the driver 27 a control signal for controlling the seek motor. In response to receipt of the control signal, the driver 27 causes the seek motor to position the optical pickup apparatus 23 at a position from which the recording is started based on the ADIP information. When the CPU 40 is informed by the buffer manager 37 that the amount of user data stored in the buffer RAM 34 exceeds a predetermined amount, the CPU 40 gives an instruction to the encoder 25 and causes the encoder 25 to generate a write signal.

When the optical pickup apparatus 23 arrives at a position from which the recording of user data is started, the CPU 40 performs tilt adjustment processing.

In the tilt adjustment processing, the CPU 40 gives an instruction to the tilt sensor TS and causes the tilt sensor to determine a tilt. The CPU 40 further gives an instruction so as to cause the reproduced signal processing circuit 28 to start tilt adjustment processing. According to the above arrangements, the light emitting diode 151 emits a light beam for determining tilt. The light beam emitted by the light emitting diode 151 is reflected by the optical disk 15, and hits the photo detector 159 via the hologram element 153. The photo detector 159 outputs a current signal that changes in accordance with the amount of the received light beam to the reproduced signal processing circuit 28.

In the reproduced signal processing circuit 28, the output signal from the tilt sensor TS is converted into a voltage signal by the I/V amp 28f, and is provided to the tilt sensor signal detector circuit 28g. The tilt sensor signal detector circuit 28g reads tilt conversion information (V0 and B) stored in the memory 28m, and computes tilt value in accordance with the above formula (11). The tilt value is output to the spot adjust signal generator circuit 28h as a tilt sensor signal. The spot adjust signal generator circuit 28h reads tilt compensation information stored in the memory 28m, and determines a voltage to be applied to the electro-optic element 71 based on the tilt sensor signal so that the electro-optic element 71 gives an optical phase difference to the light beam for canceling the wave front aberration caused by the tilt. The determined voltage is output to the driver 27.

After tilt compensation processing is completed, the CPU 25 allows the encoder 25 to write user data. The user data are written on the optical disk 15 via the encoder 25, the laser control circuit 24, and the optical pickup apparatus 23. When all the user data received from the host computer are written on the optical disk 15, the CPU 40 completes write processing.

A description is give below about a reproduction operation of the optical disk apparatus 20 in which user data stored in the optical disk 15 are reproduced.

In response to receipt of a command (reproduction request command) requesting for reproducing user data from the host computer, the CPU 40 outputs a control signal to the driver 27 for controlling the rotation of the spindle motor 22 in accordance with a reproduction speed, and informs the reproduced signal processing circuit 28 that the CPU 40 has received the reproduction request command.

When the optical disk 15 starts rotating at a predetermined linear speed, the CPU 40 starts tracking control and focusing control, and performs the tracking control and the focusing control occasionally until reproduction processing is completed.

The CPU 40 outputs a control signal to the driver 27 in accordance with the ADIP information periodically output by the reproduced signal processing circuit 28 thereby to position the optical pickup apparatus 23 at a position at which the optical pickup apparatus 23 starts reading the user data by controlling the seek motor.

When the optical pickup apparatus 23 reaches the starting position, the CPU 40 performs tilt compensation processing as described above. When the tilt compensation processing is completed, the CPU 40 informs the reproduced signal processing circuit 28 of the completion of the tilt compensation processing. In response to receipt of the information, the reproduced signal processing circuit 28 detects a RF signal from the output signal of the photo detector 59. The reproduced signal processing circuit 28 performs decoding and error correction processing, and then, stores the reproduced user data in the buffer RAM 34. When the reproduced user data of sector size is ready, the buffer manager 37 transfers the reproduced user data to the host computer via the interface 38.

As will be appreciated, the reproduced signal processing circuit 28 realizes an adjusting unit.

The CPU 40 and a computer program executed by the CPU 40 realizes a processing unit. The present invention is not limited to the above embodiments. According to another embodiment, at least a part of the processing unit realized by the CPU 40 and the computer program executed by the CPU 40 may be replaced with hardware, and even the entire processing unit may be configured by hardware.

As described above, according to at least one of embodiments, the light beam emitted by the light emitting diode 151 hits the optical disk 15 via the collimator lens 152. The light beam is reflected by the optical disk 15, and received by the photo detector 159 via the hologram element 153. If the optical disk 15 is tilted to the reference plane, the incident angle at which the reflective light beam enters the hologram element 153 depending on the tilt angle of the optical disk 15 since the hologram element 153 is disposed in a specific relation with the reference plane. The diffraction efficiency of the hologram element 153 depends on the incident angle of the light beam. Accordingly, the intensity of the diffraction light from the hologram element 153 changes as the incident angle of the light beam changes. The amount of diffraction light received by the photo detector 159 also changes. The photoelectric signal output from the photo detector 159 includes information related to the tilt of the optical disk 15. Since the amount of diffraction light received by the photo detector 159 includes information related to the tilt of the optical disk 15, tolerance of the position at which the photo detector 159 is disposed becomes greater than that of the related arts. Accordingly, assembly process, adjustment process, and inspection process can be made simple, and fabrication cost can be reduced. In addition, change over time and temperature dependency of the output signal from the photo detector 159 can be reduced. Accordingly, although compact and inexpensive, the tilt sensor according to at least one of embodiments can output a signal including information related to the tilt of the optical disk 15 with high precision.

Since the output signal from the photo detector 159 includes substantially low offset component, the tilt sensor can determine a tilt value with high precision, and a circuit or processing for determining the tilt value from the output signal from the photo detector 159 can be made simple.

According to at least one of embodiments of the present invention, before the user data are recorded or reproduced, the wave front aberration caused by the tilt is compensated for. According to the above arrangement, the optical disk becomes accessible stably with high precision.

An exemplary embodiment in which the photo detector 159 receives +1st order diffraction light $L_{+1}$ from the hologram element 153 has been described above. According to another embodiment, the photo detector 159 may receive −1st order diffraction light $L_{-1}$ from the hologram element 153.

An exemplary embodiment in which the +1st order diffraction light from the hologram element 153 is received has been described. According to another embodiment, both the +1st order diffraction light and the −1st order diffraction light may be used together.

Figure 7A:
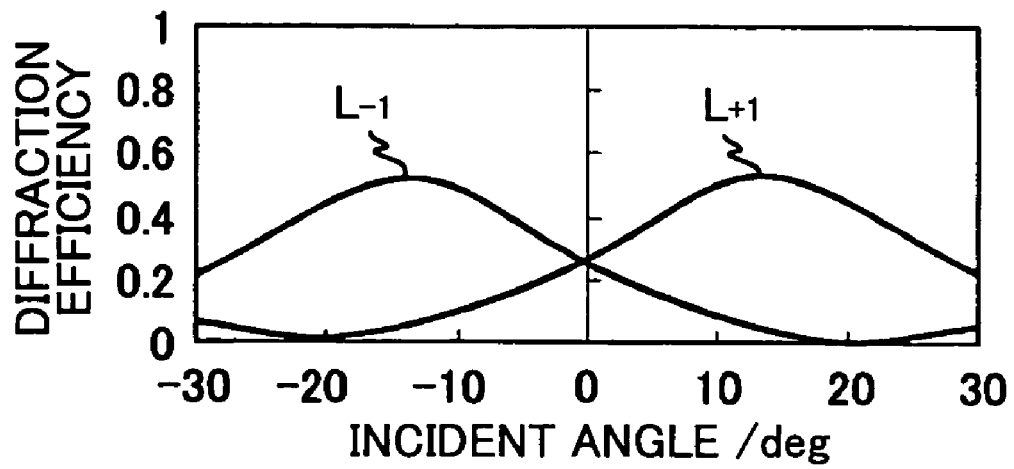
FIGS. 7A and 7B are graphs for explaining the characteristic of +1st order diffraction light and −1st order diffraction light of a volume hologram.
Figure 7B:
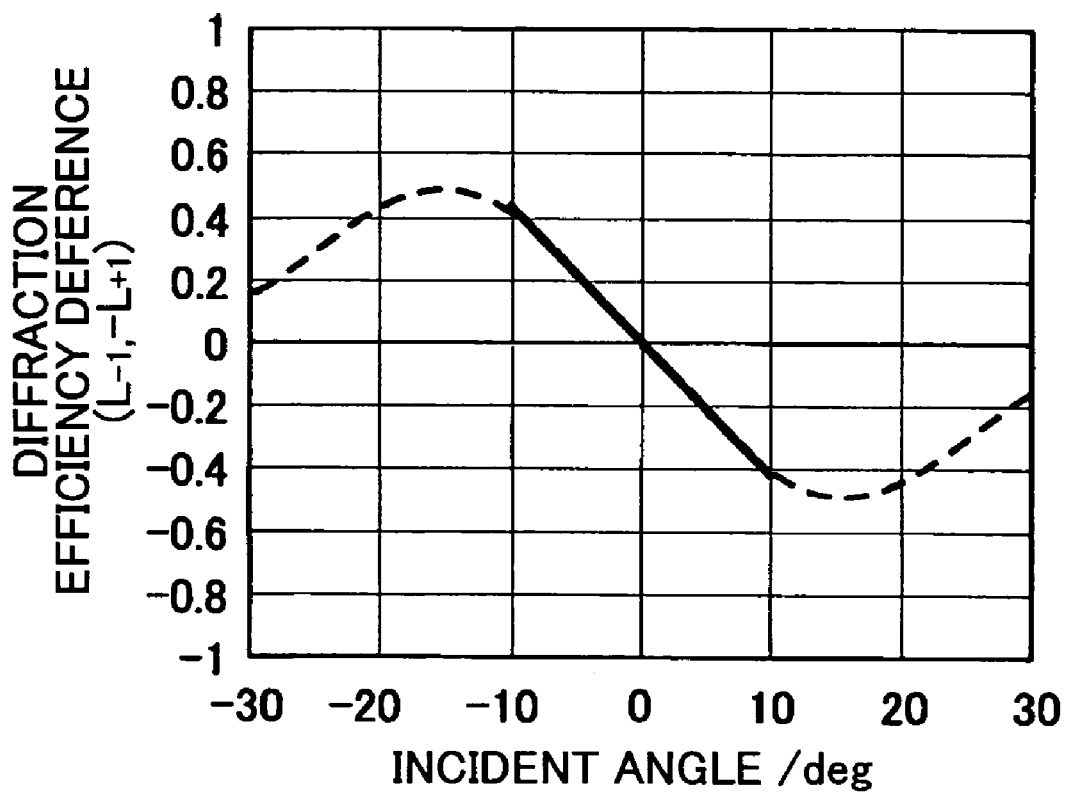

If the optical disk is tilted, the diffraction efficiency of the +1st order diffraction light and the diffraction efficiency of the −1st order diffraction light change as shown in FIG. 7A. The difference between the diffraction efficiency of the +1st order diffraction light and the diffraction efficiency of the −1st order diffraction light (diffraction efficiency difference) changes periodically as the incident angle to the hologram element 153 changes as shown in FIG. 7B. FIG. 7B also shows that the relation between diffraction efficiency difference and the incident angle is substantially linear in a range of incident angle between −10 degree and +10 degree. Accordingly, the incident angle at which the reflected light beam enters the hologram element 153 can be determined based on the difference between the amount of the +1st order diffraction light $L_{+1}$ and the −1st order diffraction light $L_{-1}$. If the incident angle is 0 degree, the diffraction efficiency of the +1st order diffraction light $L_{+1}$ and the diffraction efficiency of the −1st order diffraction light $L_{-1}$ becomes equal. Because the diffraction efficiency difference is 0, processing of the signal can be made simple.

Figure 8A:
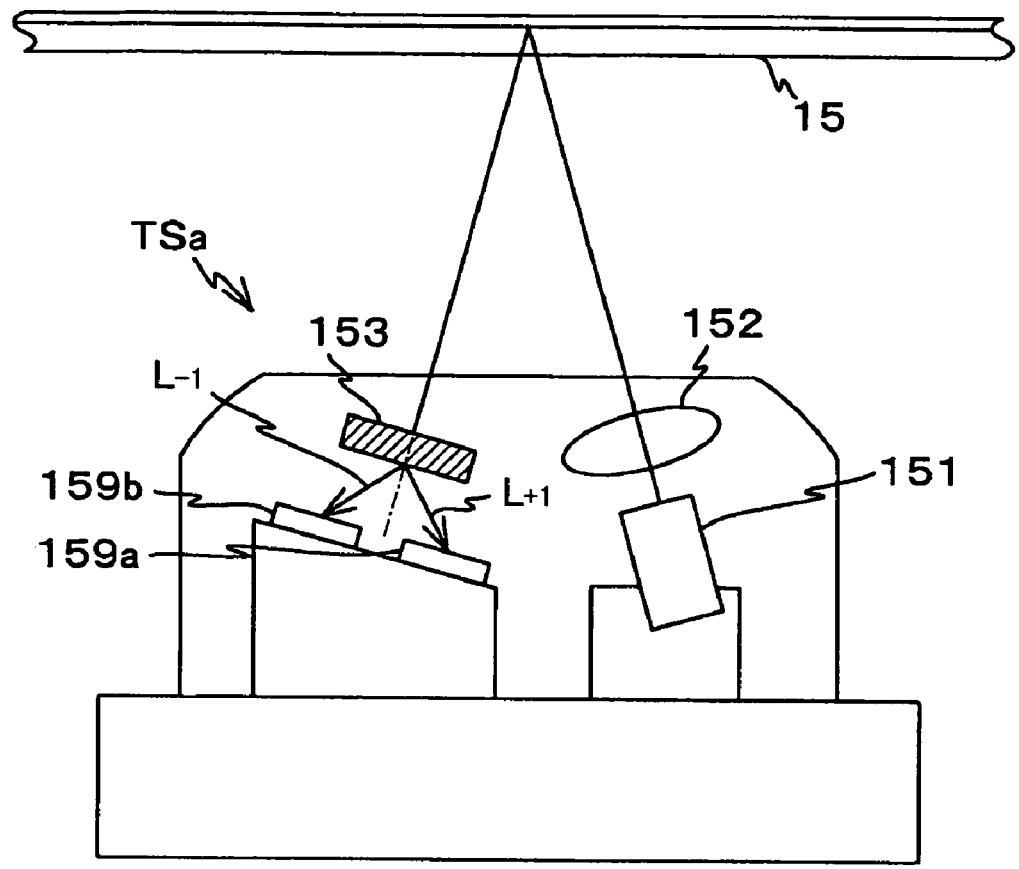
FIGS. 8A and 8B are schematic diagrams for explaining the determining of tilt using +1st order diffraction light and −1st order diffraction light according to an embodiment of the present invention.
Figure 8B:
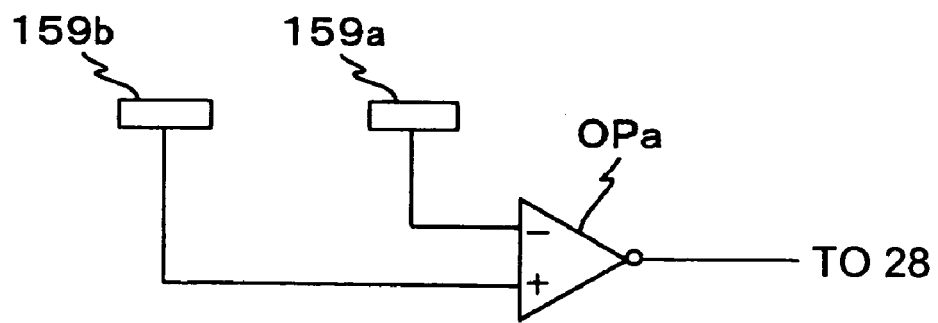

According to at least one of embodiments, a tilt sensor TSa may include a photo detector 159a for receiving the +1st order diffraction light $L_{+1}$ and a photo detector 159b for receiving the −1st order diffraction light $L_{-1}$ as shown in FIG. 8A. In such a case, an amp OPa that generates a differential signal between the output signal from the photo detector 159b and the output signal from the photo detector 159a may be required as a differential signal generator. The amp OPa may be built in the tilt sensor TSa. According to at least one of embodiments, the amp OPa may be built in an external circuit for processing the output signal from the tilt sensor TSa. The voltage applied to the electro-optic element 71 can be controlled so that the output signal from the amp OPa becomes substantially 0.

Figure 9A:
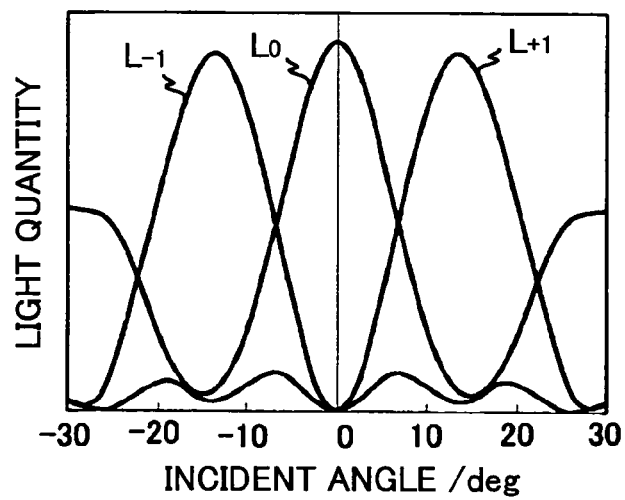
FIGS. 9A through 9C are graphs for explaining characteristic of 0 order light, +1st order diffraction light, and −1st order diffraction light of a volume hologram according to an embodiment.
Figure 9B:
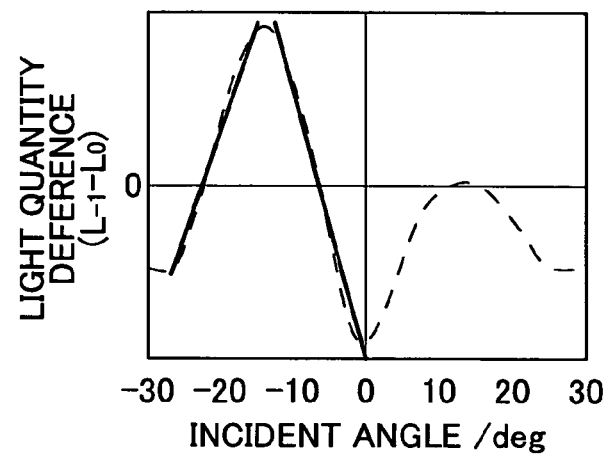
Figure 9C:
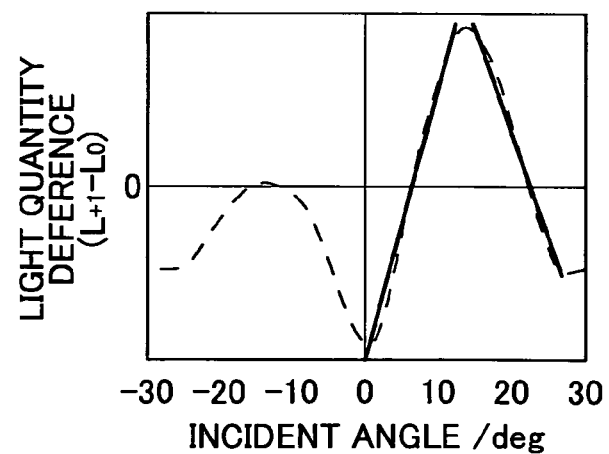

As shown in FIG. 9A, if a groove depth and a groove pitch are appropriately adjusted, the maximum amount of the 0 order light, the maximum amount of the −1st order diffraction light $L_{-1}$, and the maximum amount of the +1st order diffraction light $L_{+1}$ of a volume hologram element can be made substantially equal. An exemplary embodiment of a volume hologram element shown in FIG. 9A has grooved grating having (designed) groove depth of 6.0±1 µm and (designed) groove pitch of 1.4±0.1 µm. As shown in FIG. 9B, if the incident angle is less than 0, the difference in amount between the −1st order diffraction light $L_{-1}$ and the 0 order light $L_0$ depends substantially linearly on the incident angle in a wide range of the incident angle. As shown in FIG. 9C, if the incident angle is greater than 0, the difference in amount between the +1st order diffraction light $L_{+1}$ and the 0 order light $L_0$ depends substantially on the incident angle in a wide range of the incident angle. As a result, the incident angle can be determined using the difference in amount between the +1st order diffraction light $L_{+1}$ and the 0 order light $L_0$ and the difference in amount between the −1st order diffraction light $L_{-1}$ and the 0 order light $L_0$.

Figure 10A:
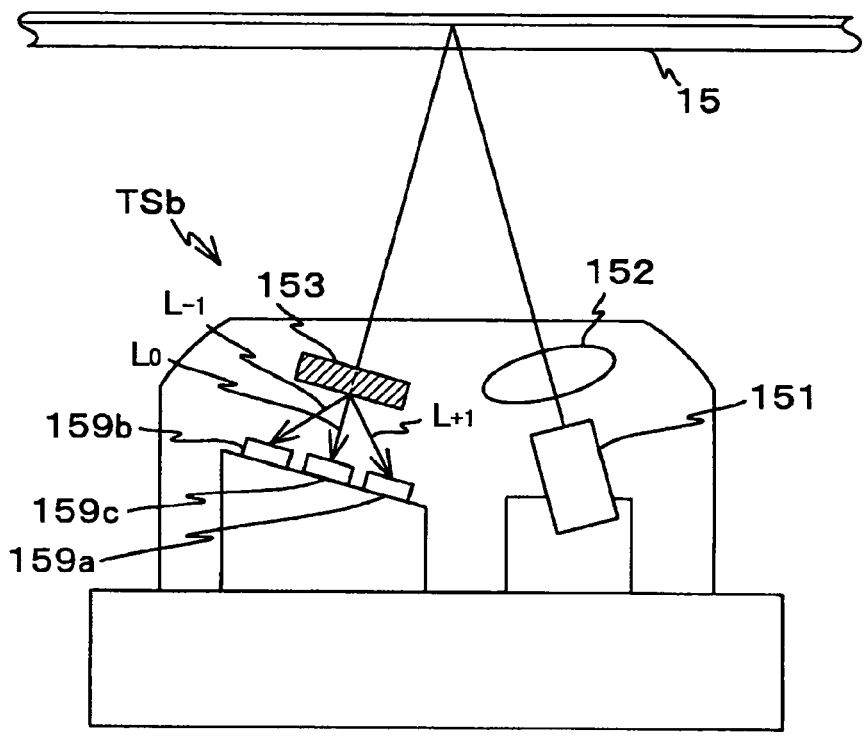
FIGS. 10A and 10B are schematic diagrams for explaining the determining of tilt using 0 order light, +1st order diffraction light, and −1st order diffraction light of a volume hologram according to an embodiment.
Figure 10B:
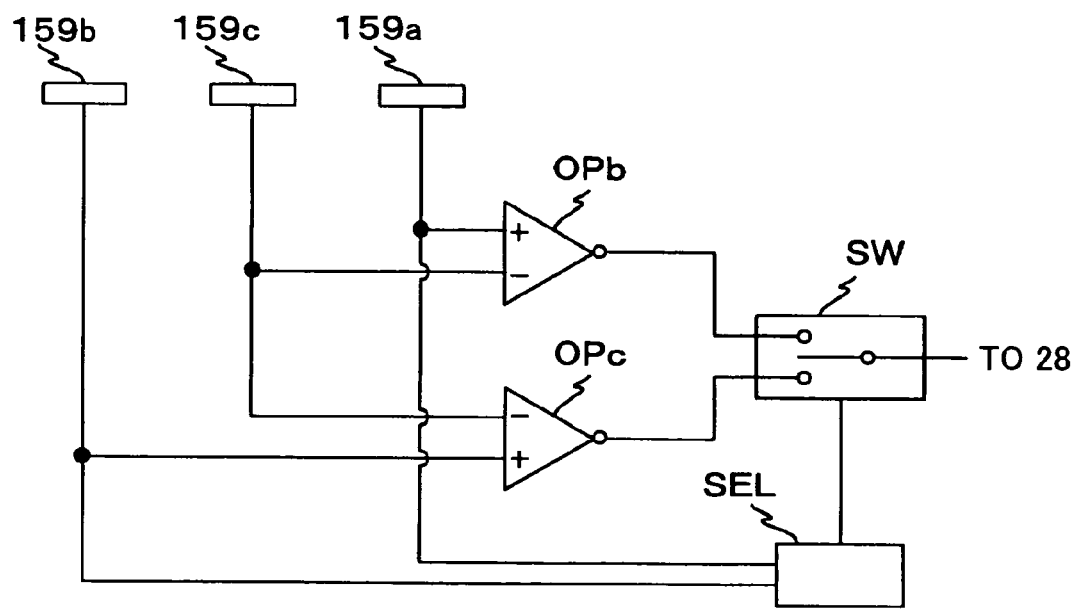

As shown in FIG. 10A, according to at least one of embodiment of the present invention, a tilt sensor TSb may include a photo detector 159a for receiving the +1st order diffraction light $L_{+1}$, a photo detector 159b for receiving the −1st order diffraction light $L_{-1}$, and a photo detector 159c for receiving the 0 order light $L_0$. In such a case, an amp OPb that generates a differential signal between the output signal from the photo detector 159a and the output signal from the photo detector 159c, an amp OPc that generates a differential signal between the output signal from the photo detector 159b and the output signal from the photo detector 159c, a switch SW that outputs either the output signal from the amp OPb or the output signal from the amp OPc, and a selection circuit SEL that compares the output signal from the photo detector 159a and the output signal from the photo detector 159b and controls the switch SW in accordance with the comparison may be required. The selection circuit SEL controls the switch SW so that if the output signal from the photo detector 159a is greater than that of the photo detector 159b, the output signal of the amp OPb is output, and if the output signal from the photo detector 159a is less than that of the photo detector 159b, the output signal of the amp OPc is output. According to the above arrangements, the resolution of the tilt sensor is increased, and as a result, the tilt can be determined with high precision. The amp OPb, the amp OPc, the switch SW, and the selection circuit SEL may be built in the tilt sensor TSb. According to another embodiment, the amp OPb, the amp OPc, the switch SW, and the selection circuit SEL may be built in an external circuit for processing the output signal from the tilt sensor TSb.

Figure 11:
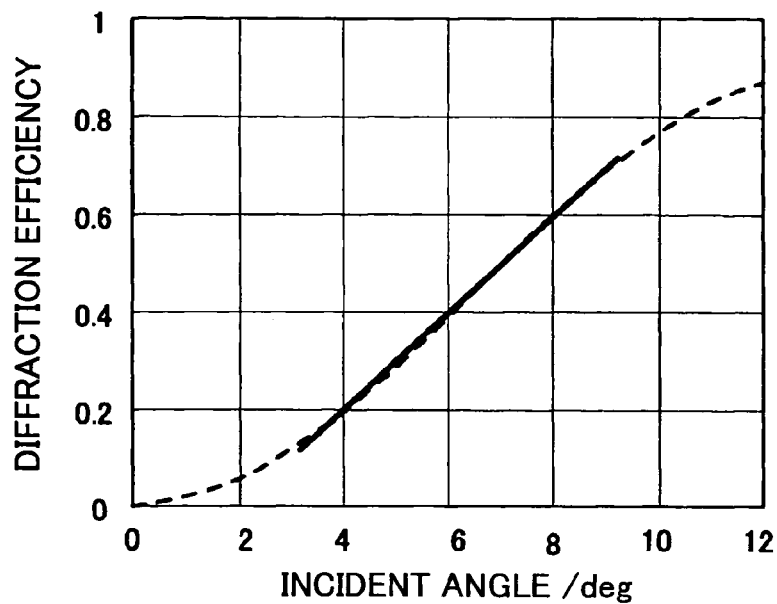
FIG. 11 is a graph for explaining the incident angle dependency of diffraction efficiency of a volume hologram of which groove is deep to some extent according to an embodiment.
Figure 12:
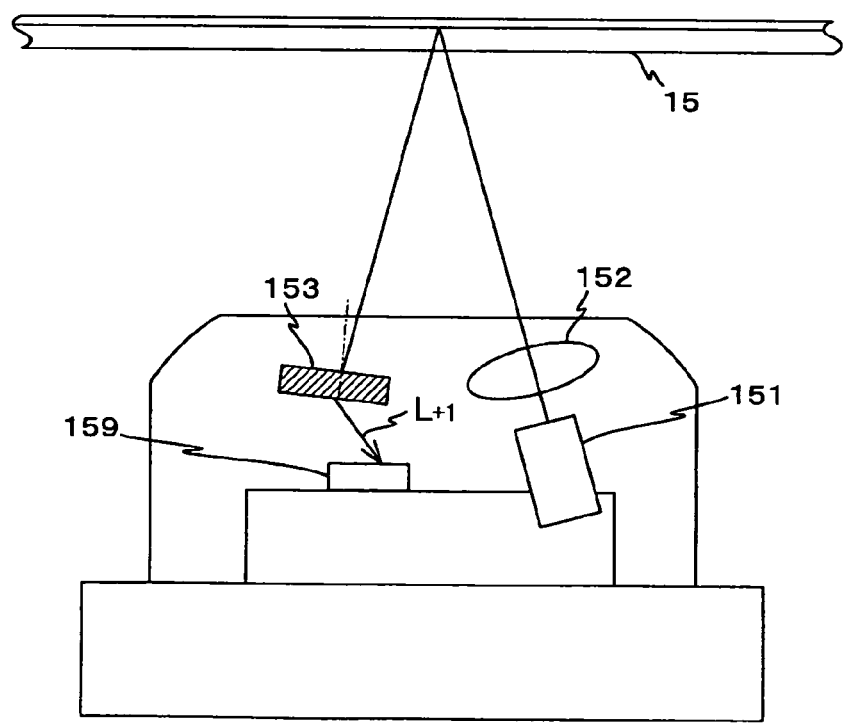
FIG. 12 is a schematic diagram for explaining a tilt sensor using the volume hologram shown in FIG. 11.
Figure 13:
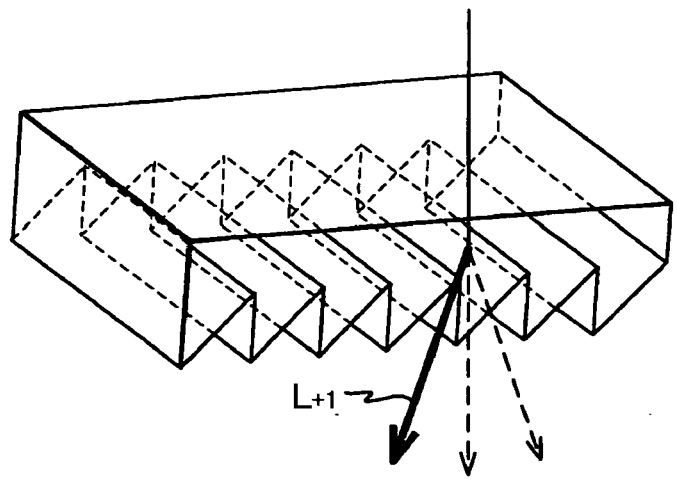
FIG. 13 is a schematic diagram for explaining blades of a volume hologram.
Figure 14:
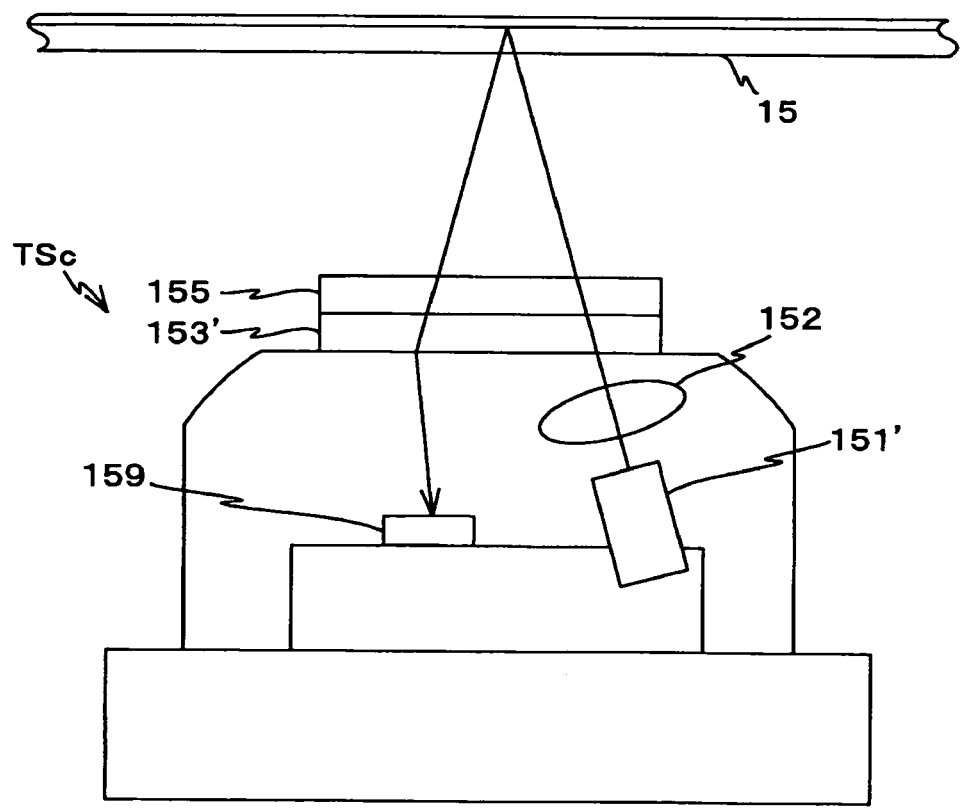
FIG. 14 is a schematic diagram for explaining a tilt sensor using a polarizing hologram according to an embodiment.

As the groove depth of a volume hologram is increased, the dependency of the diffraction efficiency of the volume hologram on the incident angle is increased, and the resolution of tilt determination can be increased. However, as shown in FIG. 11 once the groove depth exceeds a certain level, the range of the incident angle in which the relation between diffraction efficiency and the incident angle is substantially linear moves so that it does not include the incident angle 0 degree. In such as case, the hologram element 153 may be arranged so that the incident angle (about 6.5 degree in FIG. 11) at which the tilt value is about 0 is positioned at a center of the linear region as shown in FIG. 12. In such a case, the cross section of the grooved grating may be made serriform (blades) as shown in FIG. 13.

An exemplary embodiment in which the hologram element 153 does not have polarization. According to at least one of embodiments of the present invention, a tilt sensor TSc may include a polarization hologram element 153' that has polarization may be used as a polarization diffraction element instead of the hologram element 153. The tilt sensor TSc includes a semiconductor laser 151' that emits a light beam with linear polarization instead of the light emitting diode 151. A phase difference plate, or λ/4 plate 155, is provided on the optical path. As will be appreciated, it is assumed in an exemplary embodiment that the semiconductor laser 151' emits a light beam of P polarization, and the polarization hologram element 153' may be set so as to transmit the P polarized light beam, and to diffract S polarized light beam.

The P polarized light beam (LD light) emitted by the semiconductor laser 151' is made substantially parallel by the collimator lens 152, and enters the polarization hologram element 153'. The LD light almost transmits through the polarization hologram element 153', made circularly polarized by the λ/4 plate 155, and is applied to the optical disk 15. The reflective light reflected by the optical disk 15 (reflected LD light) is circularly polarized in an rotative direction opposite to that of the LD light. The reflective LD light is made S polarized by the λ/4 plate 155, and hits the polarization hologram element 153'. The reflective LD light diffracted by the polarization hologram element 153' is received by the photo detector 159. According to the above arrangements, the using of light is made efficient, and the tilt sensor can be made compact.

An exemplary embodiment in which the light beam emitted by the light emitting diode 151 is made. substantially parallel by the collimator lens 152 is described above. According to another embodiment, if the light beam emitted by the light emitting diode 151 is not diverging much, the collimator lens 152 may not be needed.

In addition, an exemplary embodiment in which the radial tilt is determined has been described. According to another embodiment, a tilt in the tangential direction (tangential tilt) may be determined by rotating the tilt sensor by 90 degree to the optical disk 15.

Figure 15A:
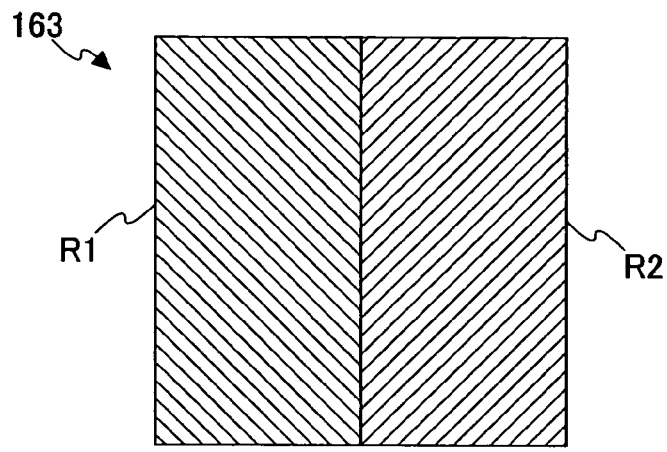
FIGS. 15A and 15B are schematic diagrams for explaining a tilt sensor capable of determining tilt in two directions according to an embodiment.
Figure 15B:
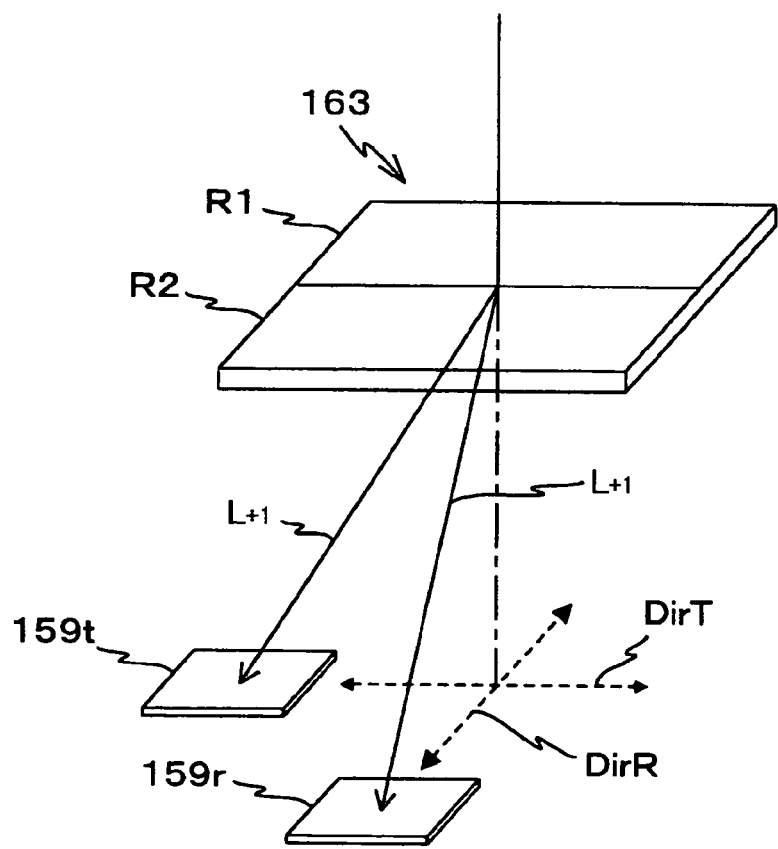

As shown in FIG. 15A, a tilt sensor may include a hologram element 163 including two regions (R1 and R2) in which groove grating is formed in directions perpendicular to each other instead of the hologram element 153 so as to determine tilts in two directions perpendicular to each other. For example, as shown in FIG. 15B, the hologram element 163 is disposed so that the light beam incident to the region R1 (first region) is diffracted to the radial directions, and the light beam incident to the region R2 (second region) is diffracted to the tangential directions. A photo detector 159r (first photo detector) for receiving the +1st order diffraction light from the region R1 and a photo detector 159t (second photo detector) for receiving the −1st order diffraction light from the region R2 are provided at appropriate positions. According to the above arrangements, the radial tilt can be determined based on the output signal from the photo detector 159r, and the tangential tilt can be determined based on the output signal from the photo detector 159t.

Figure 16:
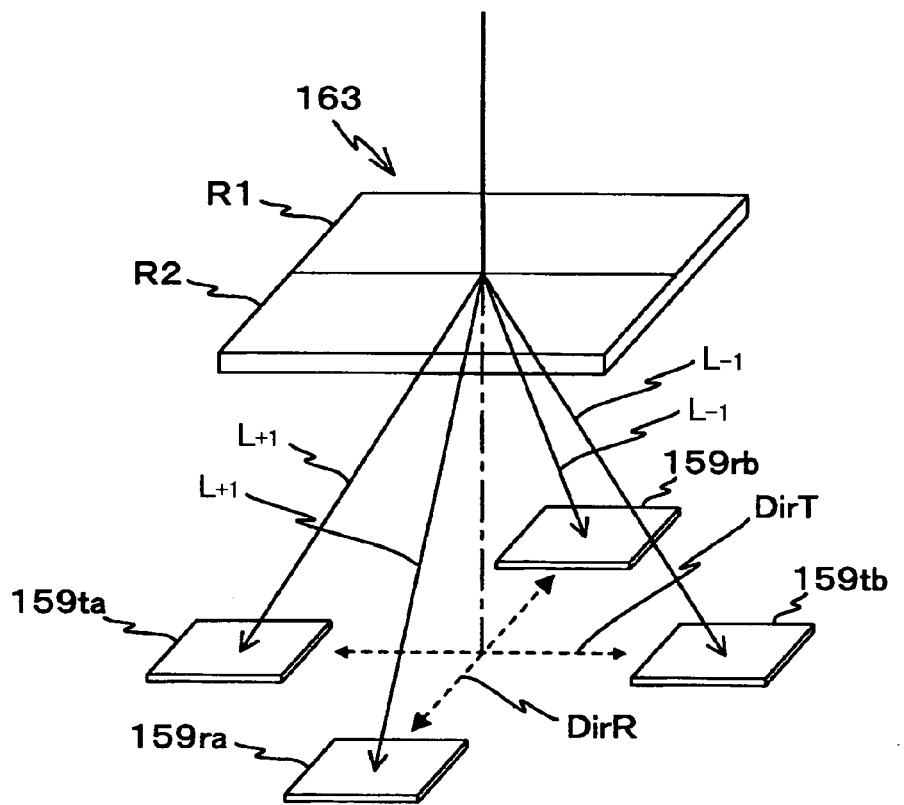
FIG. 16 is a schematic diagram for explaining the receiving of +1st order diffraction light and −1st order diffraction light according to an embodiment.
Figure 17:
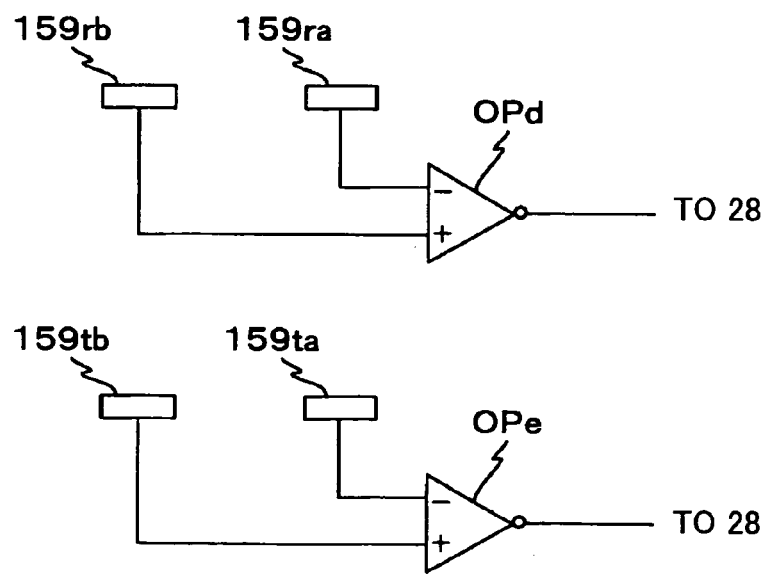
FIG. 17 is a schematic diagram for explaining a differential signal generator circuit according to an embodiment.

In such a case, as shown in FIG. 16, a tilt sensor may include a photo detector 159ra for receiving the +1st order diffraction light L+1 from the region R1, a photo detector 159rb for receiving the −1st order diffraction light L−1 from the region R1, a photo detector 159ta for receiving the +1st order diffraction light L+1 from the region R2, and a photo detector 159tb for receiving the −1st order diffraction light L−1 from the region R2. As shown in FIG. 17, as an example, an amp OPd and an amp OPe may be provided in the tilt sensor as a first differential signal generator and a second differential signal generator, respectively. The amp OPd generates a differential signal between the output signal from the photo detector 159ra and the output signal from the photo detector 159rb, and the amp OPe generates a differential signal between the output signal from the photo detector 159ta and the output signal from the photo detector 159tb. These amps may be built in the tilt sensor. According to another embodiment, these amps may be provided in an external circuit for processing the output from the tilt sensor.

Figure 18:
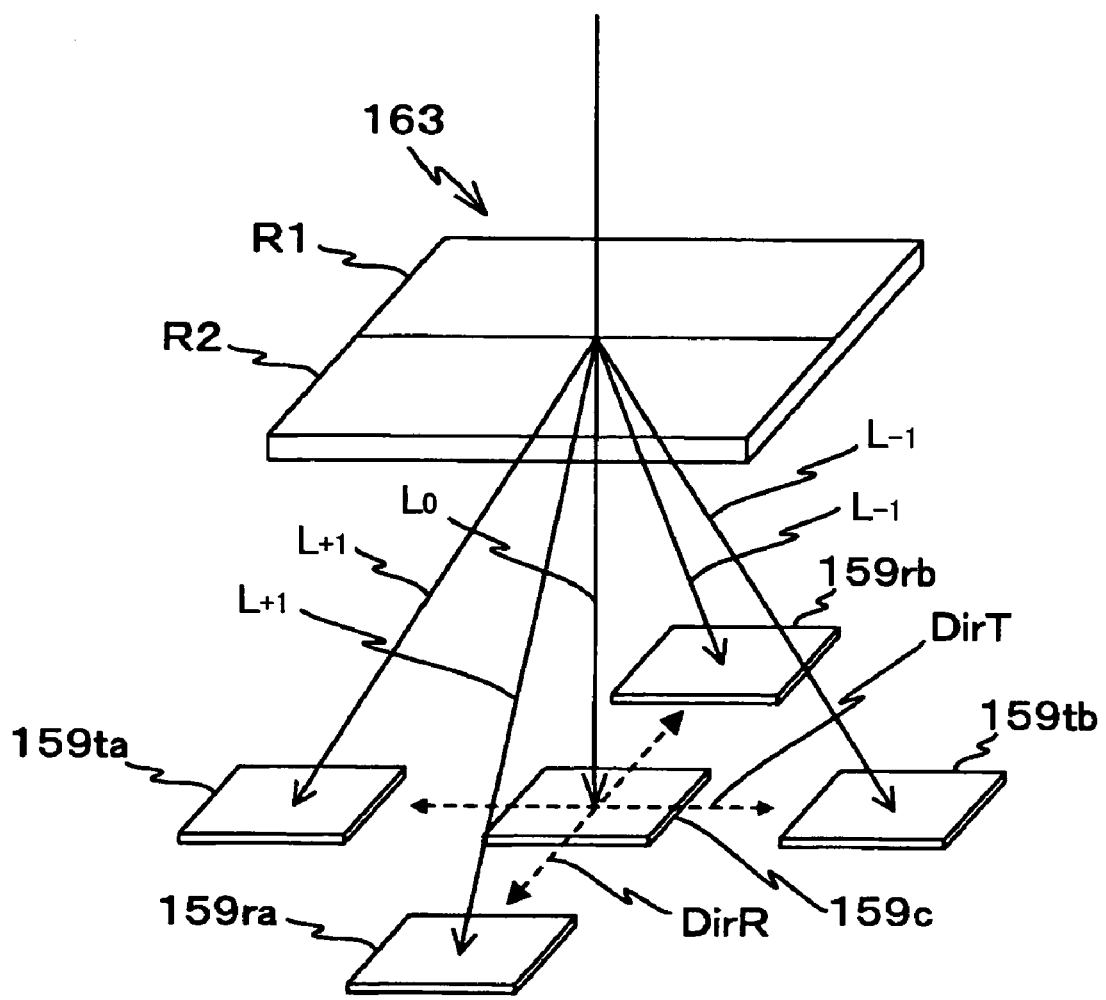
FIG. 18 is a schematic diagram for explaining the receiving of 0 order light additionally according to an embodiment.
Figure 19:
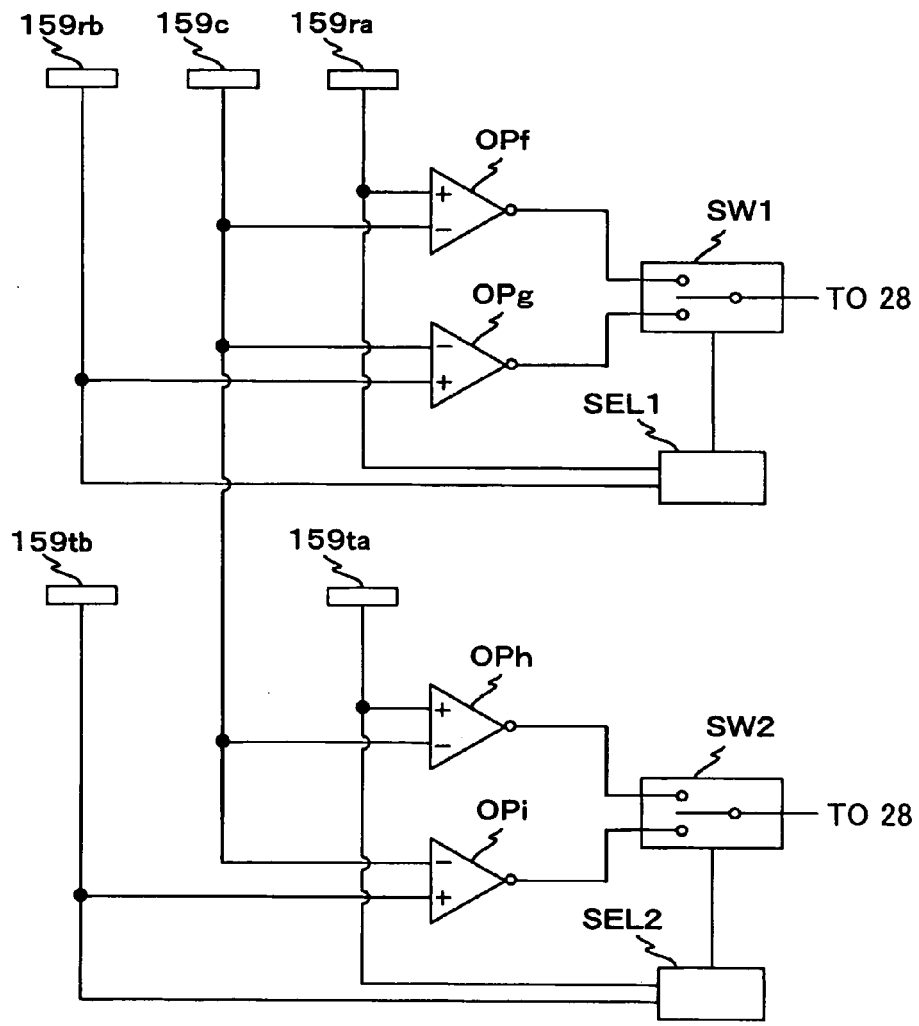
FIG. 19 is a schematic diagram for explaining a differential signal generator circuit for receiving 0 order light in addition according to an embodiment.

As shown in FIG. 18, a photo detector 159c may be provided for receiving the 0 order light L0. According to another embodiment, as shown in FIG. 19, the following circuits may be further provided to the tilt sensor: an amp OPf, an amp OPg, a switch SW1, and a selector circuit SEL1. The amp OPf generates the differential signal between the output signal from the photo detector 159ra and the output signal from the photo detector 159c as a first differential generator. The amp OPg generates the differential signal between the output signal from the photo detector 159rb as a first differential signal generator. The switch SW1 switches the output from the amp OPf and the output from the OPg. The selector circuit SEL1 compares the output signal from the photo detector 159ra and the output signal from the photo detector 159rb, and controls the switch SW1. The selector circuit SEL1 controls the switch SWIf the output signal from the photo detector 159ra is greater than that of the photo detector 159rb, the selector circuit SEL1 outputs the output from the amp OPf, and if the output signal from the photo detector 159ra is less than that of the photo detector 159rb, the selector circuit SEL1 outputs the output from the amp OPg.

The following circuits may be further provided to the tilt sensor: an amp OPh, an amp OPi, a switch SW2, and a selector circuit SEL2. The amp OPh generates the differential signal between the output signal from the photo detector 159ta and the output signal from the photo detector 159c as a first differential generator. The amp OPi generates the differential signal between the output signal from the photo detector 159tb as a first differential signal generator. The switch SW2 switches the output from the amp OPh and the output from the OPi. The selector circuit SEL2 compares the output signal from the photo detector 159ta and the output signal from the photo detector 159tb, and controls the switch SW2. The selector circuit SEL2 controls the switch SW so that, if the output signal from the photo detector 159ta is greater than that of the photo detector 159tb, the selector circuit SEL2 outputs the output from the amp OPh, and if the output signal from the photo detector 159ta is less than that of the photo detector 159tb, the selector circuit SEL2 outputs the output from the amp OPi. According to the above arrangements, the resolution of determination can be increased, and the tilt can be determined in high precision. The amps, the switches, and the selector circuits may be built in the tilt sensor. According to another embodiment, the amps, the switches, and the selector circuits may be built in an external circuit for processing the output of the tilt sensor.

Figure 20:
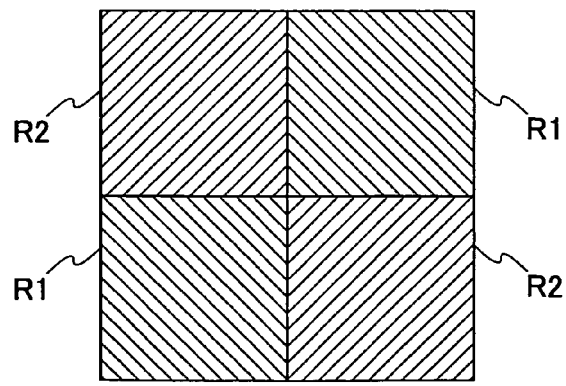
FIG. 20 is a schematic diagram for explaining a hologram element according to an embodiment.

According to another embodiment, as shown in FIG. 20, a tilt sensor may include a hologram element including multiple regions R1 and multiple regions R2.

An exemplary embodiment in which the tilt value is determined outside of the tilt sensor has been described. According to another embodiment, a circuit for determining the tilt value may be provided in the tilt sensor.

Figure 21:
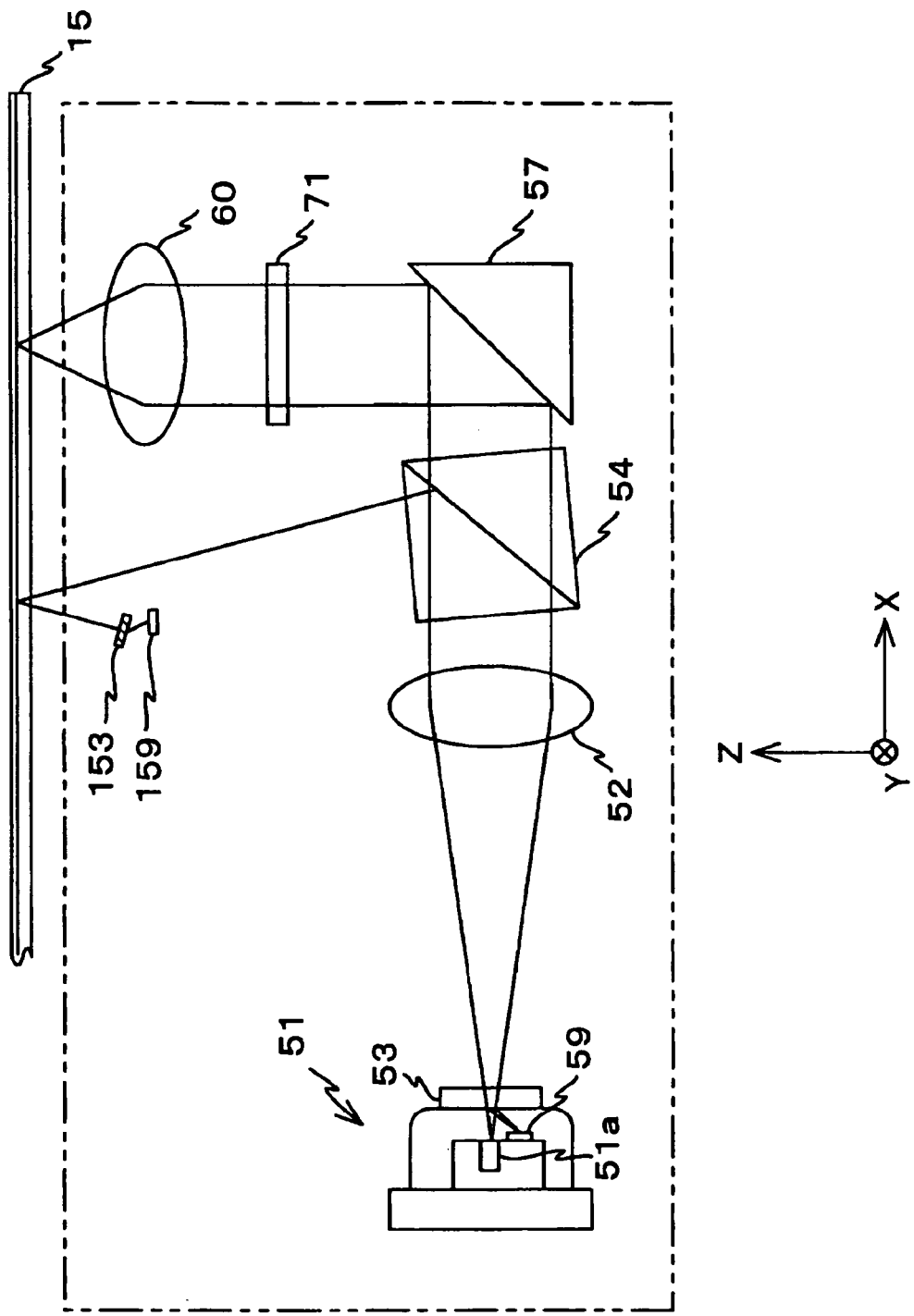
FIG. 21 is a schematic diagram for explaining an exemplary embodiment in which a part of light beam emitted by a light emitting/receiving module is used for determining tilt.

In at least one of the above embodiments, as shown in FIG. 21, a fraction of the light beam emitted by the light emitting/receiving module 51 may be used for the determining of tilt. In such a case, a beam splitter 54 may be provided as a splitting optical element between the collimator lens 52 and the deflection mirror 57. The light beam is made substantially parallel by the collimator lens 52, and a fraction of the light beam is used for determining the tilt to the optical disk 15. A hologram element 153 may be disposed on an optical path of the light beam for determining tilt reflected by the optical disk 15. Accordingly, the light emitting diode 151 and the collimator lens 152 are not needed. Instead of the beam splitter 54, a hologram element or a reflective mirror may be used.

An exemplary embodiment in which the shape of the light spot formed on the recording surface is adjusted by controlling the voltage applied to the electro-optic element 71 has been described. The present invention is not limited to such an embodiment. The lens holder (not shown) holding the object lens 60 may be rotated in accordance with the tilt value, for example. In such as case, an actuator is provided for rotating the lens holder, and a driving signal for driving the actuator is output by the spot adjustment signal generator circuit 28h. According to another embodiment, the optical pickup apparatus 23 may be rotated in accordance with the tilt value. In such as case, a motor for rotating the optical pickup 23 may be provided, and a driving signal for driving the motor may be output from the spot adjustment signal generator circuit 28h. In such cases, the electro-optic element 71 is not needed.

An exemplary embodiment in which the reproduced signal processing circuit 28 determines the tilt compensation signal and the spot adjustment signal has been described. According to another embodiment, a circuit that functions in the same manner as at least one of the tilt sensor signal detection circuit and the spot adjustment signal generator circuit.

An exemplary embodiment in which the optical disk apparatus complies with the DVD standard has been described. According to another embodiment, the optical disk apparatus may comply with another standard such as the compact disk (CD).

An exemplary embodiment in which only one light source is provided has been described. According to another embodiment, multiple light sources that emit different wavelengths may be provided. At least two of a light source that emits a light beam of 405 nm wavelength, a light source that emits a light beam of 660 nm wavelength, and a light source that emits a light beam of 780 nm wavelength may be provided.

According to another embodiment, a polarization hologram element of which diffraction efficiency depends on the directions of polarization of the incoming light beam may be used instead o the hologram element 53. According to the above arrangement, the efficiency in using the light is increased, which enable a tilt sensor to operate at a high speed. In such as case, a phase difference unit such as a λ/4 plate may be provided between the object lens and the polarization hologram element.

An exemplary embodiment in which a hologram element 53 is used for splitting the returning light beam has been described. According to another embodiment, a beam splitter may be used instead of the hologram element 53.

The optical disk apparatus according to the above embodiments may be embedded type that is built in a host computer, and according to another embodiment, the optical disk apparatus may be stand alone type that is disposed in a separate chassis.

An exemplary embodiment in which the optical disk apparatus can record and reproduce user data. An optical disk according to another embodiment at least can reproduce user data.

An exemplary embodiment has been described in which the interface is in compliance with the ATAPI standard. According to another embodiment, the interface may be in compliance with ATA (at Attachment), SCSI (Small Computer System Interface), USB (Universal Serial Bus) 1.0, USB 2.0, IEEE 1394, IEEE 802.3, Serial ATA, or Serial ATAPI.

Figure 22:
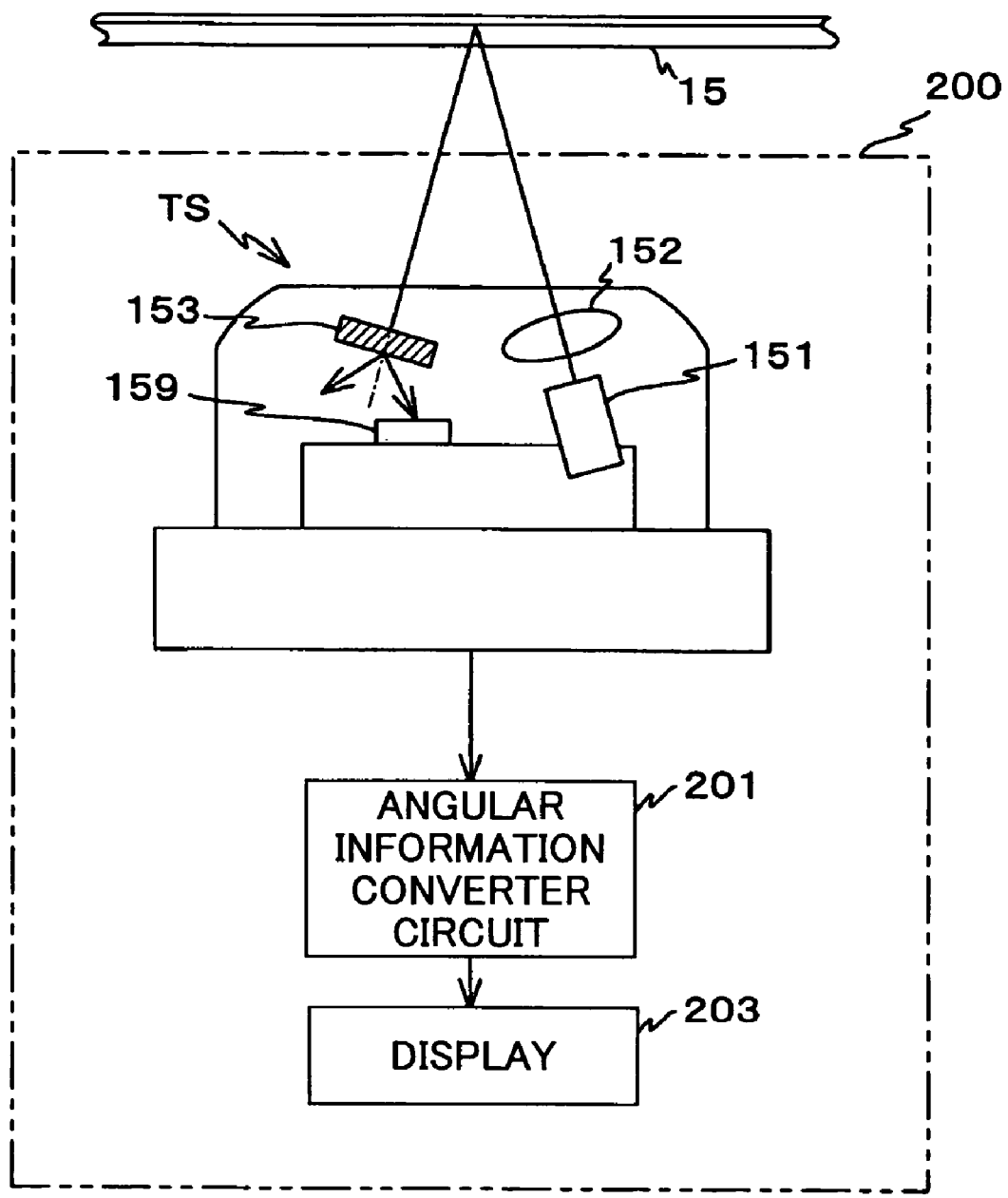
FIG. 22 is a schematic diagram showing a tilt measurement apparatus according to an embodiment of the present invention.
Figure 23:
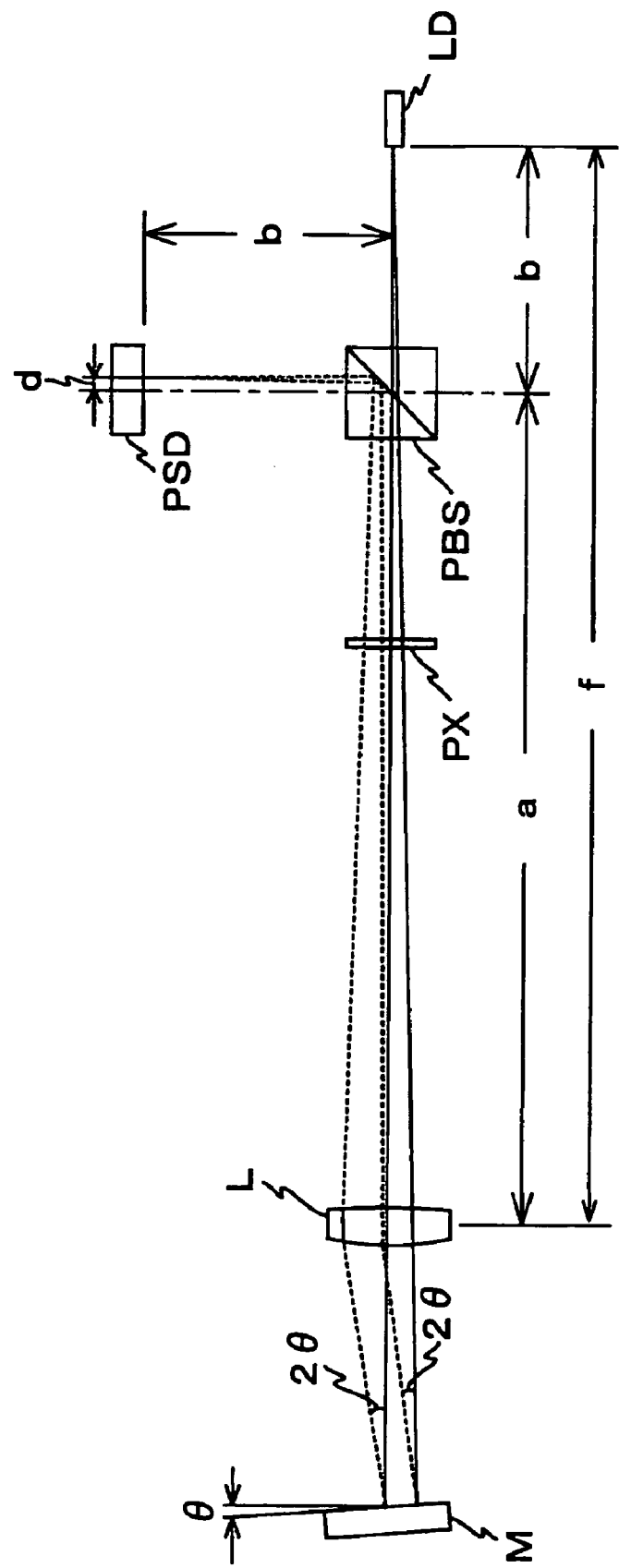
FIG. 23 is a schematic diagram for explaining a laser auto collimator.

As shown in FIG. 22, a tilt measurement apparatus 200 can be provided in which the tilt sensor according to the above embodiments is provided. The tilt measurement apparatus 200 includes a angle information conversion circuit 201 that converts information related to tilt contained in the output signal from the photo detector 159 as a tilt angle determination unit, and a display unit 203 that displays the angle information. That is, since a signal containing information related to the tilt of an object is output from the tilt sensor TS, although the tilt measurement apparatus 200 is compact and inexpensive, it can determine the tilt of the object with high precision. If the angle information does not need to be displayed, the display unit 203 is not needed. Instead of the tilt sensor TS, the tilt measurement apparatus 200 may used the tilt sensor TSa, TSb, or TSc. In addition, a tilt sensor that can determine tilts in two directions may be used.

Figure 24:
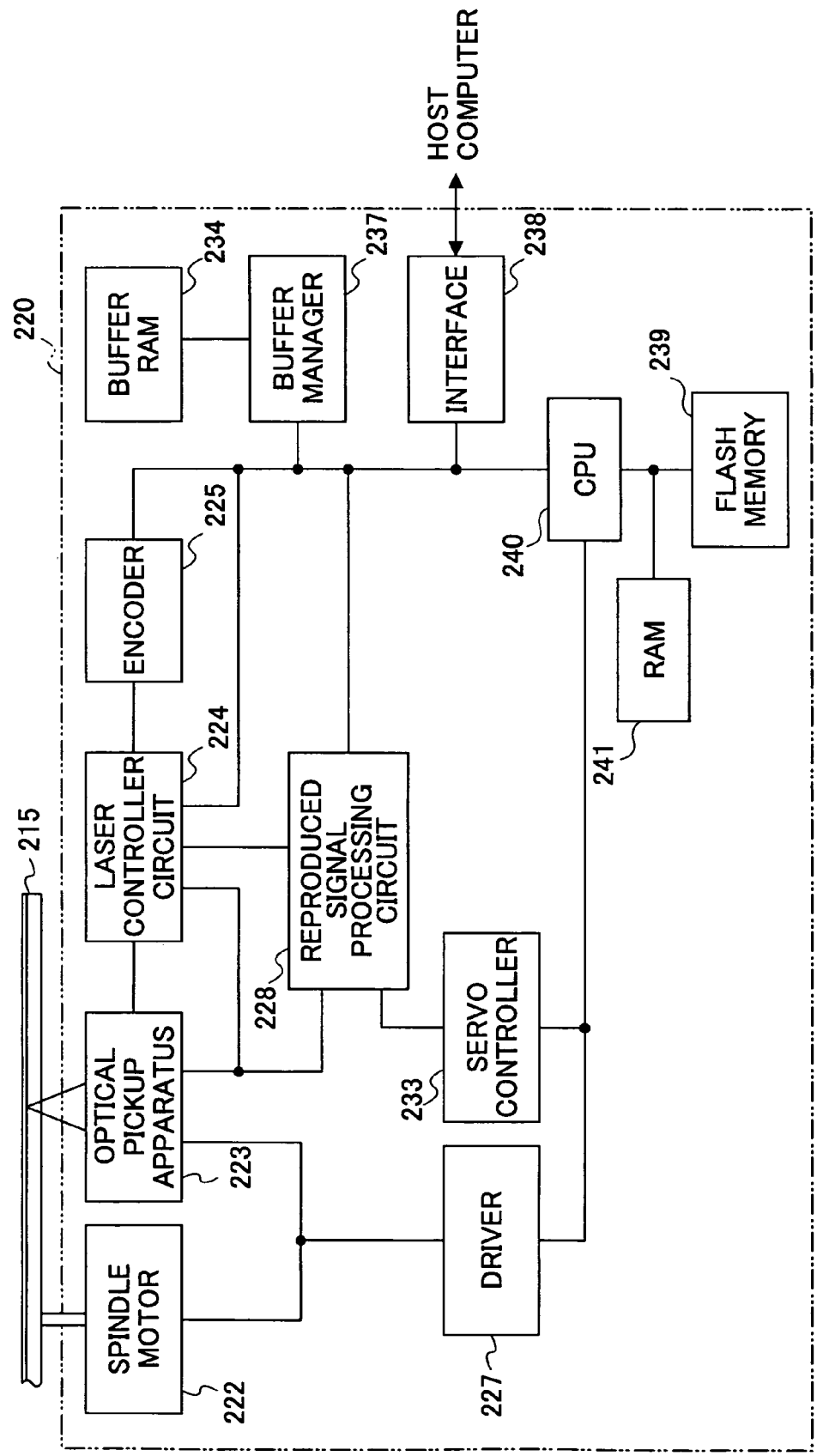
FIG. 24 is a block diagram showing the configuration of an optical disk apparatus according to another embodiment of the present invention.

FIG. 24 is a block diagram showing an optical disk apparatus 220 according to another embodiment of the present invention.

The optical disk apparatus 220 shown in FIG. 24 includes a spindle motor 222, n optical pickup apparatus 223, a laser control circuit 224, an encoder 225, a motor driver 227, a reproduced signal processing circuit 228, a servo controller 233, a buffer RAM 234, a buffer manager 237, an interface 238, a flash memory 239, a CPU 240, and a RAM 241. Lines connecting the blocks indicates typical flow of signals and information, but some connections between blocks are not shown.

The buffer RAM 234 includes a buffer region in which data to be recorded in the optical disk 215 and data reproduced from the optical disk 215 are temporarily stored, and a parameter region in which parameters used by various computer programs are stored.

The buffer manager 237 controls the inputting of data to the buffer RAM 234 and the outputting of data from the buffer RAM 234. When the amount of data stored in the buffer region reaches a predetermined value, the buffer manager 237 informs the CPU 240.

The encoder 225 retrieves, in response to an instruction given by the CPU 240, data to be recorded stored in the buffer RAM 234 via the buffer manager 237, modulates the data, and attaches error correction codes thereby to generate a write signal to be written on the optical disk 215. The generated write signal is output to the laser control circuit 224.

The laser control circuit 224 controls the laser beam to be output to the optical disk 215 based on an instruction given by the CPU 240 and the write signal from the encoder 225.

The interface 238 is a bi-directional interface for communicating with a host computer such as a personal computer, and may be in compliance with ATAPI (AT attachment Packet Interface).

The flash memory 239 includes a program region and a data region. A computer program written in a language readable by the CPU 240 is stored in the program region. Information related to the seek operation of the optical pickup apparatus 223 (seek information) and recording strategy information, for example, are stored in the data region.

The CPU 240 controls operations of the above elements in accordance with the computer program stored in the program region of the flash memory 239, and stores data needed for controlling in the parameter region of the buffer RAM 234 and the RAM 241.

The optical pickup apparatus 223 applies a laser light to the recording surface of the optical disk 215 in which a spiral track or concentric tracks are formed, and receives reflective light from the recording surface. In the following description, X-axis, Y-axis, and Z-axis correspond to the radial directions (or tracking directions), the tangential directions, and the focus directions, respectively.

Figure 25:
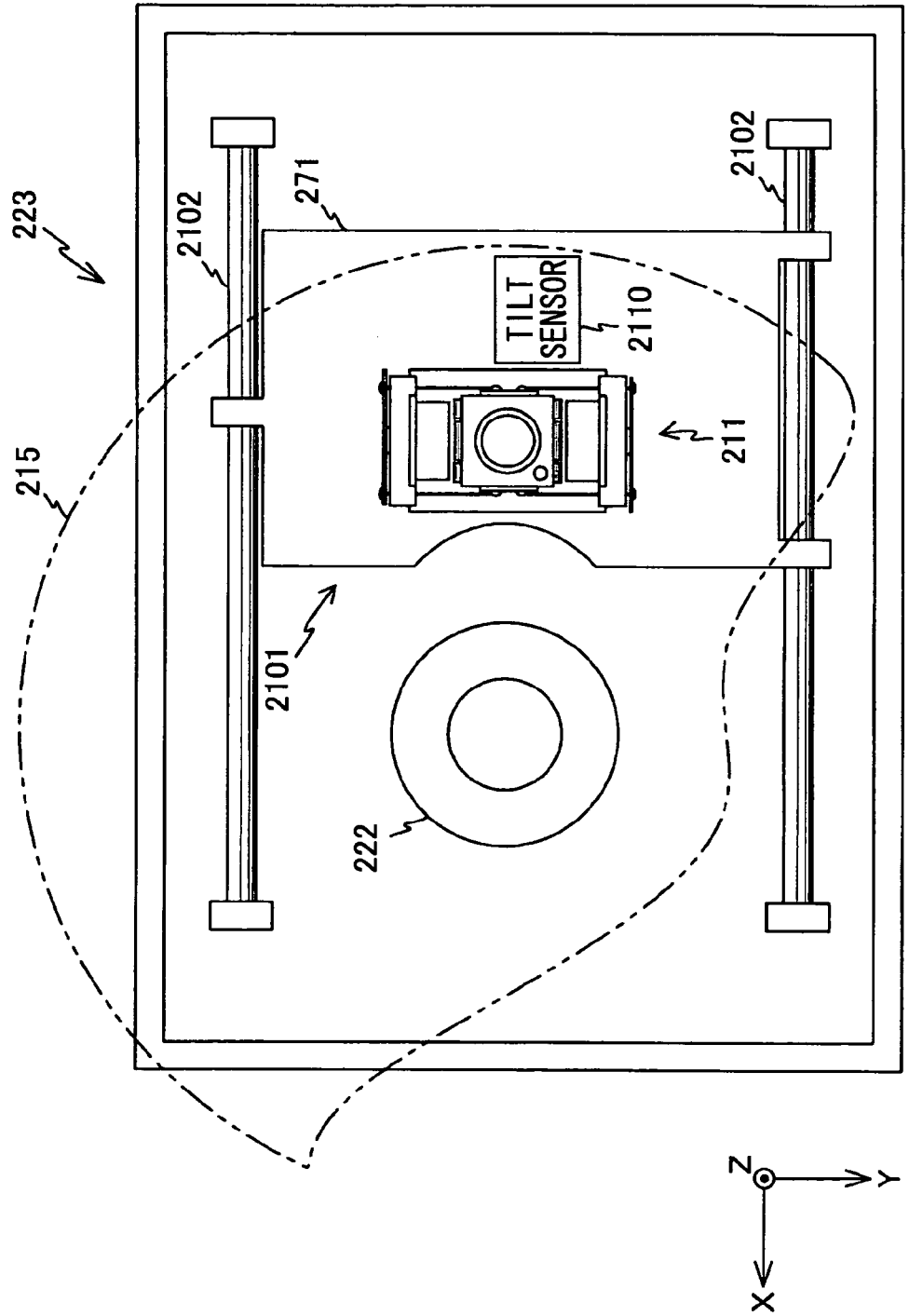
FIG. 25 is a schematic diagram showing the configuration of an optical pickup apparatus shown in FIG. 24.

FIG. 25 is a schematic diagram showing the configuration of an optical pickup apparatus 223 according to an embodiment of the present invention. The optical pickup apparatus 223 includes a pickup body 2101, a seek rail 2102, a seek motor (not shown) and a tilt sensor 2110. The pickup body 2101 applies a laser light to the recording surface of the optical disk 215 rotated by the spindle motor 222. The seek rail 2102 supports the pickup body 2101, and guides the pickup body 2101 movable to the X directions. The seek motor activates the pickup body 2101 in the X-axis directions.

The pickup body 2101 includes a housing 271, a light beam emitting system 212 (shown in FIG. 25), and a converging system 211. The light beam emitting system 212 is disposed in the housing 271, and emits a light beam of 660 nm wavelength to the recording surface of the optical disk 215. The converging system 211 converges the light beam from the light beam emitting system 212 to a predetermined position on the recording surface of the optical disk 215.

Figure 26:
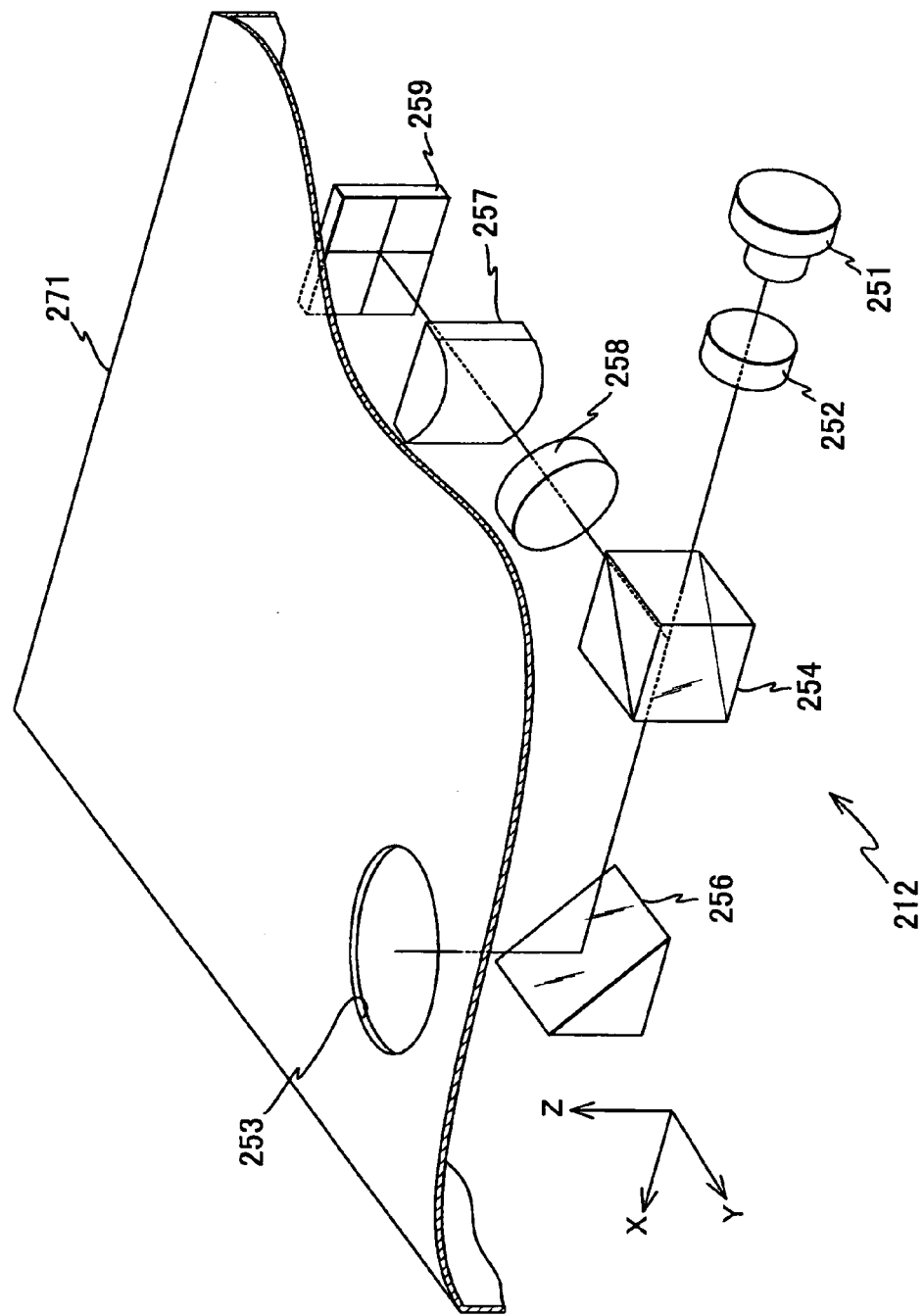
FIG. 26 is a schematic diagram showing the configuration of an optical system of the optical pickup apparatus.

As shown in FIG. 26, the light beam emitting system 212 includes a light source unit 251, a collimator lens 252, a beam splitter 254, a deflection mirror 256, a detection lens 258, a cylindrical lens 257, and a photo detector 259.

The light source unit 251 includes a semiconductor laser (not shown) as a signal light source that emits a light beam of 660 nm wavelength. The light source unit 251 is fixed on the housing 271 so that the intensity of the light beam emitted by the light source unit 251 in the X-axis directions becomes maximum.

The collimator lens 252 is disposed at +X side of the light source unit 251, and makes the light beam emitted by the light source unit 251 substantially parallel. The beam splitter 254 is disposed at +X side of the collimator lens 252. The light beam traveling through the collimator lens 252 transmits through the beam splitter 254 as is, but a reflective light from the recording surface of the optical disk 215 is split to −Y direction. The deflection mirror 256 is disposed at +X side of the beam splitter 254, and deflects the light beam transmitted through the beam splitter 254 to +Z direction. The deflected light beam by the deflection mirror 256 hits the converging system 211 via an aperture 253 provided on the housing 271.

The detection lens 258 is disposed at −Y side of the beam splitter 254, and converges the reflective light beam split by the beam splitter 254 to the −Y direction. The cylindrical lens 257 is disposed at the −Y side of the detection lens 258, and reforms the reflective light beam converged by the detection lens 258. The photo detector 259 is disposed at −Y side of the cylindrical lens 257, and receives the reflective light beam reformed by the cylindrical lens 257. The photo detector 259 is quartered into four photo detecting units in the same manner as a usual optical disk apparatus. Each photo detecting unit outputs a signal depending on the amount of received light to the reproduced signal processing circuit 28. That is, an optical path that guides the light beam emitted by the light source unit 251 to the converging system 211 and guides the reflective light beam to the photo detector 259 is provided in the housing 271.

Figure 27:
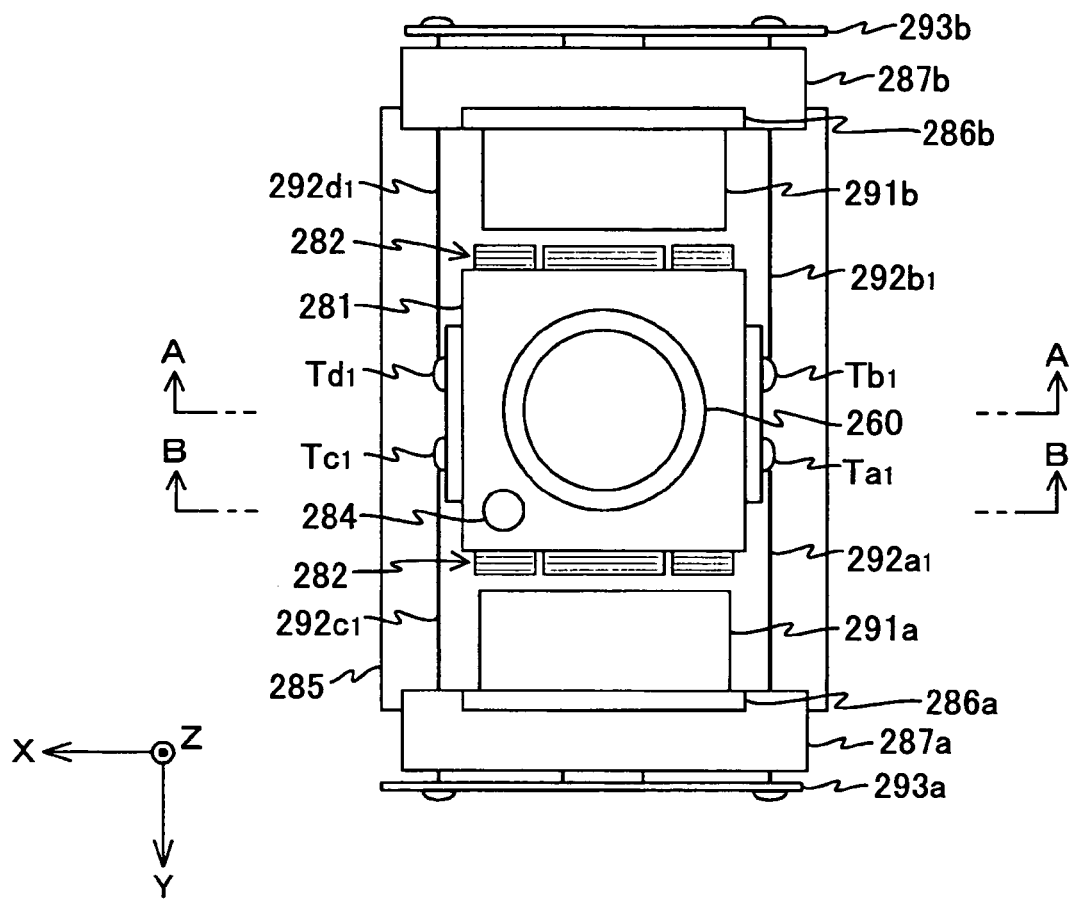
FIG. 27 is a schematic diagram showing the configuration of an light converging system of the optical pickup according to an embodiment.
Figure 28:
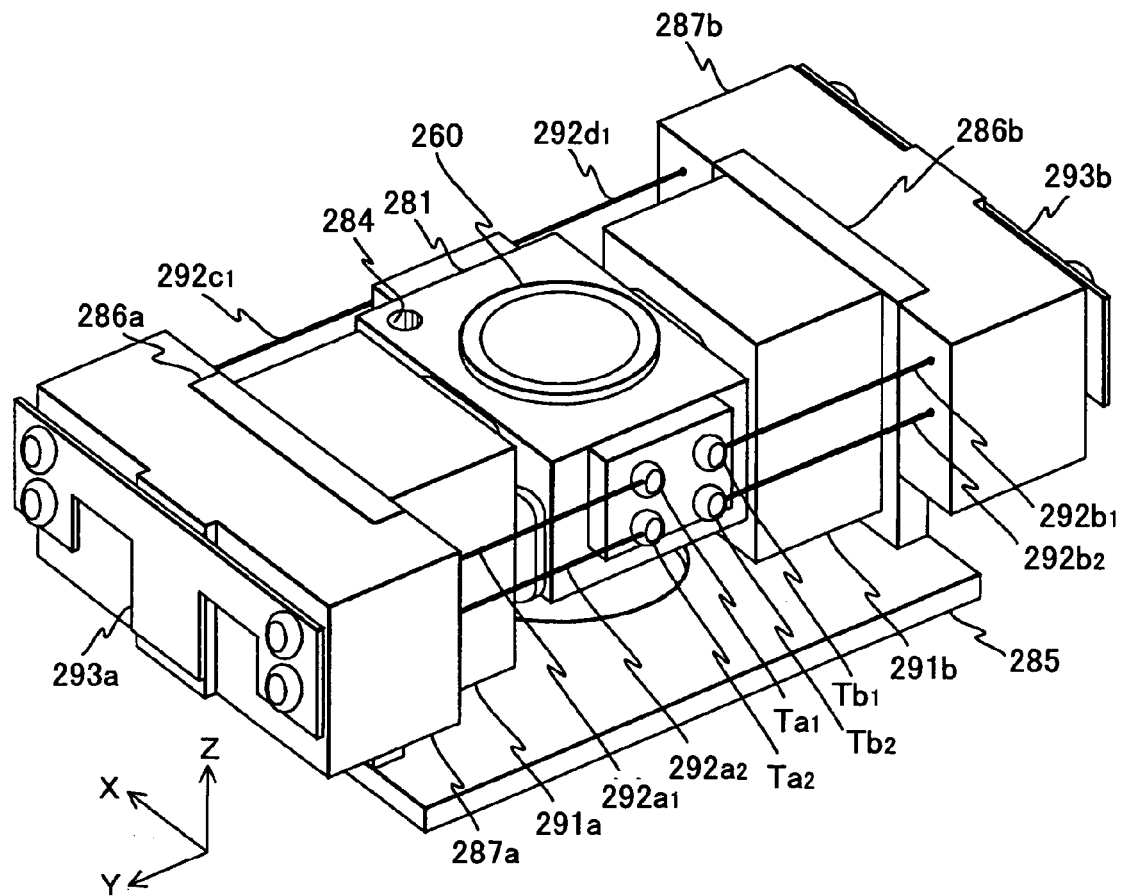
FIG. 28 is a perspective view of the light converging system shown in FIG. 27.

The converging system 211 includes an object lens 260, a lens holder 281, two activation coils 282, a base plate 285, two yokes 286a and 286b, two permanent magnets 291a and 291b, two stems 287a and 287b, eight conductive linear springs $292a_1$, $292a_2$, $292b_1$, $292b_2$, $292c_1$, $292c_2$, $292d_1$, and $292d_2$, and two boards 293a and 293b. The linear spring 292c2 is disposed at −Z side of the linear spring $292c_1$, and the linear spring $292d_2$ is disposed at −Z side of the linear spring $292d_1$ as shown in FIGS. 27 and 28.

The base plate 285 is a plate member having a rectangular shape. An aperture is provided substantially at the center of the base plate 285, the aperture being almost the same shaped as the aperture 253 provided in the housing 271. The length directions of the base plate 285 almost matches the Y-axis directions. A face of the base plate 285 is adhered to a face of the housing 271 at +Z side so that the aperture of the base plate 285 matches the aperture 253 provided on the housing 271. In addition, the base plate 285 functions as a yoke that forms a magnetic circuit.

The yoke 286a and the yoke 286b are plate members having almost the same shape, and are fixed on the base plate 285 having a specific positional relation. The yoke 286a is disposed at an end at +Y side of the base plate 285, and the yoke 286b is disposed at an end at −Y side of the base plate 285.

The stem 287a and the stem 287b are block-shaped members of almost the same shape. The stem 287a is disposed at +Y side of the yoke 286a, and the stem 287b is disposed at −Y side of the yoke 286b. Two through holes extending in the Y-axis directions are provided near the edge of each stem at the −X side, and other two through holes extending in the Y-axis directions are provided near the edge of each stem at the +X side. The stem 287a and the yoke 286a are combined together, and the stem 287b and the yoke 286b are combined together.

The permanent magnets 291a and 291b are block-shaped permanent magnets having almost the same shape. The permanent magnet 291a is adhered to a face of the −Y side of the yoke 286a, and the permanent magnet 291b is adhered to a face of the +Y side of the yoke 286b. The face at the −Y side of the permanent magnet 291a and the face at the +Y side of the permanent magnet 291b are opposite each other.

The boards 293a and 293b are plate-shaped members having almost the same shape. The board 293a is fixed to the +Y side face of the stem 287a via a dumper member in part, and is provided with multiple input terminals and multiple output terminals. The board 293b is fixed to the −Y side face of the stem 287b via a dumper member in part, and is provided with multiple input terminals and multiple output terminals. Multiple signal lines from the motor driver 227 are connected to respective input terminals of the board. The boards can flexibly bend in the Y-axis directions to absorb vibration in the Y-axis directions.

Figure 29:
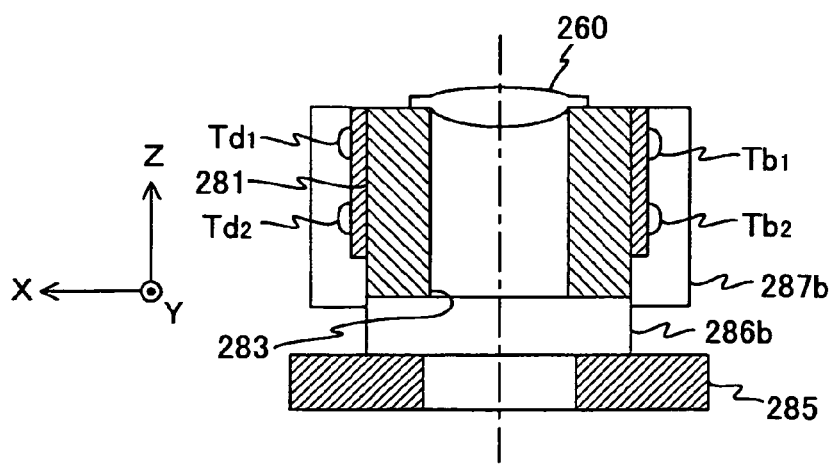
FIG. 29 is a sectional view of the light converging system shown in FIG. 27 along a line A-A.
Figure 30:
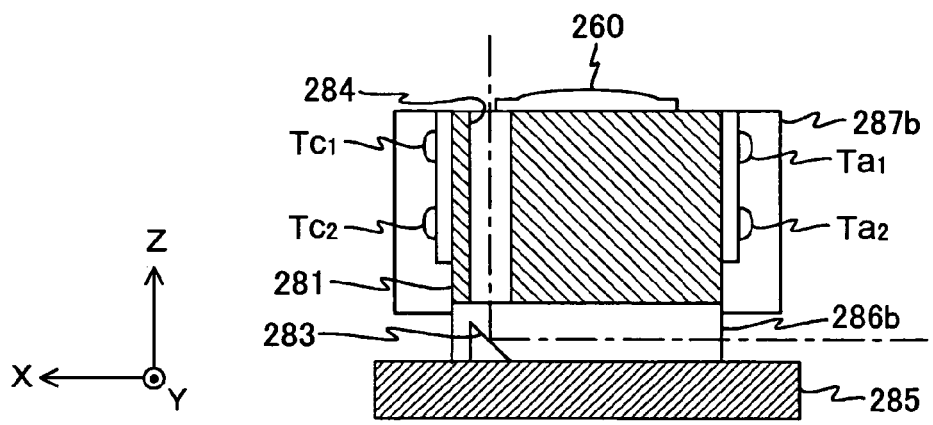
FIG. 30 is a sectional view of the light converging system shown in FIG. 27 along a line B-B.
Figure 31:
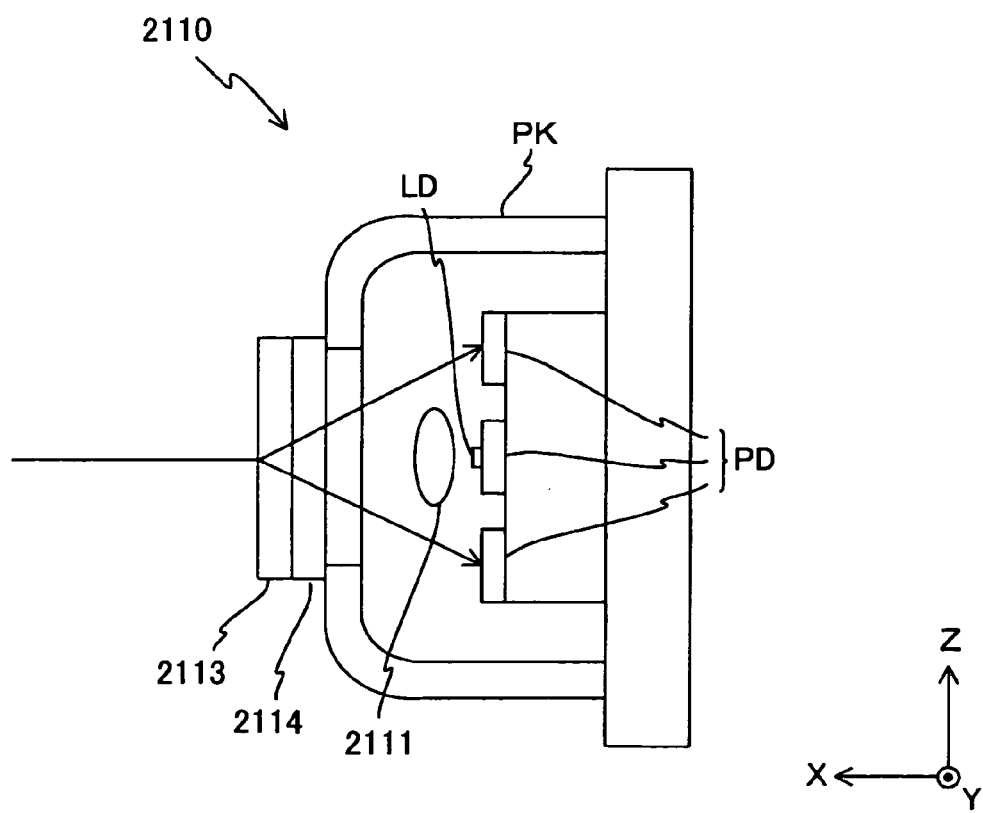
FIG. 31 is schematic diagram for explaining the tilt sensor shown in FIG. 25.

The lens holder 281 is a member of which shape is similar to a cubic, and is disposed between the permanent magnet 291a and the permanent magnet 291b. As shown in FIG. 29 that is a cross section of FIG. 27 along a line A-A, a through hole 283 extending in the Z-axis directions through which a light beam from the light beam emitting system 212 is formed in the middle of the lens holder 281. The object lens 260 is disposed at an end of the through hole at the +Z side so that the light axis of the object lens 260 and the center axis of the through hole 283 substantially match. As shown in FIG. 30 which is a cross-section of FIG. 26 along a line B-B, a through hole 284 extending in the Z-axis directions which becomes the optical path of the light beam for detecting media tilt at a corner of the lens holder 281. The reflective mirror 283 for deflecting the optical path is disposed on the base plate 285 just under the through hole 284.

The actuating coil 282 is combined with the lens holder 281 with a specific positional relation. Since the object lens 260, the lens holder 281, and the actuating coil 282 moves together, the combination of the object lens 260, the lens holder 281, and the actuating coil 282 is referred to as a movable unit.

Eight terminals ($Ta_1$, $Ta_2$, $Tb_1$, $Tb_2$, $Tc_1$, $Tc_2$, $Td_1$, and $Td_2$) are provided on the lens holder 281 for providing a driving current to the actuating coil 282. The terminals $Ta_1$, $Ta_2$, $Tb_1$, and $Tb_2$ are provided on a face of the lens holder 281 at the −X side, and the terminals $Tc_1$, $Tc_2$, $Td_1$, and $Td_2$ are provided on a face of the lens holder 281 at the +X side. An end of the linear spring 292a1 is connected to the terminal Ta1. An end of the linear spring 292a2 is connected to the terminal Ta2. An end of the linear spring 292b1 is connected to the terminal Tb1. An end of the linear spring 292b2 is connected to the terminal Tb2. An end of the linear spring 292c1 is connected to the terminal Tc1. An end of the linear spring 292c2 is connected to the terminal Tc2. An end of the linear spring 292d1 is connected to the terminal Td1. An end of the linear spring 292d2 is connected to the terminal Td2.

Each linear spring extends in the Y-axis directions. The other ends of the linear springs 292a1, 292a2, 292c1, and 292c2 are connected by soldering, for example, to respective output terminals provided on the board 293a via the through hole provided on the stem 287a. The other ends of the linear springs 292b1, 292b2, 292d1, and 292d2 are connected by soldering, for example, to respective output terminals provided on the board 293b via the through hole provided on the stem 287b. That is, the moving unit is elastically supported by the stems via the linear springs.

The actuating coil 282 includes a focus coil for activating the movable unit in the Z-axis directions, a tracking coil for activating the movable unit in the X-axis directions, and a radial tilt coil for rotating the movable unit around a rotative axis in the Y-axis directions, and a tangential tilt coil for rotating the movable unit around a rotative axis in the X-axis directions.

When a driving current is provided to the focus coil, the movable unit is activated to the +Z direction (or −Z direction). The direction of activation can be controlled by switching the current direction in the focus coil.

When a driving current is provided to the tracking coil, the movable unit is activated to the +X direction (or −X direction). The direction of activation can be controlled by switching the current direction in the tracking coil.

When a driving current is provided to the radial tilt coil, the movable unit is rotated around a rotative axis in the Y-axis directions. The direction of rotation (clock-wise or counter clock-wise) can be controlled by switching the current direction in the radial tilt coil.

When a driving current is provided to the tangential tilt coil, the movable unit is rotated around a rotative axis in the X-axis directions. The direction of rotation (clock-wise or counter clock-wise) can be controlled by switching the current direction in the tangential tilt coil.

The function of the light beam emitting system 212 and the converging system 211 as configured as described above are described below.

The light beam emitted by the light source unit 251 in the +X direction is made substantially parallel by the collimator lens 252, and enter the beam splitter 254. The light beam transmitting through the beam splitter 254 is deflected by the deflection mirror 256 to the +Z directions. The deflected light beam enters the converging system 211 via the aperture 253 of the housing 271 and the aperture of the base plate 285. The light beam entering the converging system 211 travels to the object lens 260 via the through hole 283 of the lens holder 281. The light beam is converged by the object lens 260 and forms a small spot on the recording surface of the optical disk 215.

The reflective light reflected by the recording surface of the optical disk 215 is made substantially parallel by the object lens 260, travels through the through hole 283, the aperture of the base plate 285, and the aperture 253 of the housing 271, and hits the deflection mirror 256. The optical path of the light beam is bent to the −X direction, and the light beam enters the beam splitter 254. The light beam is split by the beam splitter 254 in the −Y directions, and received by the photo detector via the detection lens 258 and the cylindrical lens 257. Each photo detecting unit included in the photo detector 259 generates a current signal in accordance with the amount of received light. The current signals are output to the reproduced signal processing circuit 228.

The tilt sensor 2110 is disposed on the housing 271, and includes the following: a semiconductor laser LD, a coupling lens 2111, a photo detector PD, a hologram element 2113, and a hologram element 2114. The semiconductor laser LD, the coupling lens 2111, and the photo detector PD are stored in a package PK. The hologram elements 2113 and 2113 are formed on the package PK as one unit.

The semiconductor laser LD emits a light beam for detecting information related to the tilt of the optical disk 215 (an object). The tilt sensor 2110 is fixed on the housing 271 so that the directions in which the most intense light beam emitted by the semiconductor laser LD matches the +X axis directions.

The coupling lens 2111 is disposed at the +X side of the semiconductor laser LD, and makes the light beam emitted by the semiconductor laser LD substantially parallel.

Figure 32:
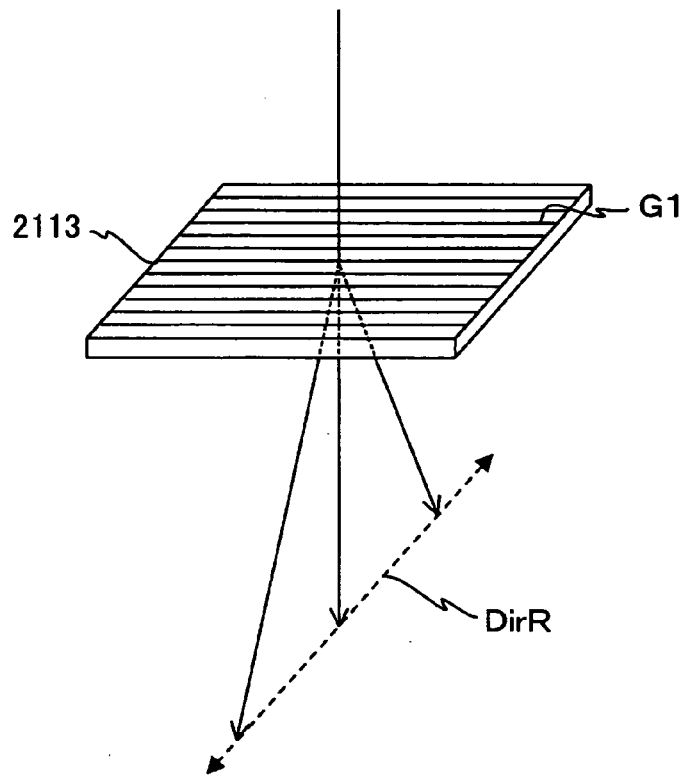
FIG. 32 is a schematic diagram for explaining the hologram element 2113 shown in FIG. 31.

As shown in FIG. 32, the hologram element 2113 includes a diffraction grating G1, the direction of grating is perpendicular to the radial direction (DirR). The hologram element 2113 diffracts the reflective light beam from the optical disk 215 in the radial direction DirR.

Figure 33:
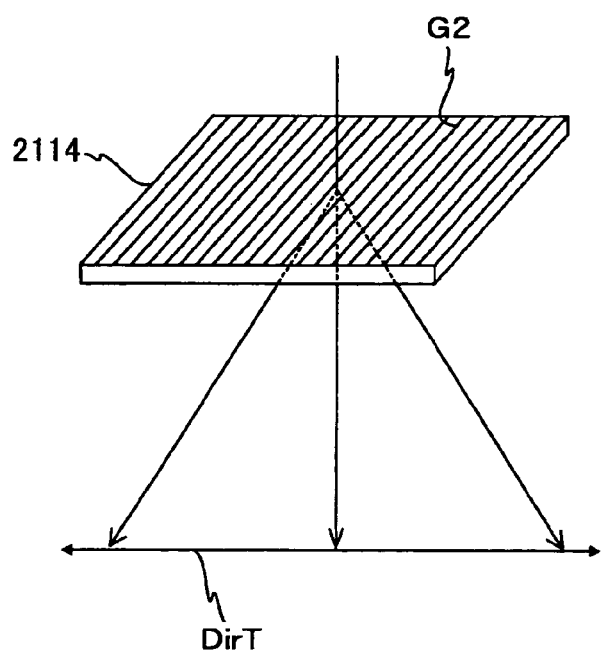
FIG. 33 is a schematic diagram for explaining a hologram element 2114 shown in FIG. 31.

As shown in FIG. 33, the hologram element 2113 includes a diffraction grating G2, the direction of grating is perpendicular to the tangential direction (DirT). The hologram element 2113 diffracts the diffracted light diffracted by the hologram element 2113 and the 0-order light through the hologram element in the tangential direction DirT.

Since the radial direction and the tangential direction are perpendicular each other, the direction of the grating G1 formed in the hologram element 2113 and the direction of the grating G2 formed in the hologram element 2114.

Figure 34:
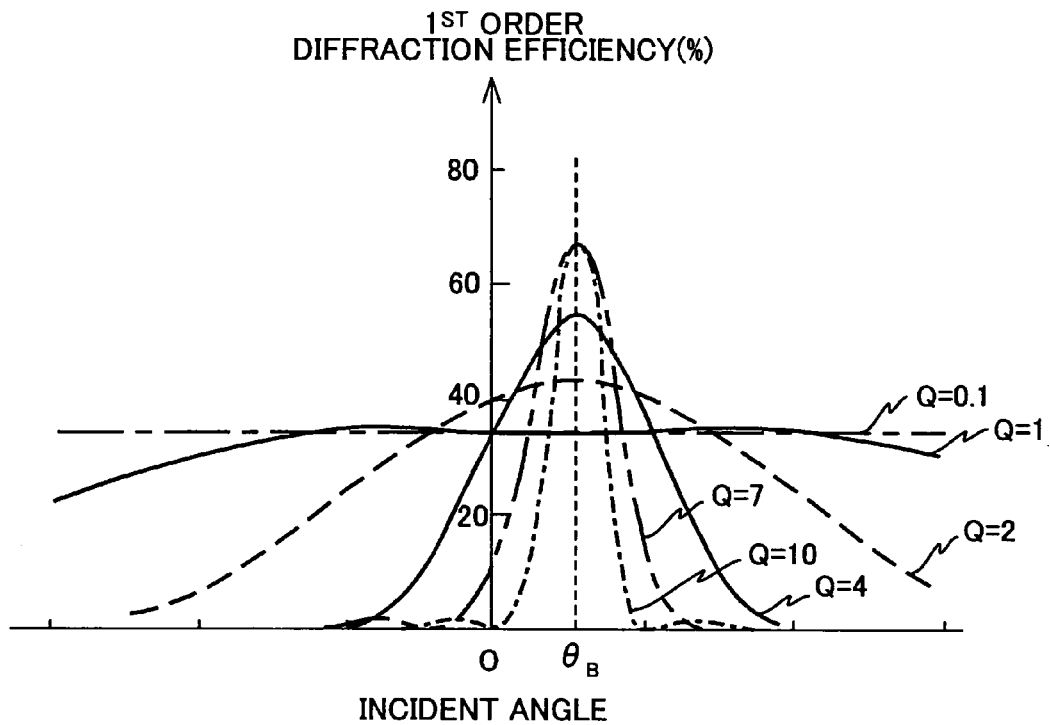
FIG. 34 is a graph for explaining a diffraction efficiency of a hologram.

According to the document "Light Wave Electronics" cited above, the diffraction characteristic of a hologram depends on the value of a parameter Q-factor, which is computed in the above formula (2) as shown in FIG. 34.

The diffraction efficiency of a hologram of $Q \leq 0.5$ does not depend on the incident angle of the light. The diffraction efficiency of a hologram of $Q \geq 2$, however, depends on the incident angle of the light, and becomes the maximum at a specific incident angle θB (Bragg's angle). The Bragg's angle θB can be computed with the following formula (12):

$$\theta B = \sin^{-1}(\lambda/2P) \quad (12)$$

If the Q-factor exceeds 10, the diffraction efficiency around the incident angle 0 degree becomes low. Accordingly, the grating depth and grating pitch may be determined so that the Q-factor satisfies $2 \leq Q \leq 10$. The light beam incident to the hologram element 2113 is diffracted at a diffraction efficiency determined by the incident angle in the radial direction DirR, and the light beam incident to the hologram element 2114 is diffracted at a diffraction efficiency determined by the incident angle in the tangential direction DirT.

Figure 35:
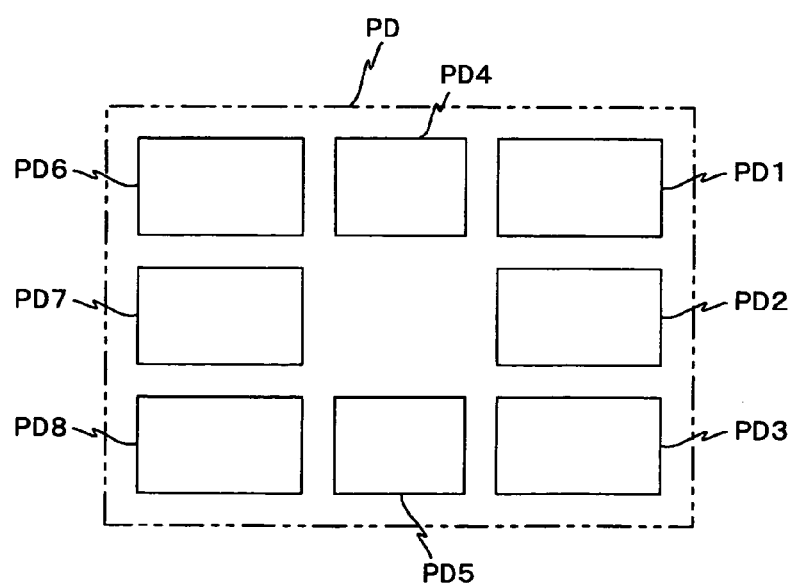
FIG. 35 is a schematic diagram for explaining the photo detector shown in FIG. 31.
Figure 36:
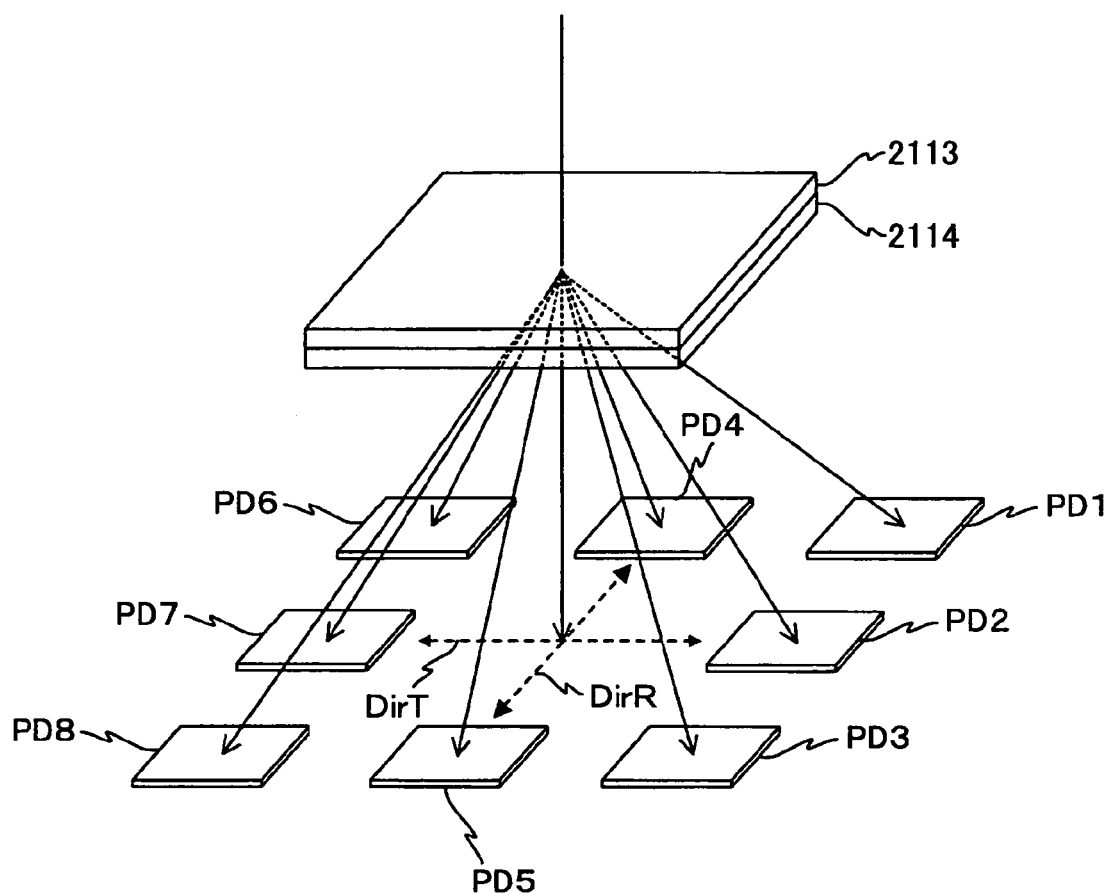
FIG. 36 is a schematic diagram showing the relation between diffraction light and photo detecting units.

As shown in FIG. 35, the photo detector PD includes eight photo detecting units PD1, PD2, PD3, PD4, PD5, PD6, PD7, and PD8, for example. A semiconductor laser LD is disposed in a region surrounded by the eight photo detecting units.

In an exemplary embodiment shown in FIG. 35, the photo detecting unit PD1 receives the light diffracted by the hologram 2113 as the +1st order diffraction light and diffracted by the hologram 2114 as the +1st order diffraction light. The photo detecting unit PD2 receives the light diffracted by the hologram 2113 as the +1st order diffraction light and diffracted by the hologram 2114 as the 0 order light. The photo detecting unit PD3 receives the light diffracted by the hologram 2113 as the +1st order diffraction light and diffracted by the hologram 2114 as the −1st order diffraction light. The photo detecting unit PD4 receives the light diffracted by the hologram 2113 as the 0 order light and diffracted by the hologram 2114 as the +1st order diffraction light. The photo detecting unit PD5 receives the light diffracted by the hologram 2113 as the 0 order light and diffracted by the hologram 2114 as the −1st order diffraction light. The photo detecting unit PD6 receives the light diffracted by the hologram 2113 as the −1st order diffraction light and diffracted by the hologram 2113 as the +1st order diffraction light. The photo detecting unit PD7 receives the light diffracted by the hologram 2113 as the −1st order diffraction light and diffracted by the hologram 2114 as the 0 order light. The photo detecting unit PD8 receives the light diffracted by the hologram 2113 as the −1st order diffraction light and diffracted by the hologram 2114 as the −1st order diffraction light.

According to the present embodiment, the diffraction light from the hologram element 2114 may enter the photo detecting units not through the coupling lens 2111.

The function of the tilt sensor 2110 configured as described above is described below. In an exemplary embodiment of the present invention, the reference plane of the tilt sensor 2110 is assumed to be an imaginary plane perpendicular to the light axis of the object lens 260 in a state in which the movable unit stays in a reference attitude in which the tilt in the radial directions and the tilt in the tangential directions are almost 0.

The light beam emitted by the semiconductor laser LD in the +X direction is made substantially parallel by the coupling lens 2111, and hits the hologram element 2114. The light beam transmits through the hologram element 2114, and hits the hologram element 2113. The light beam that transmits through the hologram element 2113 is deflected to the +Z direction by the reflective mirror 283, and hits the optical disk 215 through the through-hole 284.

The light beam is reflected by the optical disk 215. The reflective light beam hits the reflective mirror 283 through the throughhole 284. The reflective light beam is deflected by the reflective mirror 283 to the −X direction, and then, hits the hologram element 2113. The reflective light beam is diffracted by the hologram element 2113 at a diffraction efficiency depending on the incident angle in the radial directions DirR. The 0 order light of the reflective light beam and the +/−1st order diffraction light of the reflective light beam hit the hologram 2114, and are diffracted by the hologram element 2114 at a diffraction efficiency depending on the incident angle in the tangential directions DirT. The +/−1st order diffraction light is received by the photo detecting units of the photo detector PD, and converted into current signals depending on the amount of received diffraction light. The current signals are output to the reproduced signal processing circuit 28.

Figure 37:
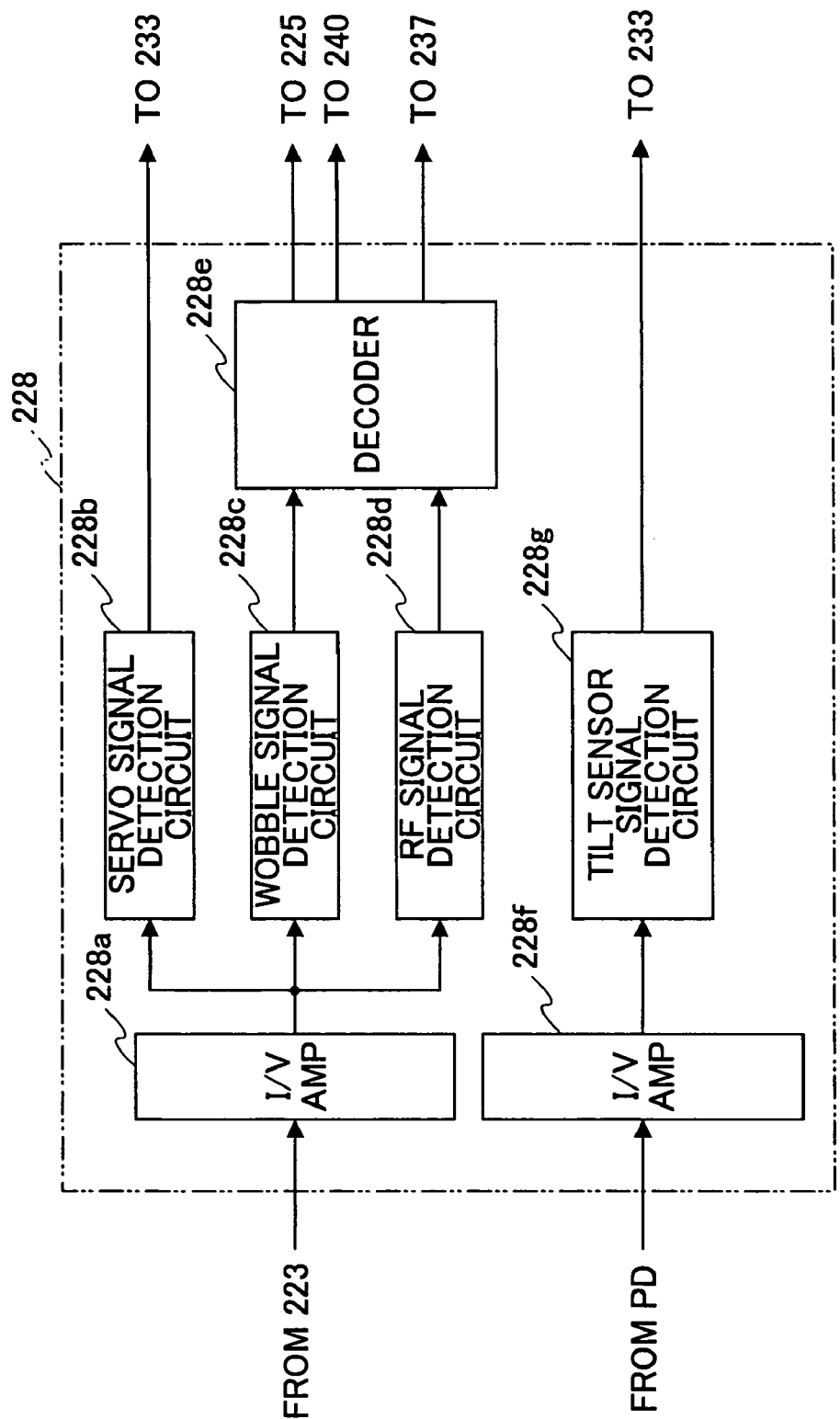
FIG. 37 is a block diagram for explaining the configuration of a reproduced signal processing circuit shown in FIG. 24.

As shown in FIG. 37, the reproduced signal processing circuit 228 includes two I/V amps 228a and 228f, a servo signal detection circuit 228b, a wobble signal detection circuit 228c, a RF signal detection circuit 228d, a decoder 228e, and a tilt detection circuit 228g.

The I/V amp 228a converts a current signal output by the photo detector 259 into a voltage signal, and amplifies with a predetermined gain. The servo signal detection circuit 228b detects servo signals such as a focus error signal and a track error signal based on the voltage signal from the I/V amp 228a. The detected servo signals are output to the servo controller 233. The wobble signal detection circuit 228c detects a wobble signal based on the voltage signal from the I/V amp 228a. The RF signal detection circuit 228d detects a RF signal based on the voltage signal from the I/V amp 228a. The decoder 228e extracts ADIP Address In Pregroove) information and a sync signal from the detected wobble signal. The extracted ADIP information is output to the CPU 240, and the sync signal is output to the encoder 225. The decoder 228e decodes the RF signal detected by the RF signal detection circuit 228d, and detects errors. If any error is detected, the decoder 228e corrects the errors, and stores the reproduced data in the buffer RAM 234 via the buffer manager 237.

The I/V amp 228f converts a current signal output by the photo detector PD into a voltage signal, and amplifies with a predetermined gain.

Figure 38:
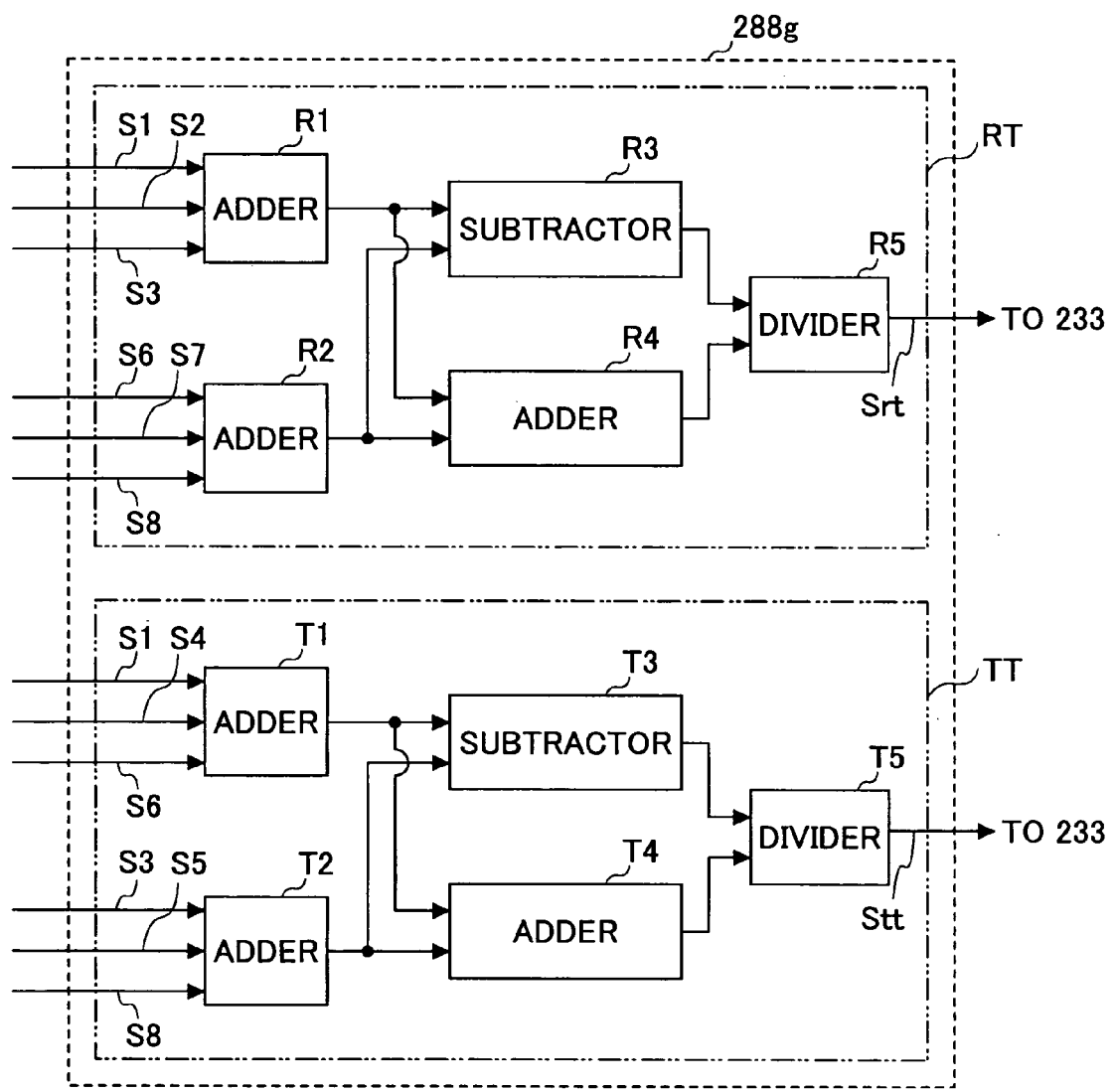
FIG. 38 is a block diagram for explaining the configuration of a tilt detection circuit shown in FIG. 37.

The tilt detection circuit 228g detects information related to the radial tilt and information related the tangential tilt based on the voltage signal from the I/V amp 228f. The information detected by the tilt detection circuit 228g is output to the servo controller 233. As shown in FIG. 38, the tilt detection circuit 228g includes a radial tilt detection circuit RT and a tangential tilt detection circuit TT, for example.

The radial tilt detection circuit RT includes three adders R1, R2, and R4, a subtractor R3, and a divider R5.

The adder R1 generates a signal in which the output signals S1, S2, and S3 from the I/V amp 228f are added. The signal S1 is an output signal from the I/V amp 228f corresponding to the output signal from the photo detector PD1. The signal S2 is an output signal from the I/V amp 228f corresponding to the output signal from the photo detector PD2. The signal S3 is an output signal from the I/V amp 228f corresponding to the output signal from the photo detector PD3. The output signal of the adder R1 contains information related to the light intensity of the +1st order diffraction light of the hologram element 2113.

The adder R2 generates a signal in which the output signals S6, S7, and S8 from the I/V amp 228f are added. The signal S6 is an output signal from the I/V amp 228f corresponding to the output signal from the photo detector PD6. The signal S7 is an output signal from the I/V amp 228f corresponding to the output signal from the photo detector PD7. The signal S8 is an output signal from the I/V amp 228f corresponding to the output signal from the photo detector PD8. The output signal of the adder R2 contains information related to the light intensity of the −1st order diffraction light of the hologram element 2113.

The subtractor R3 generates a signal in which the output signal from the adder R2 is subtracted from the output signal from the adder R1. The output signal from the subtractor R3 contains information related to the difference between the light intensity of the +1st order diffraction light and the light intensity of the −1st order diffraction light of the hologram element 2113.

The adder R4 generates a signal in which the output signal from the adder R1 and the output signal from the adder R2 are added. The output signal from the adder R4 contains information related to the sum of the light intensity of the +1st order diffraction light and the light intensity of the −1st order diffraction light of the hologram element 2113.

The divider R5 generates a signal in which the output signal of the subtractor R3 is divided by the output signal of the adder R4. The generated signal Srt contains information related to the radial tilt, and is output to the servo controller 233. The output signal Srt (may be referred to as a radial tilt information signal) is expressed by the following equation.

$$Srt=[(S1+S2+S3)-(S6+S7+S8)]/(S1+S2+S3+S6+S7+S8) \quad (13)$$

Figure 39:
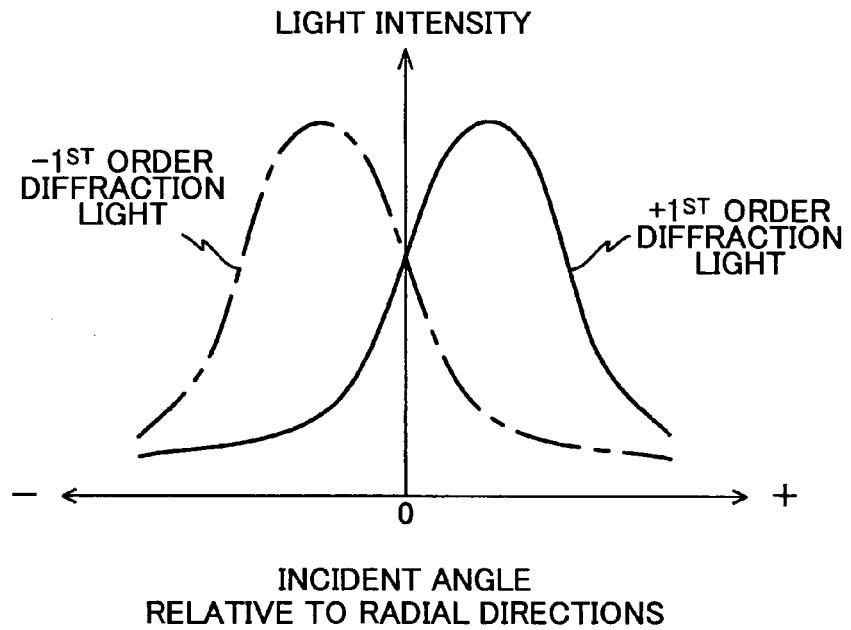
FIG. 39 is a graph for explaining the relation between a diffraction efficiency and incident angle of the hologram element 2113.
Figure 40:
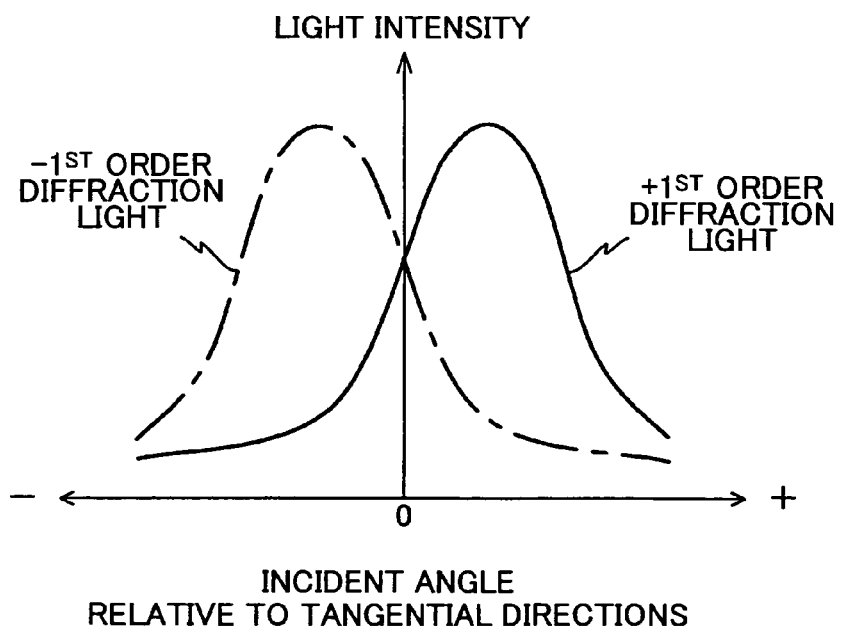
FIG. 40 is a graph for explaining the relation between a diffraction efficiency and incident angle of the hologram element 2114.

In the present exemplary embodiment, if the direction perpendicular to the recording surface of the optical disk 215 matches the Z-axis directions with respect to the radial directions, the incident angle related to the radial directions DirR of the reflective light beam incident to the hologram element 2113 becomes 0 degree. As a result, as shown in FIG. 39, if the tilt of the optical disk 215 is about 0 degree with respect to the radial directions, the light intensity of the +1st order diffraction light and the light intensity of the −1st order diffraction light becomes substantially equal, and the radial tilt information signal Srt becomes about 0 level. If the tilt of the optical disk 215 is θr (≠0) with respect to the radial directions, the incident angle of the reflective light beam changes with respect to the radial directions, which result in a difference between the light intensity of the +1st order diffraction light and the −1st order diffraction light.

In the present embodiment, as shown in FIG. 39, it is assumed that, if θr>0 degree, the light intensity of the +1st order diffraction light becomes greater than the light intensity of the −1st order diffraction light, and that if θr<0 degree, the light intensity of the −1st order diffraction light becomes greater than the light intensity of the +1st order diffraction light. Accordingly, the differential signal between the +1st order diffraction light and the light intensity of the −1 diffraction light contains information related to the radial tilt.

The radial tilt information signal Srt is a signal in which the differential signal between the +1st order diffraction light and the −1st order diffraction light is divided by the sum of the light intensity of the +1st order diffraction light and the light intensity of the −1st order diffraction light. As a result, even if the reflection index of the optical disk changes, the radial tilt information signal Srt does not change.

Returning to FIG. 38, the tangential tilt detection circuit TT includes three adders T1, T2, and T4, a subtractor T3, and a divider T5.

The adder T1 generates a signal in which the output signals S1, S4, and S6 from the I/V amp 228f are added. The signal S1 is an output signal from the I/V amp 228f corresponding to the output signal from the photo detector PD1. The signal S4 is an output signal from the I/V amp 228f corresponding to the output signal from the photo detector PD4. The signal S6 is an output signal from the I/V amp 228f corresponding to the output signal from the photo detector PD6. The output signal of the adder T1 contains information related to the light intensity of the +1st order diffraction light of the hologram element 2114.

The adder T2 generates a signal in which the output signals S3, S5, and S8 from the I/V amp 228f are added. The signal S3 is an output signal from the I/V amp 228f corresponding to the output signal from the photo detector PD3. The signal S5 is an output signal from the I/V amp 228f corresponding to the output signal from the photo detector PD5. The signal S8 is an output signal from the I/V amp 228f corresponding to the output signal from the photo detector PD8. The output signal of the adder T2 contains information related to the light intensity of the −1st order diffraction light of the hologram element 2114.

The subtractor T3 generates a signal in which the output signal from the adder T2 is subtracted from the output signal from the adder T1. The output signal from the subtractor T3 contains information related to the difference between the light intensity of the +1st order diffraction light and the light intensity of the −1st order diffraction light of the hologram element 2114.

The adder T4 generates a signal in which the output signal from the adder T1 and the output signal from the adder T2 are added. The output signal from the adder T4 contains information related to the sum of the light intensity of the +1st order diffraction light and the light intensity of the −1st order diffraction light of the hologram element 2114.

The divider T5 generates a signal in which the output signal of the subtractor T3 is divided by the output signal of the adder T4. The generated signal Stt contains information related to the tangential tilt, and is output to the servo controller 233. The output signal Stt (may be referred to as a tangential tilt information signal) is expressed by the following equation.

$$Stt=[(S1+S4+S6)-(S3+S5+S8)]/(S1+S2+S3+S6+S7+S8) \quad (14)$$

In the present exemplary embodiment, if the direction perpendicular to the recording surface of the optical disk 215 matches the Z-axis directions with respect to the tangential directions, the incident angle related to the tangential directions DirT of the reflective light beam incident to the hologram element 2114 becomes 0 degree. As a result, as shown in FIG. 39, if the tilt of the optical disk 215 is about 0 degree with respect to the tangential directions, the light intensity of the +1st order diffraction light and the light intensity of the −1st order diffraction light becomes substantially equal, and the tangential tilt information signal Stt becomes about 0 level. If the tilt of the optical disk 215 is θt (≠0) with respect to the tangential directions, the incident angle of the reflective light beam changes with respect to the tangential directions, which result in a difference between the light intensity of the +1st order diffraction light and the −1st order diffraction light.

In the present embodiment, as shown in FIG. 39, it is assumed that, if θt>0 degree, the light intensity of the +1st order diffraction light becomes greater than the light intensity of the −1st order diffraction light, and that if θt<0 degree, the light intensity of the −1st order diffraction light becomes greater than the light intensity of the +1st order diffraction light. Accordingly, the differential signal between the light intensity of the +1st order diffraction light and the light intensity of the −1 diffraction light contains information related to the tangential tilt.

The tangential tilt information signal Stt is a signal in which the differential signal between the +1st order diffraction light and the −1st order diffraction light is divided by the sum of the light intensity of the +1st order diffraction light and the light intensity of the −1st order diffraction light. As a result, even if the reflection index of the optical disk changes, the tangential tilt information signal Stt does not change.

Returning to FIG. 24, the servo controller 233 generates various control signals based on signals output by the reproduced signal processing circuit 228. A focus control signal is generated for adjusting the focus error based on the focus error signal. A track control signal is generated for adjusting the track error based on the track error signal. A radial tilt control signal is generated for adjusting the radial tilt based on the radial tilt information signal Srt. A tangential tilt control signal is generated for adjusting the tangential tilt based on the tangential tilt information signal Stt.

The generated control signals are output to the motor driver 227. The relation between the focus error signal and the focus control signal, the relation between the track error signal and the track control signal, the relation between the radial tilt information signal Srt and the radial tilt control signal, and the relation between the tangential tilt information signal Stt and the tangential tilt control signal are obtained in advance, and are stored in the data region of the flash memory 239.

The motor driver 227 outputs a driving current (or driving voltage) depending on the control signals. In the present embodiment, a driving current for driving the focus coil is provided to the optical pickup apparatus 223 in accordance with the focus control signal, and a driving current for driving the tracking coil is provided to the optical pickup apparatus 223 in accordance with the track control signal. That is, the servo signal detection circuit 228b, the servo controller 233, and the motor driver 227 performs the tracking control and the focus control. In addition, a driving current for driving the radial tilt coil is provided to the optical pickup apparatus 223 in accordance with the radial tilt control signal, and a driving current for driving the tangential tilt coil is provided to the optical pickup apparatus 223 in accordance with the tangential tilt control signal. That is, the tilt detection circuit 228g, the servo controller 233, and the motor driver 227 perform the radial tilt control and the tangential tilt control.

The motor driver 227, in response to the control signal from the CPU 240, output driving currents (or driving voltages) to the spindle motor 222 and the seek motor.

A description is given below about the control of the position and the attitude of the object lens 260 of the optical disk apparatus 220.

<<Focus Control>>

1. The reproduced signal processing circuit 228 converts the output signal from the photo detector 259 into a voltage signal with the I/V amp 228a, and then, detects the focus error signal with the servo signal detection circuit 228b, and output to the servo controller 233.

2. The servo controller 233, based on the focus error signal, generates the focus control signal, and outputs to the motor driver 227.

3. The motor driver 227 outputs a driving current for controlling focusing corresponding to the focus control signal to the optical pickup apparatus 223.

4. The optical pickup apparatus 223 provides the driving current for controlling focus from the motor driver 227 to the focus coil via a predetermined input terminal of the boards and predetermined linear springs. As a result, an activating force depending on the amount of the driving current and the direction of the current is generated in the Z axis directions, and the movable unit is activated in the Z axis directions. As a result, the object lens 260 shifts in the Z axis directions, and the focus error is adjusted.

<<Tracking Control>>

1. The reproduced signal processing circuit 228 converts the output signal from the photo detector 259 into a voltage signal with the I/V amp 228a, and then, detects the track error signal with the servo signal detection circuit 228b, and output to the servo controller 233.

2. The servo controller 233, based on the track error signal, generates the track control signal, and outputs to the motor driver 227.

3. The motor driver 227 outputs a driving current for controlling tracking corresponding to the track control signal to the optical pickup apparatus 223.

4. The optical pickup apparatus 223 provides the driving current for controlling tracking from the motor driver 227 to the tracking coil via predetermined input terminals of the boards and predetermined linear springs. As a result, an activating force depending on the amount of the driving current and the direction of the current is generated in the X axis directions, and the movable unit is activated in the X axis directions. As a result, the object lens 260 shifts in the X axis directions, and the track error is adjusted.

<<Radial Tilt Control>>

1. The reproduced signal processing circuit 228 converts the output signal from the tilt sensor 242 into a voltage signal with the I/V amp 228a, and then, generates the radial tilt information signal Srt with the radial tilt detection circuit RT, and output to the servo controller 233.

2. The servo controller 233, based on the radial tilt information signal Srt, generates the radial tilt control signal, and outputs to the motor driver 227.

3. The motor driver 227 outputs a driving current for controlling radial tilt corresponding to the radial tilt control signal to the optical pickup apparatus 223.

4. The optical pickup apparatus 223 provides the driving current for controlling radial tilt from the motor driver 227 to the radial tilt coil via predetermined input terminals of the boards and predetermined linear springs. As a result, a rotative torque depending on the amount of the driving current and the direction of the current is generated in the Y axis directions, and the object lens 260 is rotated in the XZ plane, and the radial tilt is adjusted.

<<Tangential Tilt Control>>

1. The reproduced signal processing circuit 228 converts the output signal from the tilt sensor 242 into a voltage signal with the I/V amp 228a, and then, generates the tangential tilt information signal Stt with the tangential tilt detection circuit TT, and output to the servo controller 233.

2. The servo controller 233, based on the tangential tilt information signal Stt, generates the tangential tilt control signal, and outputs to the motor driver 227.

3. The motor driver 227 outputs a driving current for controlling tangential tilt corresponding to the tangential tilt control signal to the optical pickup apparatus 223.

4. The optical pickup apparatus 223 provides the driving current for controlling tangential tilt from the motor driver 227 to the radial tilt coil via predetermined input terminals of the boards and predetermined linear springs. As a result, a rotative torque depending on the amount of the driving current and the direction of the current is generated in the X axis directions, and the object lens 260 is rotated in the YZ plane, and the tangential tilt is adjusted.

<<Recording>>

Figure 41:
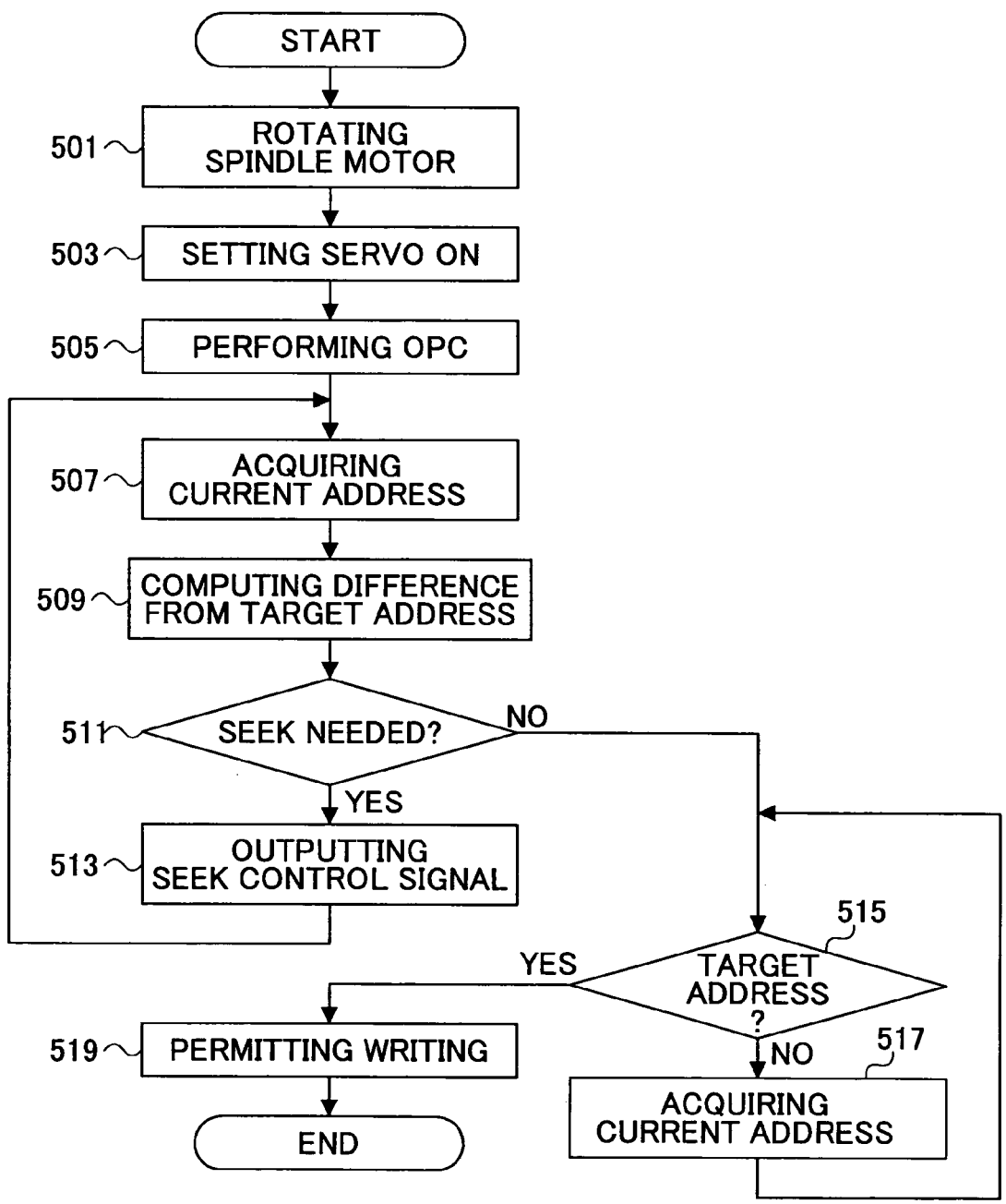
FIG. 41 is a flowchart of a recording operation performed by the optical disk apparatus in response to a command from a host computer.

A brief description is given to the operation of the optical disk apparatus 220 in response to receipt of a command requesting to record user data from the host computer with reference with FIG. 41. FIG. 41 is a flowchart showing processing by the CPU 240. When the CPU 240 receives the command requesting to record user data from the host computer, the top address of a computer program corresponding to the flowchart shown in FIG. 41 is set in the program counter of the CPU 240, and the CPU 240 starts executing the computer program.

In step 501, a control signal for controlling the rotation of the spindle motor 222 is output to the motor driver 227 based on a recording speed. Information that a request for recording user data is received from the host computer is given to the reproduced signal processing circuit 228. The CPU 240 gives an instruction to the buffer manager 237 for storing data received from the host computer in the buffer RAM 234.

In the next step 503, the CPU determines that the rotation of the optical disk 215 has reached a predetermined linear speed, and sets the servo controller 233 in a servo-on state. The servo controller 233 performs radial tilt control, tangential tilt control, tracking control, and focus control as described above. The radial tilt control, tangential tilt control, tracking control, and focus control are performed occasionally until the recording operation is completed.

In the next step 505, the CPU 240 performs Optimum Power Control (OPC) at the recording speed, and determines the optimum write power. In the process of OPC, the CPU 240 write predetermined data in a Power Calibration Area (PCA) changing write power step by step, and reproduces the written data. The CPU 240 determines a write power of which asymmetry value of the reproduced signal is closest to an experimentally-determined target value is determined to be the optimum write power.

In the next step 507, the CPU 240 acquires current address based on the ADIP information output by the decoder 228e.

In the next step 509, the CPU 240 compute the address difference between the current address and a target address extracted from the record request command.

In the next step 511, a determination is made of whether seek is needed based on the address difference. The CPU refers to a threshold stored in the flash memory 239 as an item of the seek information, and if the address difference exceed the threshold, the determination becomes positive. The process proceeds to step 513.

In step 513, the CPU outputs a control signal depending on the address difference to the motor driver 227. As a result, the seek motor is activated, and seek operation is performed. Then, the process returns to step 507.

In step 511, if the address difference does not exceed the threshold, the determination becomes negative, and the process proceeds to step 515.

In step 515, a determination is made of whether the current address matches the target address. If the current address does not match the target address, the determination becomes negative, and the process proceeds to step 517.

In step 517, the CPU 240 acquires current address based on the ADIP information. The process returns to step 515.

the process repeats steps 515 through 517 until the determination of step 515 becomes positive.

If the current address matches the target address, the determination in step 515 becomes positive, and the process proceeds to step 519.

In step 519, the CPU 240 permits the encoder 225 to write data. The data are written on the optical disk 215 via the encoder 225, the laser control circuit 224, and the optical pickup apparatus 223. When the writing of data is completed, predetermined ending processing is performed, and then, the process is terminated.

<<Reproducing>>

Figure 42:
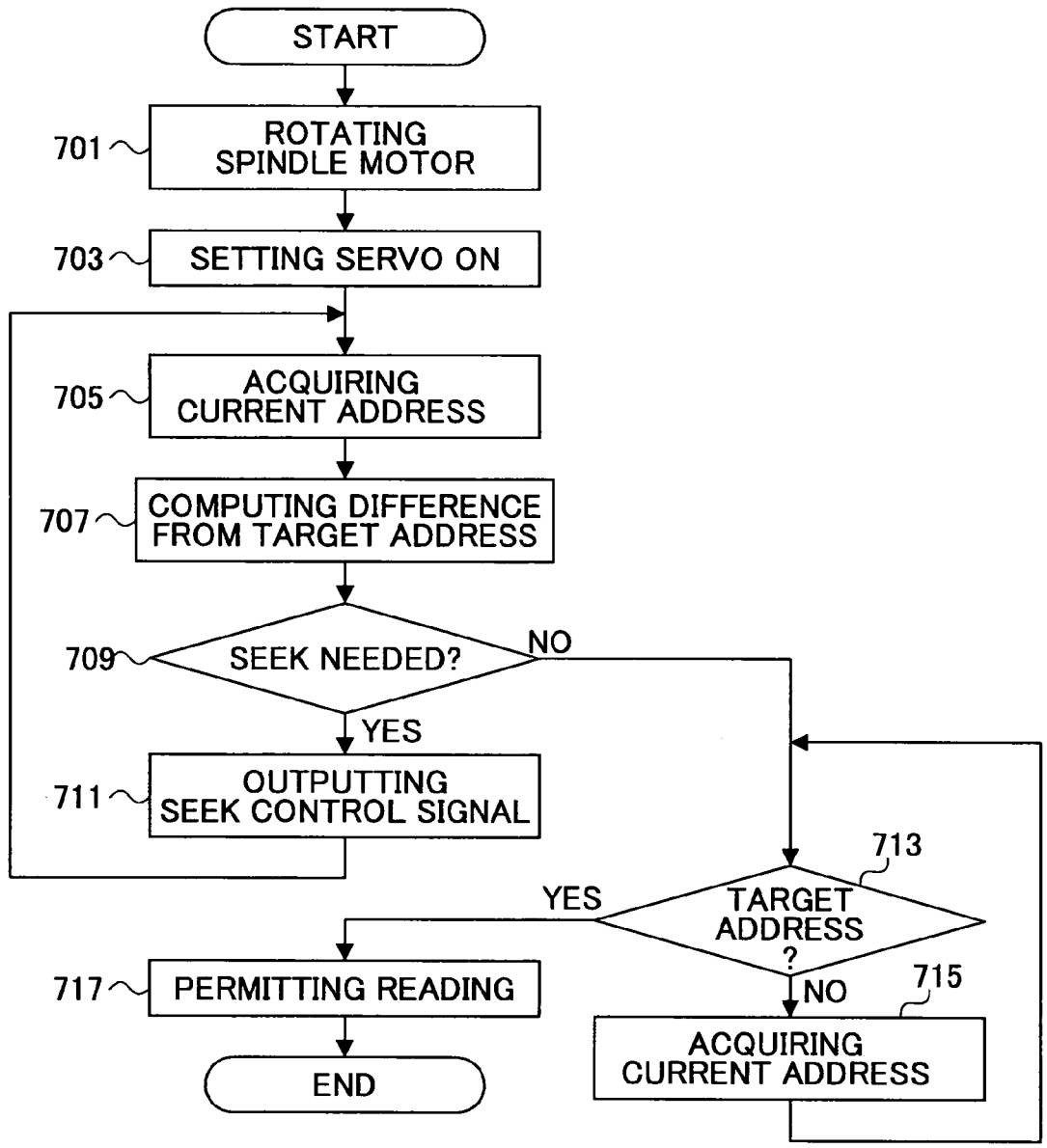
FIG. 42 is a flowchart of a reproducing operation performed by the optical disk apparatus in response to a command from a host computer.

The operation of the optical disk apparatus 220 in response to receipt of a command requesting for reproducing data is received from the host computer is described below with reference to FIG. 42. The flowchart shown in FIG. 42 corresponds to processing algorithm performed by the CPU 240. When the CPU 240 receives a reproduction request command from the host computer, the top address of a computer program corresponding to the flowchart shown in FIG. 42 is set in the program counter of the CPU 240, and the reproduction processing starts.

In initial step 701, the CPU 240 outputs a control signal for controlling the rotation of the spindle motor 222 based on the reproduction speed to the motor driver 227. The CPU 240 also informs the reproduced signal processing circuit 228 that a reproduction request command is received from the host computer.

In the next step 703, the CPU 240 makes sure that the rotation of the optical disk 215 has reached a predetermined linear velocity, and sets the servo controller 233 in a servo on state. As a result, as described above, radial tilt control, tangential tilt control, tracking control, and focus control are performed. The radial tilt control, tangential tilt control, tracking control, and focus control are performed occasionally until the reproduction processing is completed.

In the next step 705, the CPU 240 acquires current address based on the ADIP information from the decoder 228e.

In the next step 707, the CPU 240 computer an address difference between the current address and a target address extracted from the reproduction request command.

In the next step 709, similar to step 511, the CPU 240 determines whether seek is needed. If seek is needed, the determination becomes positive, and the process proceeds to step 711.

In step 711, the CPU 240 outputs a control signal depending on the address difference to the motor driver 227 for controlling the seek motor. The process proceeds to step 705.

On the other hand, in step 709, if a determination is made that seek is not needed, the determination becomes negative. The process proceeds to step 713.

In step 713, the CPU 240 determines whether the current address matches the target address. If the current address does not match the target address, the determination becomes negative. The process proceeds to step 715.

In step 715, the CPU 240 acquires current address based on the ADIP information. The process returns to step 713.

Steps 713 through 715 are repeated unit1 the determination in step 713 becomes positive.

If the current address matches the target address, the determination in step 713 becomes positive. The process proceeds to step 717.

In step 717, the CPU 240 gives an instruction to the reproduced signal processing circuit 228 to read data. The reproduction signal processing circuit 228 acquires the reproduced data, and stores the data in the buffer RAM 34. The reproduced data are transferred to the host computer by sectors through the buffer manager 237 and the interface 238. When all data designated by the host computer has been reproduced completely, predetermined ending processing is performed. The process is terminated.

As will be appreciated, the optical disk apparatus 220 according to an embodiment of the present invention realizes processing with the CPU 240 and the computer program executed by the CPU 240. The present invention is not limited to the present embodiment. At least a part of process may be configured by hardware, or all processing may be configured by hardware.

The tilt detection circuit 228g, the servo controller 233, and the motor driver 227 ralizes an adjusting unit.

As described above, according to the tilt sensor 2110 according to an embodiment of the present invention, the light beam emitted by the semiconductor laser LD is reflected by the optical disk 215. The reflective light beam is received by the photo detector PD through the hologram element 2113 and the hologram element 2114. If the optical disk 215 is tilted to a reference plane in the radial directions, the light intensity of the +1st order diffraction light and the light intensity of the −1st order diffraction light changes depending on incident angle of the reflective light beam by the hologram element 2113. If the optical disk 215 is tilted to the reference plane in the tangential directions, the light intensity of the +1st order diffraction light and the light intensity of the −1st order diffraction light changes depending on incident angle of the reflective light beam by the hologram element 2114. The diffraction light is detected by each photo detecting unit included in the photo detector. The amount of light by the photo detecting units contains the information related to the tilt of the optical disk 215 in the radial directions and the tangential directions. Accordingly, the tilt sensor 2110 can output a signal containing the information related to the tilt of the optical disk 215 in the radial directions and the tangential directions.

The grating depth and pitch of the hologram element 2113 and 2114 may be determined so that the Q-factor of the hologram elements 2113 and 2114 becomes $2 \leq Q < 10$. According to the above arrangement, the tilt sensor 2110 can detect the tilt with high precision in a wide detection range.

Since each photo detecting unit receives a fraction of the diffraction light, the photo detecting units can be disposed with a greater positional tolerance than those of the related art. Accordingly, yield of the tilt sensor 2110 can be improved, and assembly and adjustment of the tilt sensor 2110 can be made simple. As a result, the manufacturing cost of the tilt sensor 2110 can be reduced. In addition, even if the light intensity of the reflective light beam is not evenly distributed, the tilt sensor 2110 can output a signal containing information related to the radial tilt and the tangential tilt of the optical disk 215.

The optical pickup apparatus 223 according to the present embodiment, because it is provided with the tilt sensor 2110, can output a signal containing information related to the radial tilt and the tangential tilt of the optical disk 215. Since the optical pickup apparatus 223 has the radial tilt coil and the tangential tilt coil, the object lens can be rotated in the radial directions and in the tangential directions. Accordingly, the optical pickup apparatus 223 can output a signal containing information needed for controlling the position of the object lens with high precision.

Additionally, since the light beam for detecting the tilt is emitted in the neighborhood of the object lens 60, a signal containing information the radial tilt and the tangential tilt in the neighborhood of the light spot position formed by the object lens can be output from the tilt sensor 2110. According to the above arrangement, the optical pickup apparatus can control radial tilt and tangential tilt with high precision.

Since the position at which the tilt sensor 2110 is to be disposed is less restrictive than that of the related art, an optical pickup using the tilt sensor 2110 can be designed with more flexibility and degree of freedom compared to optical pickup apparatuses using a conventional tilt sensor. Accordingly, the optical pickup can be made compact.

Since the tilt sensor 2110 can be disposed with more positional tolerance than a conventional tilt sensor can, the assembly and adjustment of the tilt sensor 2110 can be made simple, which results in the reduction in manufacturing cost of an optical pickup apparatus.

The optical disk apparatus 220 according to the present embodiment can compensate for wave front aberration caused by media tilt before starting the recording and reproducing of data. Accordingly, the optical disk apparatus 220 can form a better-shaped light spot on the recording surface of the optical disk 215. As a result, the optical disk apparatus 220 can record and reproduce data stably with high precision.

Since the output signal from each photo detecting unit contains less offset component, a circuit or processing for acquiring the radial tilt control signal and the tangential tilt control signal from the output signal can be made simple.

Since the optical disk apparatus 220 can compensate for media tilt substantially in real-time, the optical disk apparatus 220 can stably record data even at a high recording speed.

Even if the optical disk apparatus 220 is built in a notebook computer, for example, and is used under such a condition in which media tilt is easily caused by vibration and temperature change, the optical disk apparatus 220 can record and reproduce data stably with high precision.

If the light beam emitted by the semiconductor laser LD and the reflective light beam reflected by the optical disk 215 are polarized in different directions, at least one of the hologram element 2113 or the hologram element 2114 may have polarization that affects the diffraction efficiency of an incident light beam depending on the polarization thereof. For example, if the light beam emitted by the semiconductor laser LD is P-polarized, and the reflective light beam reflected by the optical disk 215 is S-polarized, at least one of the hologram element 2113 and the hologram element 2114 may have a transmittance for P-polarized light beam (95%, for example) higher than that for S-polarized light beam (40%, for example). According to the above arrangement, loss of the light beam emitted by the semiconductor laser LD can be reduced, and the efficiency of the light beam can be improved. Since the amount of the diffraction light of the reflective light beam is increased, the detection of tilt can be made sensitive. Accordingly, even if the reflection index of the optical disk is low, the tilt sensor can detect tilt.

Figure 43:
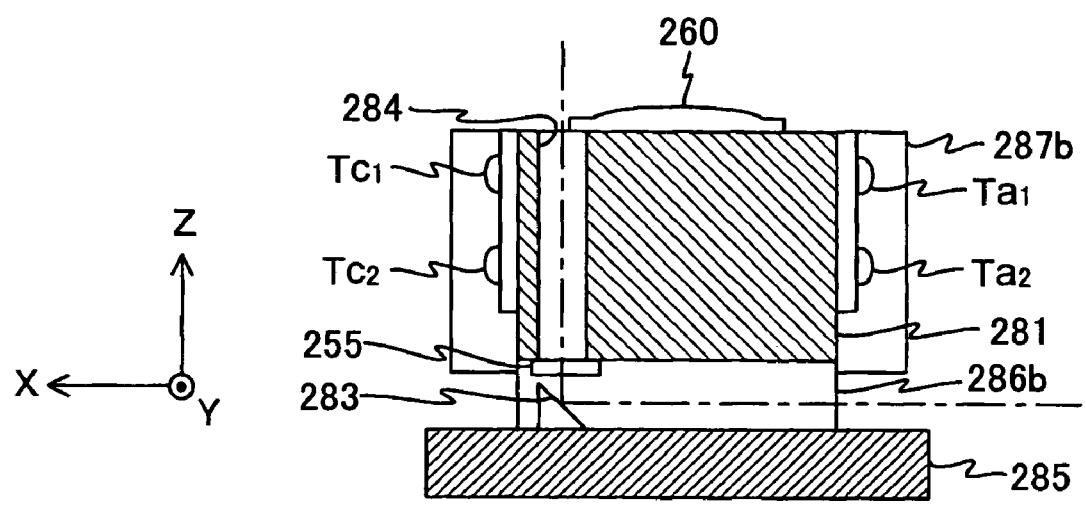
FIG. 43 is a schematic diagram showing a ¼ wavelength plate.

In addition, the photo detecting units included in the photo detector PD can be disposed in the neighborhood of the semiconductor laser LD. The tilt sensor can be made even more compact. In such a case, for example, a ¼ wavelength plate 255 may be disposed on the optical path between the hologram element 2113 and the optical disk 215 in order to make the reflective light beam S-polarized as shown in FIG. 43. An exemplary embodiment shown in FIG. 43 has a ¼ wavelength plate 255 disposed at an end of the through-hole 284 at the reflective mirror 283 side.

Figure 44:
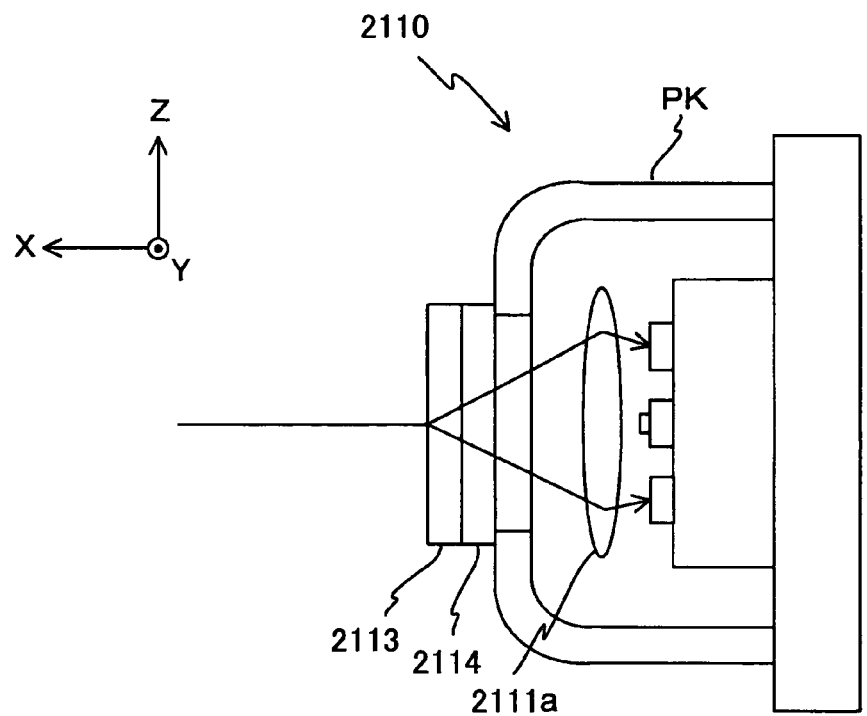
FIG. 44 is a schematic diagram for explaining a tilt sensor in which the diffraction light travels through a coupling lens according to an embodiment.

If the incident position of the reflective light beam is greatly shifted at the hologram element 2113, the coupling lens 2111 may be replaced with a coupling lens 2111a larger than the coupling lens 2111 so that the diffraction light from the hologram element 2114 enter the coupling lens 2111a as shown in FIG. 44. For example, if the length of the optical path between the optical disk and the hologram element 2113 is 30 mm, and the media tilt θ changes in a range between −1 degree through +1 degree, the incident position of the reflective light beam shifts in a range between −523 μm through +523 μm at the hologram element 2113. If the diffraction light is received by the photo detector as is, the position at which the diffraction light is received by the photo detector shifts in a range between −523 μm through +523 μm at the photo detector. The photo detecting element may need to be wider than 1 mm. If the diffraction light is converged by the coupling lens 2111a, the shift in the position at which the diffraction light is received by the photo detecting unit can be reduced to about 0. The amount of shift can be estimated by f*tanθ, where f is the focal distance of the coupling lens 2111a. Accordingly, the width of the photo detecting units can be reduced. Additionally, the distance between the optical disk 215 and the tilt sensor 2110 can be increased without restriction.

Since the diffraction light from the hologram element 2113 is converged, the diameter of the diffraction light can be made small. The photo detecting area of each photo detecting unit can be reduced. Accordingly, the tilt sensor can be made compact and high-speed responsive.

Figure 45:
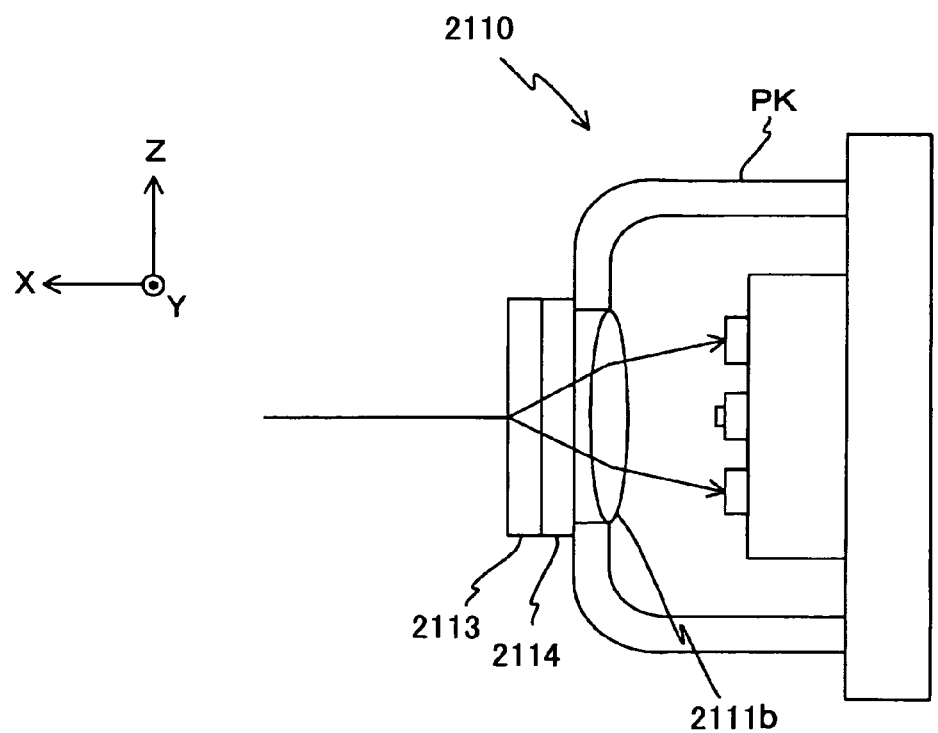
FIG. 45 is a schematic diagram for explaining a tilt sensor in which the diffraction light travels through a coupling lens according to another embodiment.

In such a case, if the coupling lens 2111b is disposed near the hologram element 2114 as shown in FIG. 45, the size of the coupling lens can be reduced without reducing the Q-factor of the hologram elements. The tilt sensor can be made compact maintaining high detection sensitivity.

Figure 46:
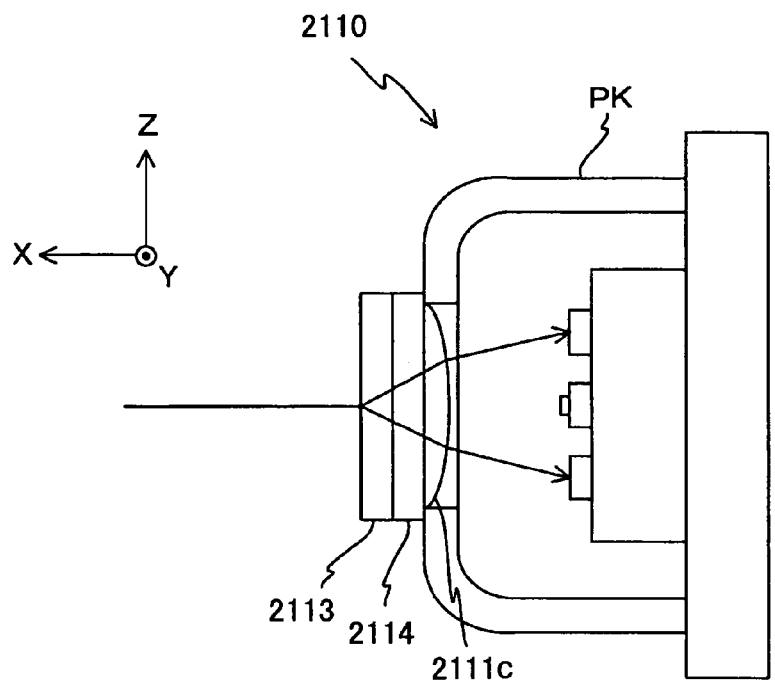
FIG. 46 is a schematic diagram for explaining a tilt sensor in which the diffraction light travels through a coupling lens according to yet another embodiment.

If a coupling lens 2111c may be built as a single unit with the hologram element 2113 as shown in FIG. 46. The coupling lenses 2111a, 2111b, and 2111c can function as a convergence lens as well.

Figure 47:
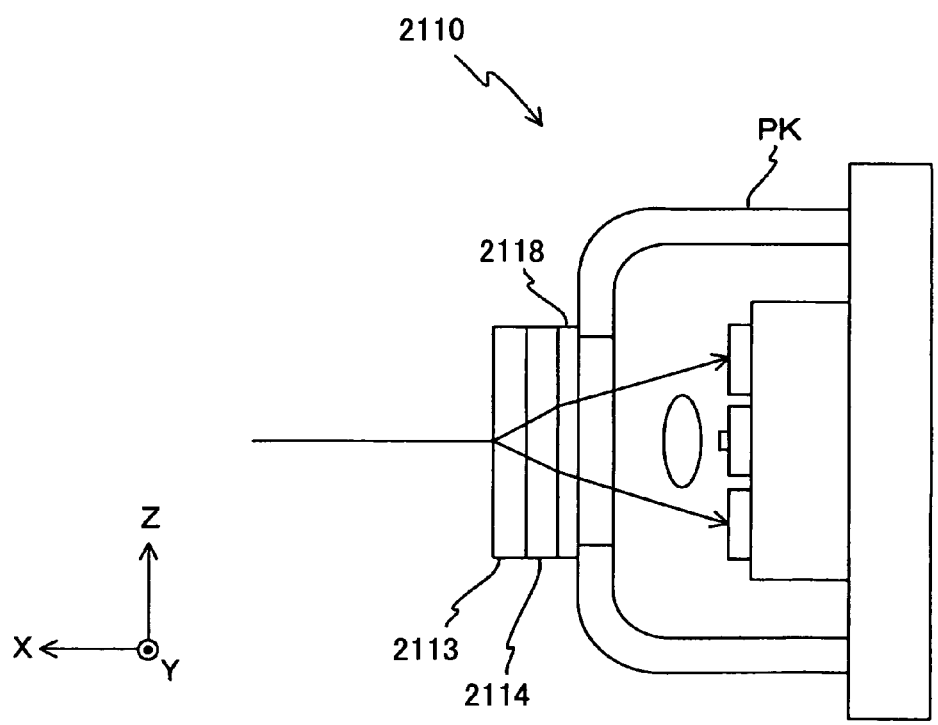
FIG. 47 is a schematic diagram for explaining a tilt sensor in which a polarization optical element is used according to an embodiment.

A polarization diffraction element 2118, for example, may be disposed on the optical path between the hologram element 2113 and the coupling lens 2111 as shown in FIG. 47. The polarization diffraction element 2118 can deflect the diffraction light from the hologram element 2114 toward the semiconductor laser LD. According to the above arrangement, the photo detecting units can be disposed close to the semiconductor laser LD. The tilt sensor can be made even more compact. The diffraction efficiency of the polarization diffraction element 2118 does not need to depend on the incident angle. An inexpensive diffraction element the pitch of which is relatively great can be used.

Figure 48:
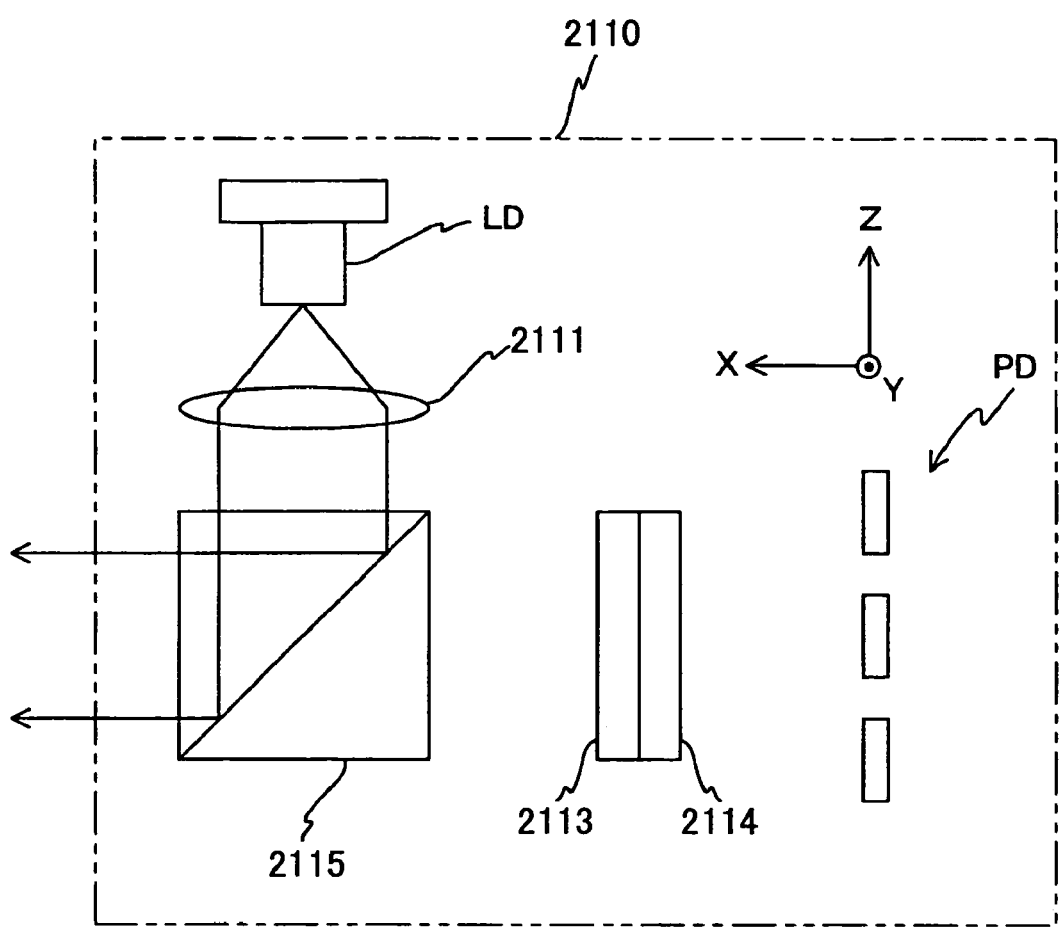
FIG. 48 is a schematic diagram for explaining a tilt sensor in which a light source and a photo detector are disposed separately according to an embodiment.

An exemplary embodiment has been described in which the semiconductor laser LD and the photo detector PD are built in the same package PK. The present invention is not limited to such an embodiment. According to another embodiment, the semiconductor laser LD and the photo detector PD may be disposed separately as shown in FIG. 48. The tilt sensor 2110 shown in FIG. 48 is a tilt sensor in which the light intensity emitted by the semiconductor laser LD becomes maximum in the −Z directions. The coupling lens 2111 is disposed at the −Z side of the semiconductor laser LD. A beam splitter 2115 is disposed at the −Z side of the coupling lens 2111 for deflecting the light beam to the +X direction, the light beam being made substantially parallel by the coupling lens 2111. At the −X side of the beam splitter 2115 are disposed the hologram element 2113, the hologram element 2114, and the photo detector PD. In this case, the light beam emitted by the semiconductor laser LD is made substantially parallel by the coupling lens 2111, and then, hits the beam splitter 2115. The light beam is deflected to the +X direction by the beam splitter 2115, and hits the optical disk 215 via the reflective mirror 283. The reflective light beam reflected by the optical disk 215 hits the beam splitter 2115 via the reflective mirror 283. The reflective light beam transmitted through the beam splitter 2115 enters the hologram element 2113.

Figure 49:
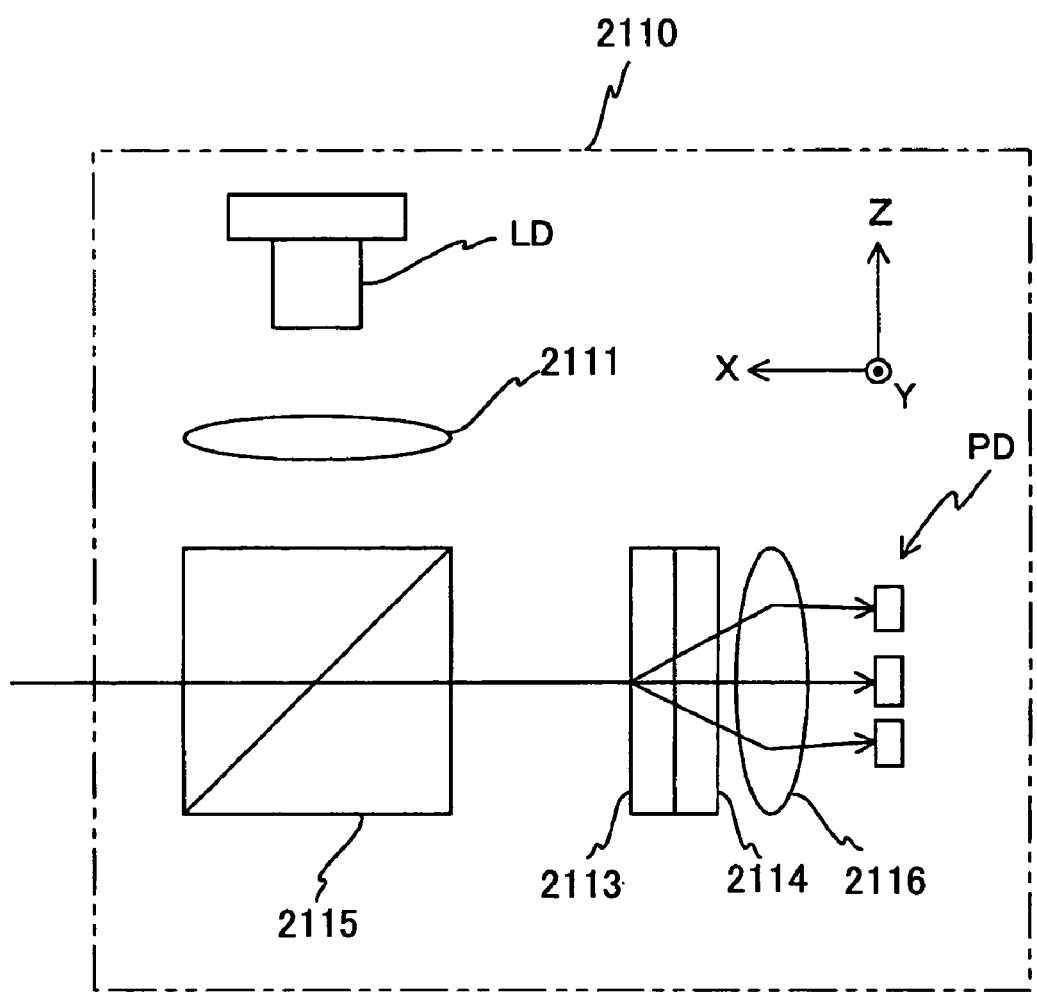
FIG. 49 is a schematic diagram for explaining a tilt sensor in which a polarization optical element is used according to another embodiment.
Figure 50:
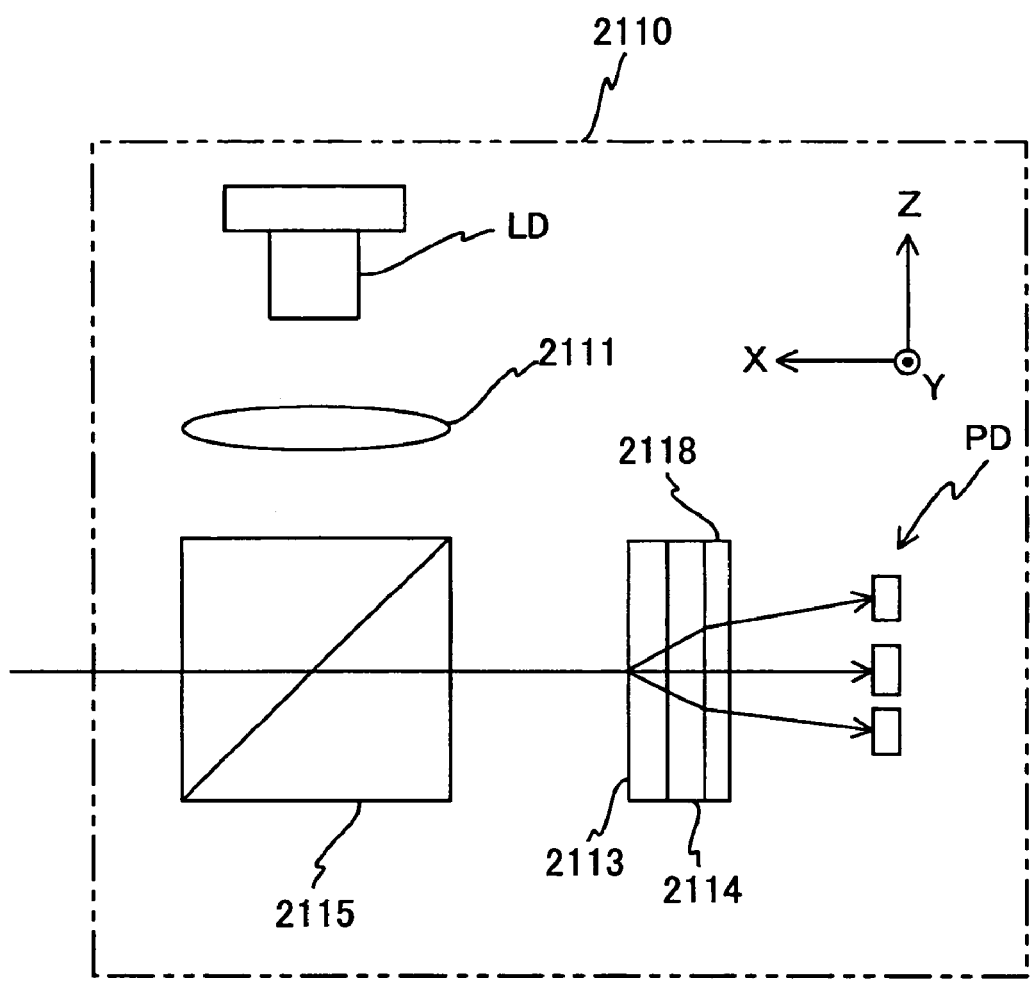
FIG. 50 is a schematic diagram for explaining a tilt sensor in which a light source and a photo detector are disposed separately according to another embodiment.

In this case, a convergence lens may be disposed on the optical path between the hologram element 2113 and the photo detector as shown in FIG. 49. The convergence lens 2116 can converge the diffraction light from the hologram element 2114. According to the above arrangement, the photo detecting units can be reduced in size, and the tilt sensor can be made even more compact. The hologram element 2114 and the convergence lens 2116 can be combined as a single unit. As shown in FIG. 50, the polarization diffraction element 2118 described above may be disposed on the optical path between the hologram element 2114 and the photo detector PD.

An exemplary embodiment has been described in which the hologram element 2113 and the hologram element 2114 are laminated. The present invention is not limited to such an embodiment. The hologram element 2113 and the hologram element 2114 may be disposed separate.

Figure 51:
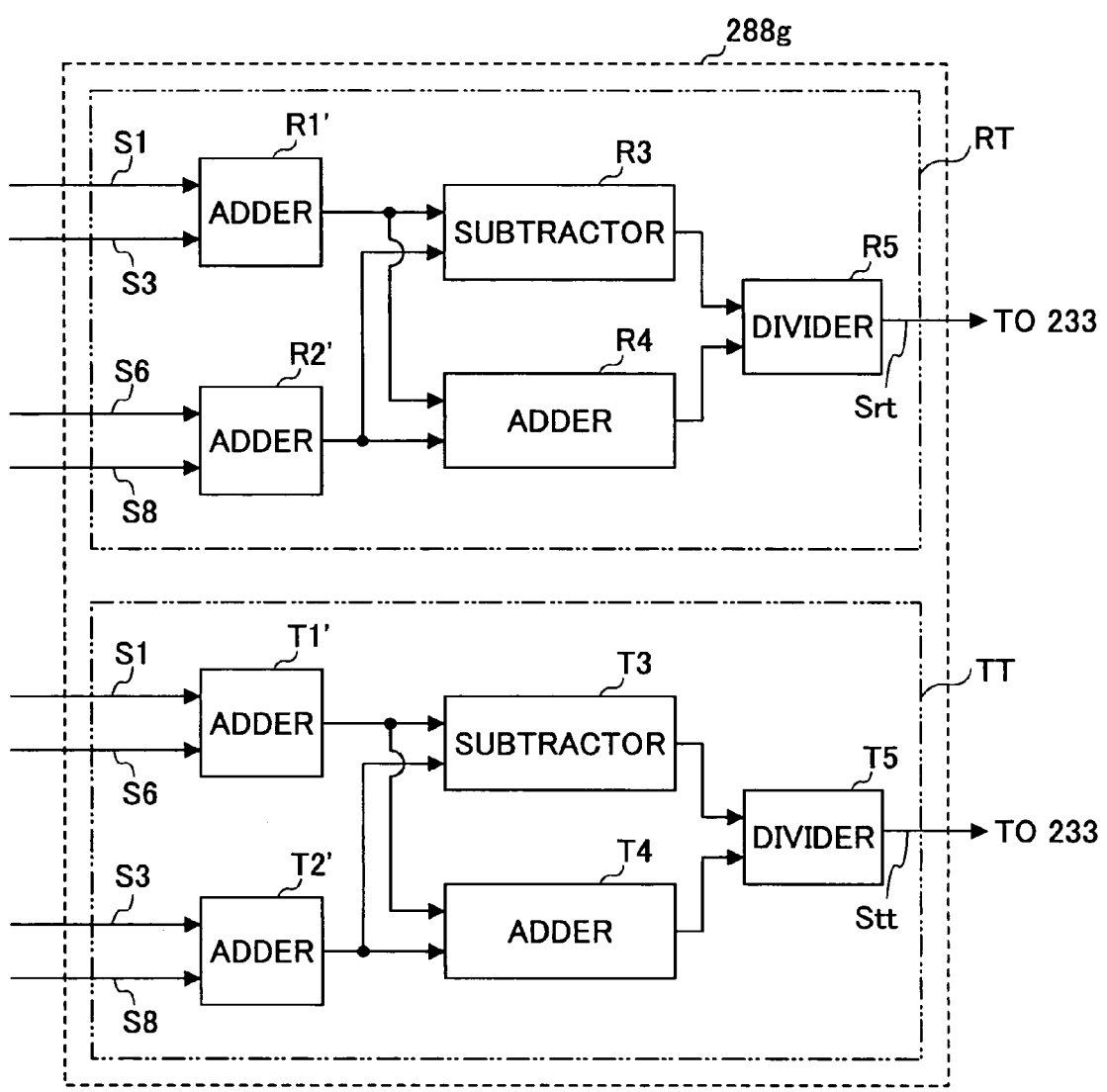
FIG. 51 is a block diagram for explaining the configuration of a tilt detection circuit according to another embodiment.

If the light intensity of the 0 order light at the hologram element 2113 and at the hologram element 2114 is less that of the diffraction light, the amount of a fraction of the reflective light beam received by the photo detecting unit PD2, PD4, PD5, and PD7 may be ignored. That is, the adder R1 and the adder R2 of the tilt detection circuit 228g described above may be replaced with an adder R1' that adds the signal S1 and the signal S6 and an adder R2' that adds the signal S6 and the signal S8, respectively, as shown in FIG. 51. Additionally, the adder T1 and the adder T2 of the tilt detection circuit 228 g may be replaced with an adder T1' that adds the signal S1 and the signal S6, and an adder T2' that adds the signal S3 and the signal S8, respectively, as shown in FIG. 51. In such as case, the photo detecting units PD2, PD4, PD5, and PD7 may not be needed.

Figure 52:
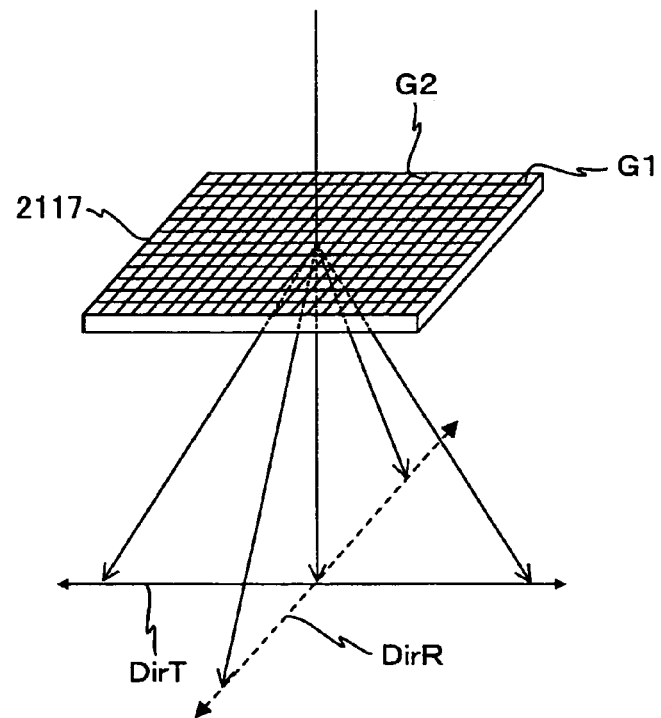
FIG. 52 is a schematic diagram for explaining a hologram element in which the hologram element 2113 and the hologram element 2114 are combined according to an embodiment.
Figure 53:
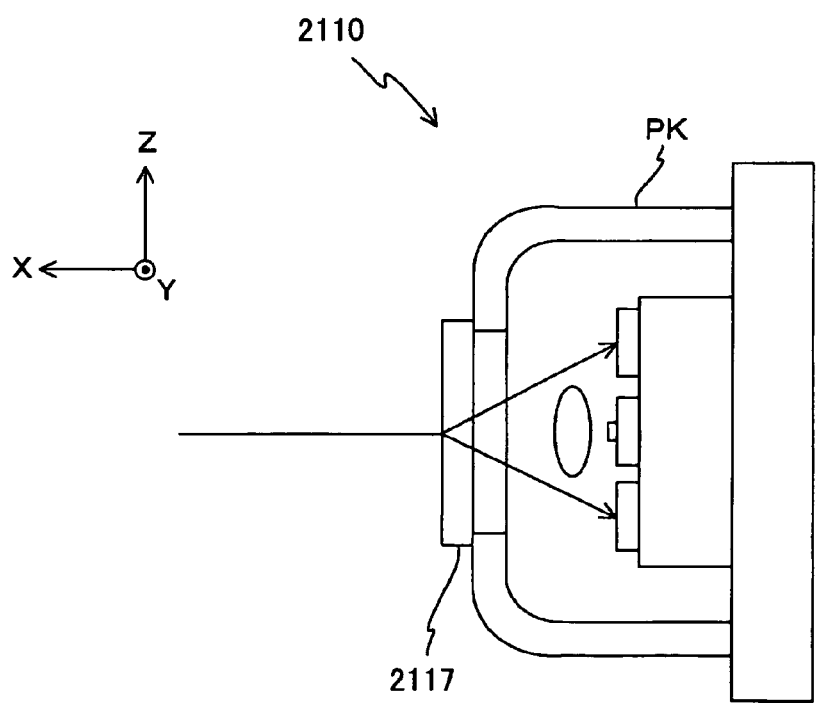
FIG. 53 is a schematic diagram for explaining a tilt sensor using the hologram element shown in FIG. 52.

An exemplary embodiment has been described in which the hologram element 2113 is provided for detecting radial tilt, and the hologram element 2114 is provided for detecting tangential tilt. The present invention is not limited to such an embodiment. As shown in FIG. 52 and FIG. 53, the hologram element 2113 and the hologram element 2114 may be replaced with a hologram element 2117 in which a diffraction grating G1 and a diffraction grating G2 are formed on the same plane. The diffraction grating G1 is a grating of which direction is perpendicular to the radial direction DirR, and the diffraction grating G2 is a grating of which direction is perpendicular to the tangential direction DirT.

In such as case, the reflective light beam entered the hologram element 2117 is diffracted in the radial directions DirR by the diffraction grating G1, and is diffracted in the tangential directions DirT by the diffraction grating G2. According to the above arrangement, the tilt sensor can be made even smaller. Additionally, because the grating can be formed in a step, the manufacturing cost of the hologram element 2117 can be reduced. Furthermore, since the number of parts is reduced, the time required for the assembly and adjustment can be reduced. In the case where the light beam emitted by the semiconductor laser LD and the reflective light beam reflected by the optical disk 215 are polarized in different directions, the hologram element 2117 may exhibit polarization dependency in which diffraction efficiency changes depending on the incident direction of the incident light beam.

Figure 54:
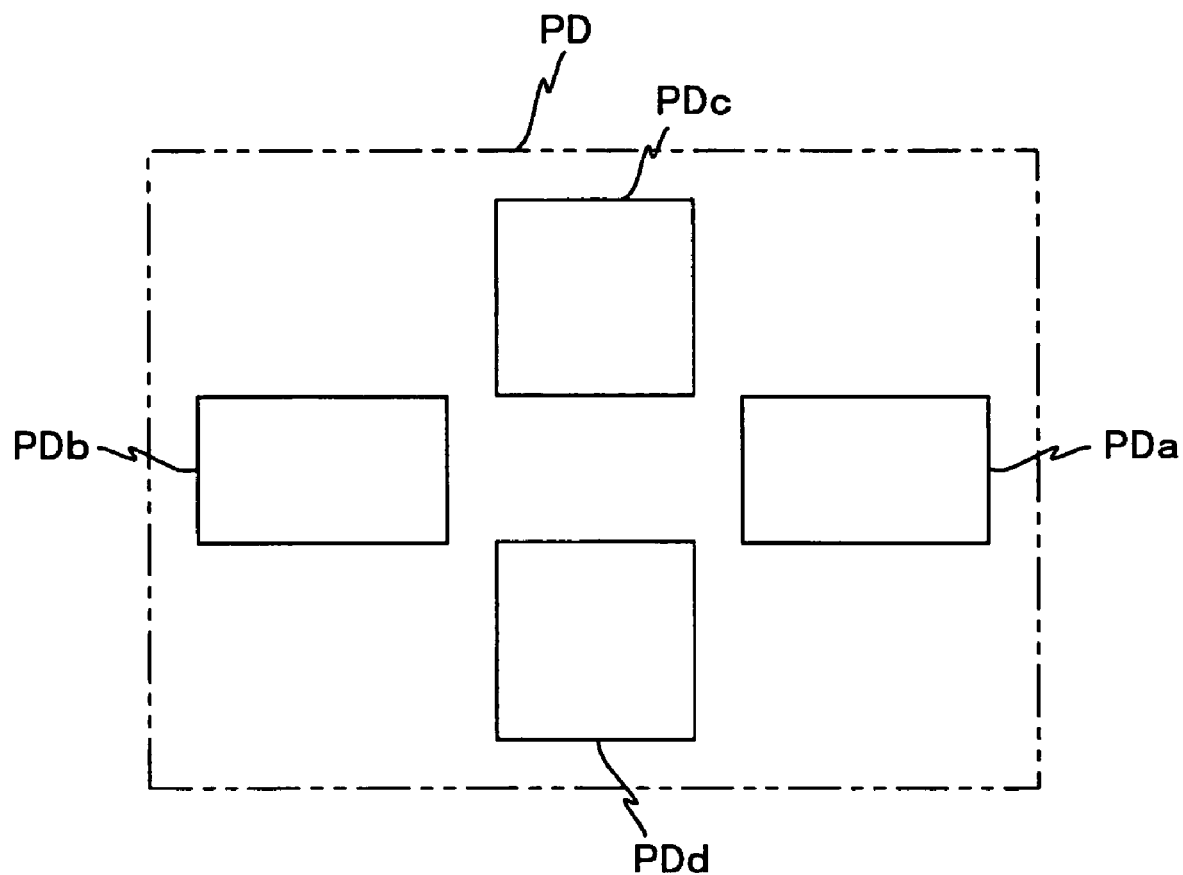
FIG. 54 is a schematic diagram for explaining a photo detector shown in FIG. 53.

In such a case, the photo detector PD may include four photo detecting units PDa, PDb, PDc, and PDd as shown in FIG. 54. The photo detecting unit PDa receives the +1st order diffraction light diffracted in the radial direction DirR. The photo detecting unit PDb receives the −1st order diffraction light diffracted in the radial direction DirR. The photo detecting unit PDc receives the +1st order diffraction light diffracted in the tangential direction DirT. The photo detecting unit PDd receives the −1st order diffraction light diffracted in the tangential direction DirT.

Figure 55:
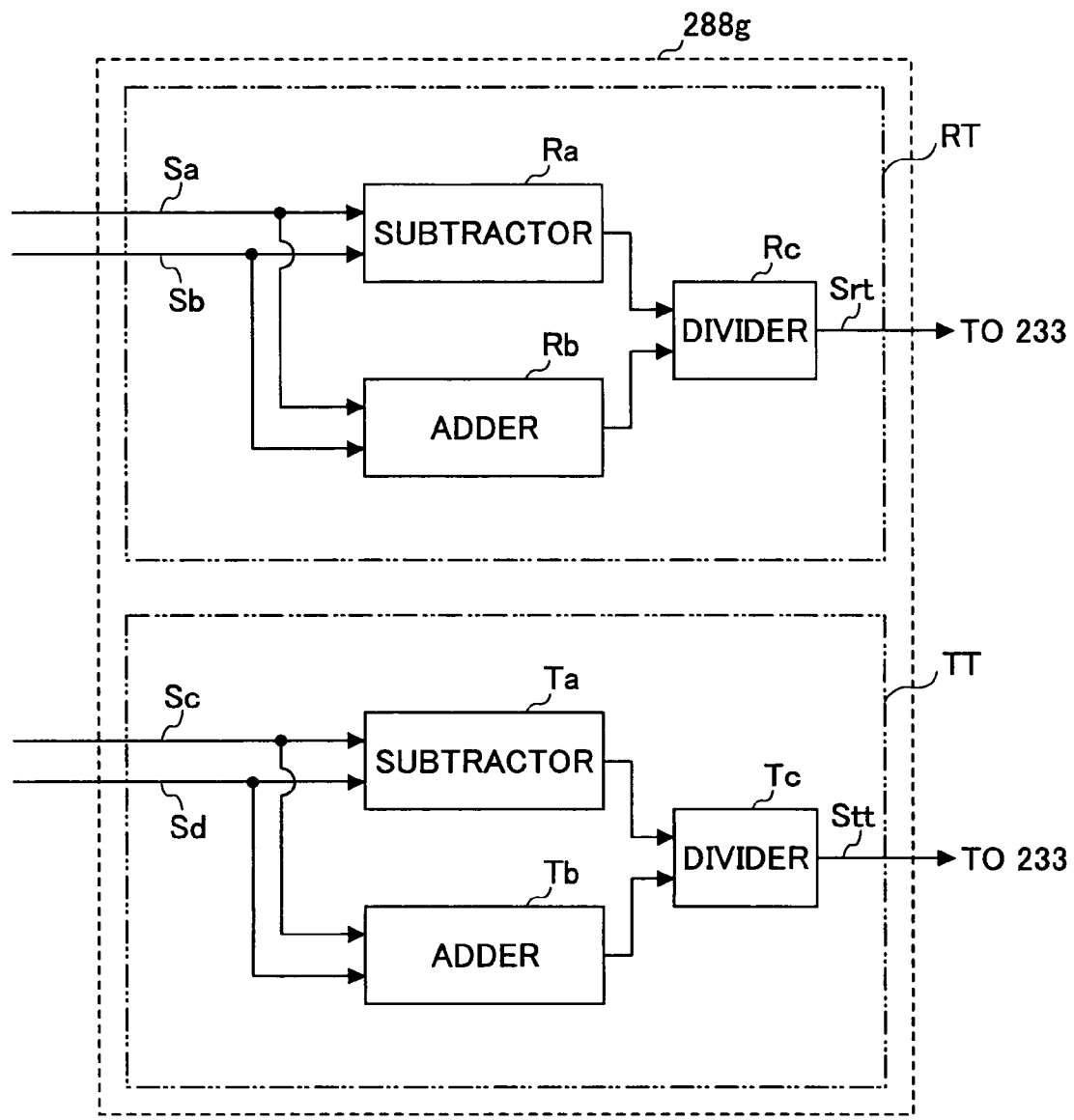
FIG. 55 is a block diagram showing the configuration of a tilt detection circuit corresponding to the tilt sensor shown in FIG. 53.

In such a case, as shown in FIG. 55, the radial tilt detection circuit RT of the tilt detection circuit 228g includes a subtractor Ra that generates a differential signal between the signal Sa and the signal Sb, an adder Rb that generates a sum signal of the signal Sa and the signal Sb, and a divider Rc that generates a divisional signal by dividing the output signal from the subtractor Ra by the output signal from the adder Rb. The signal Sa is an output signal from the I/V amp 28f corresponding to the output signal of the photo detecting unit PDa. The signal Sb is an output signal from the I/V amp 28f corresponding to the output signal of the photo detecting unit PDb.

The tangential tilt detection circuit TT of the tilt detection circuit 228g includes a subtractor Ta that generates a differential signal between the signal Sc and the signal Sd, an adder Tb that generates a sum signal of the signal Sc and the signal Sd, and a divider Tc that generates a divisional signal by dividing the output signal from the subtractor Ta by the output signal from the adder Tb. The signal Sc is an output signal from the I/V amp 28f corresponding to the output signal of the photo detecting unit PDc. The signal Sd is an output signal from the I/V amp 28f corresponding to the output signal of the photo detecting unit PDd.

According to another embodiment, a LD control circuit may be provided in the servo controller 233 for controlling the driving signal of the semiconductor laser LD so that the output signal of the adder R2 and the output signal of the above adder T2 becomes substantially equal. According to the arrangement, even if the reflection index of the optical disk 215 changes, the output signal of the tilt sensor 2110 can be maintained at almost the same level.

An exemplary embodiment has been described in which a diffraction grating of which direction is perpendicular to the radial directions DirR is formed in the hologram element 2113 and a diffraction grating of which direction is perpendicular to the tangential directions DirT is formed in the hologram element 2114. The present invention is not limited to such an embodiment, and two diffraction gratings are sufficient to realize an embodiment as long as the diffraction gratings are of different directions. The radial tilt and the tangential tilt can be obtained through an arithmetic operation. It is possible to obtain media tilt in arbitrary directions based on the radial tilt and the tangential tilt.

An exemplary embodiment has been described in which a hologram elements are used as a optical diffraction unit, but the present invention is not limited to such an embodiment.

Figure 56:
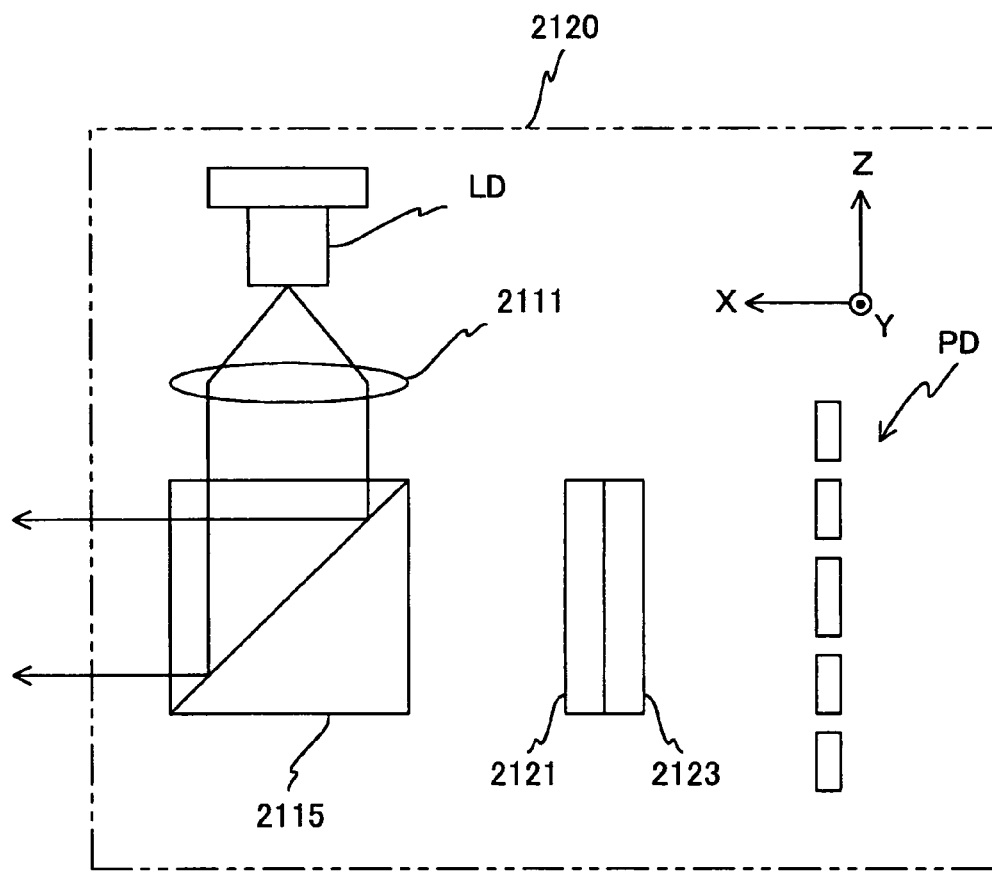
FIG. 56 is a schematic diagram for explaining a tilt sensor according to another embodiment of the present invention.

Yet another embodiment is described with reference to FIGS. 56 through 61. This embodiment is characterized by a tilt sensor 2120 that can detect information related to the tilt of the optical disk 215 (first object) and information related to the tilt of the object lens 260 (second object) independently as shown in FIG. 56. Only differences from the embodiment described with reference to FIGS. 24 through 42 are mainly described. The same or corresponding configuration are referred to by the same reference numerals and their description is omitted.

Figure 57:
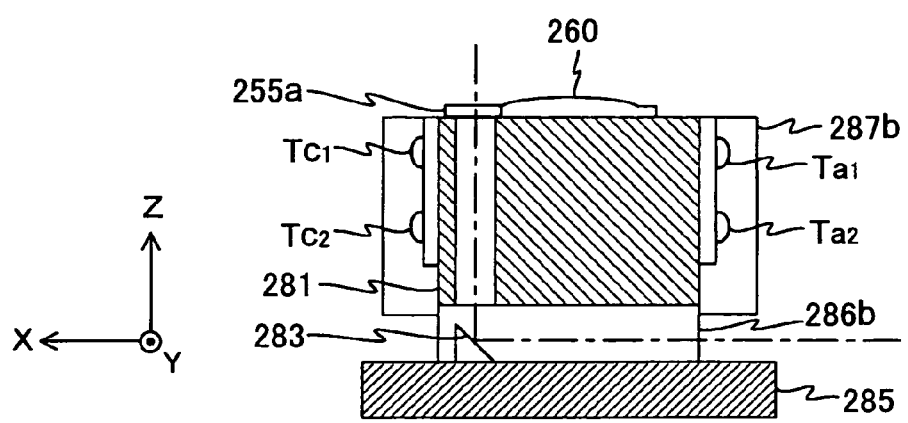
FIG. 57 is a schematic diagram for explaining the position of a ¼ wavelength plate.

As shown in FIG. 57, a ¼ wavelength plate 255a is disposed at an end of the through-hole 284 formed in the lens holder 281 at the side of the optical disk 215. A reflective film is formed on the surface of the ¼ wavelength plate 255a at the reflective mirror 283 side, and reflects a fraction of the reflective light beam from the reflective mirror 283.

The tilt sensor 2120 is disposed on the housing in the same manner as the tilt sensor 2110 is. The tilt sensor 2120 includes a semiconductor laser LD, a coupling lens 2111, a photo detector PD, a hologram element 2121, and a hologram element 2123. The hologram element 2121 and the hologram element 2123 are laminated. It is assumed that the light beam emitted by the semiconductor laser LD is P-polarized.

The hologram element 2121 diffracts P-polarized light beam at a higher diffraction efficiency, and transmits S-polarized light beam at a higher transmittivity. In the hologram element 2121 is formed a diffraction grating of which direction is perpendicular to the radial directions DirR and a diffraction grating of which direction is perpendicular to the tangential directions DirT on the same surface. The depth and the pitch of the grating are determined so that the Q-factor of each diffraction grating becomes $2 \leq Q < 10$. Accordingly, the P-polarized light beam incident to the hologram element 2121 is diffracted in the radial directions DirR at a diffraction efficiency depending on the incident angle in the radial directions and is also diffracted in the tangential directions DirT at a diffraction efficiency depending on the incident angle in the tangential directions. Most of the S-polarized light beam incident to the hologram element 2121 transmits without being diffracted.

The hologram element 2123 diffracts the S-polarized light beam at a high diffraction efficiency, and transmits the P-polarized light beam at a high transmission rate. In the hologram element 2123 is formed a diffraction grating of which direction is perpendicular to the radial directions DirR and a diffraction grating of which direction is perpendicular to the tangential directions DirT on the same surface. The depth and the pitch of the grating are determined so that the Q-factor of each diffraction grating becomes $2 \leq Q < 10$. Accordingly, the S-polarized light beam incident to the hologram element 2123 is diffracted in the radial directions DirR at a diffraction efficiency depending on the incident angle in the radial directions and is also diffracted in the tangential directions DirT at a diffraction efficiency depending on the incident angle in the tangential directions. Most of the P-polarized light beam incident to the hologram element 2121 transmits without being diffracted.

Figure 58:
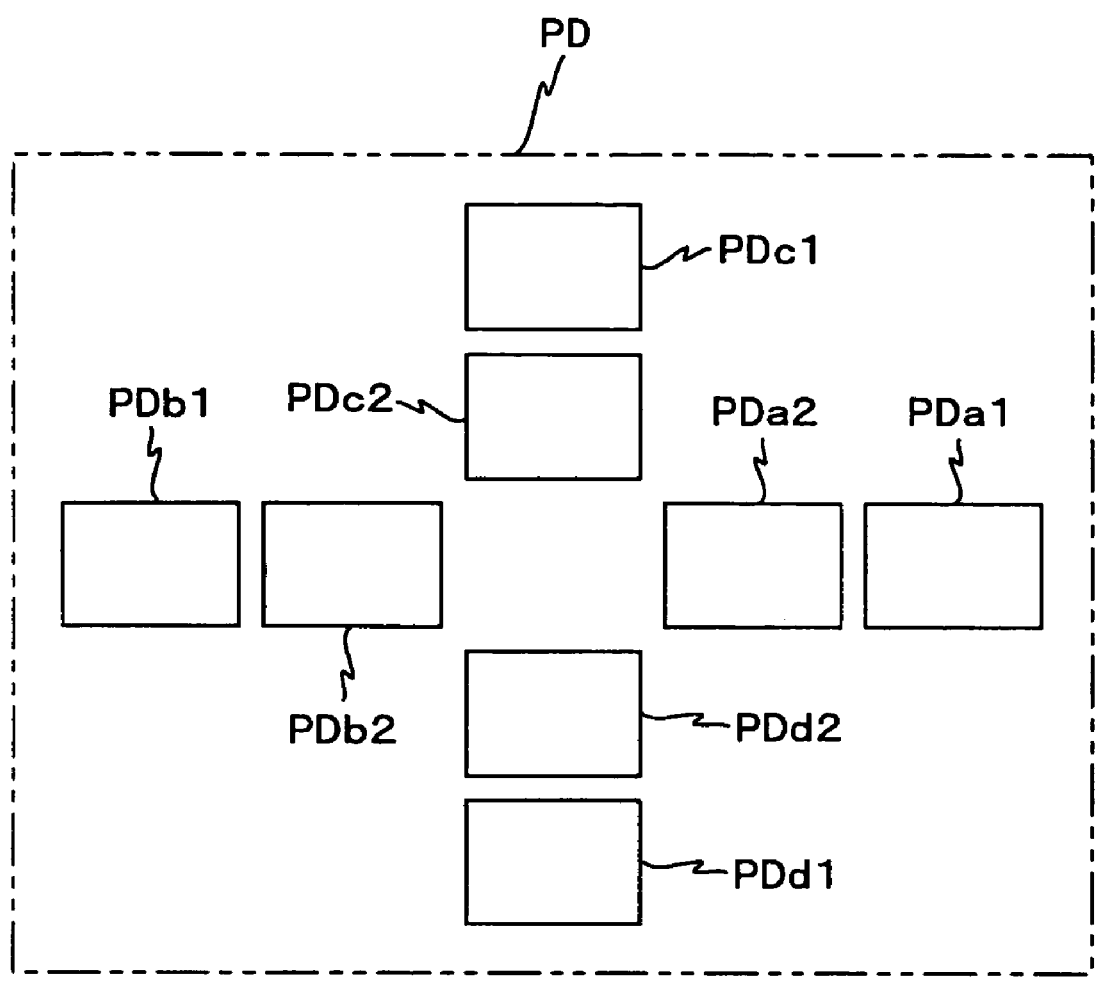
FIG. 58 is a schematic diagram for explaining a photo detector shown in FIG. 56.

As shown in FIG. 58, the photo detector PD includes eight photo detecting units PDa1, PDb1, PDc1, PDd1, PDa2, PDb2, PDc2, and PDd2. The photo detecting unit PDa1 receives the +1st order diffraction light diffracted by the hologram element 2121 in the radial direction DirR. The photo detecting unit PDb1 receives the −1st order diffraction light diffracted by the hologram element 2121 in the radial direction DirR. The photo detecting unit PDc1 receives the +1st order diffraction light diffracted by the hologram element 2121 in the tangential direction DirT. The photo detecting unit PDd1 receives the −1st order diffraction light diffracted by the hologram element 2121 in the tangential direction DirT. The photo detecting unit PDa 2 receives the +1st order diffraction light diffracted by the hologram element 2123 in the radial direction DirR. The photo detecting unit PDb2 receives the −1st order diffraction light diffracted by the hologram element 2123 in the radial direction DirR. The photo detecting unit PDc2 receives the +1st order diffraction light diffracted by the hologram element 2123 in the tangential direction DirT. The photo detecting unit PDd2 receives the −1st order diffraction light diffracted by the hologram element 2123 in the tangential direction DirT.

The function of the tilt sensor 2120 configured as described above is described.

The light beam emitted by the semiconductor laser LD in the −Z direction is made substantially parallel by the coupling lens 2111, and then hits the beam splitter 2115. The light beam is deflected by the beam splitter 2115 in the +Z direction, is deflected by the reflective mirror 283 in the +Z direction. The light beam enter the ¼ wavelength plate 255a via the through-hole 284.

The light beam reflected by the reflective film of the ¼ wavelength plate 255a enters the beam splitter 2115 via the reflective mirror 283. The light beam transmitted through the beam splitter 2115 hits the hologram element 2121. Since the light beam is P-polarized, the light beam is diffracted by the hologram element 2121 in the radial directions DirR depending on the incident angle in the radial directions, and in the tangential directions DirT depending on the incident angle in the tangential directions. Since the diffraction light from the hologram element 2121 is P-polarized, the diffraction light transmits through the hologram element 2123 without being diffracted, and is received by the photo detecting units PDa1, PDb1, PDc1, and PDd1. The photo detecting units output current signals to the reproduced signal processing circuit 228 in response to receipt of the diffraction light transmitting through the hologram element 2123.

The light beam transmitted through the reflective film of the ¼ wavelength plate 255a is circularly polarized, and hits the optical disk 215. The light beam is reflected by the optical disk 215. The reflective light beam is S-polarized by the ¼ wavelength plate 255a, and enters the beam splitter 2115 via the reflective mirror 283. The reflective light beam transmitting through the beam splitter 2115 hits the hologram element 2121. Because the reflective light beam is S-polarized, almost all fraction of the reflective light beam transmits through the hologram element 2121, and hits the hologram element 2123. The S-polarized reflective light beam is diffracted by the hologram element 2123 in the radial direction DirR at a diffraction efficiency depending on the incident angle in the radial directions, and is also diffracted in the tangential direction DirT at a diffraction efficiency depending on the incident angle in the tangential directions. The diffraction light from the hologram element 2123 is received by the photo detecting units PDa2, PDb2, PDc2, and PDd2. The photo detecting units generates and outputs current signals to the reproduced signal processing circuit 228 in response to receipt of the diffraction light, the intensity of the current signals being determined in accordance with the amount of received diffraction light.

Figure 59:
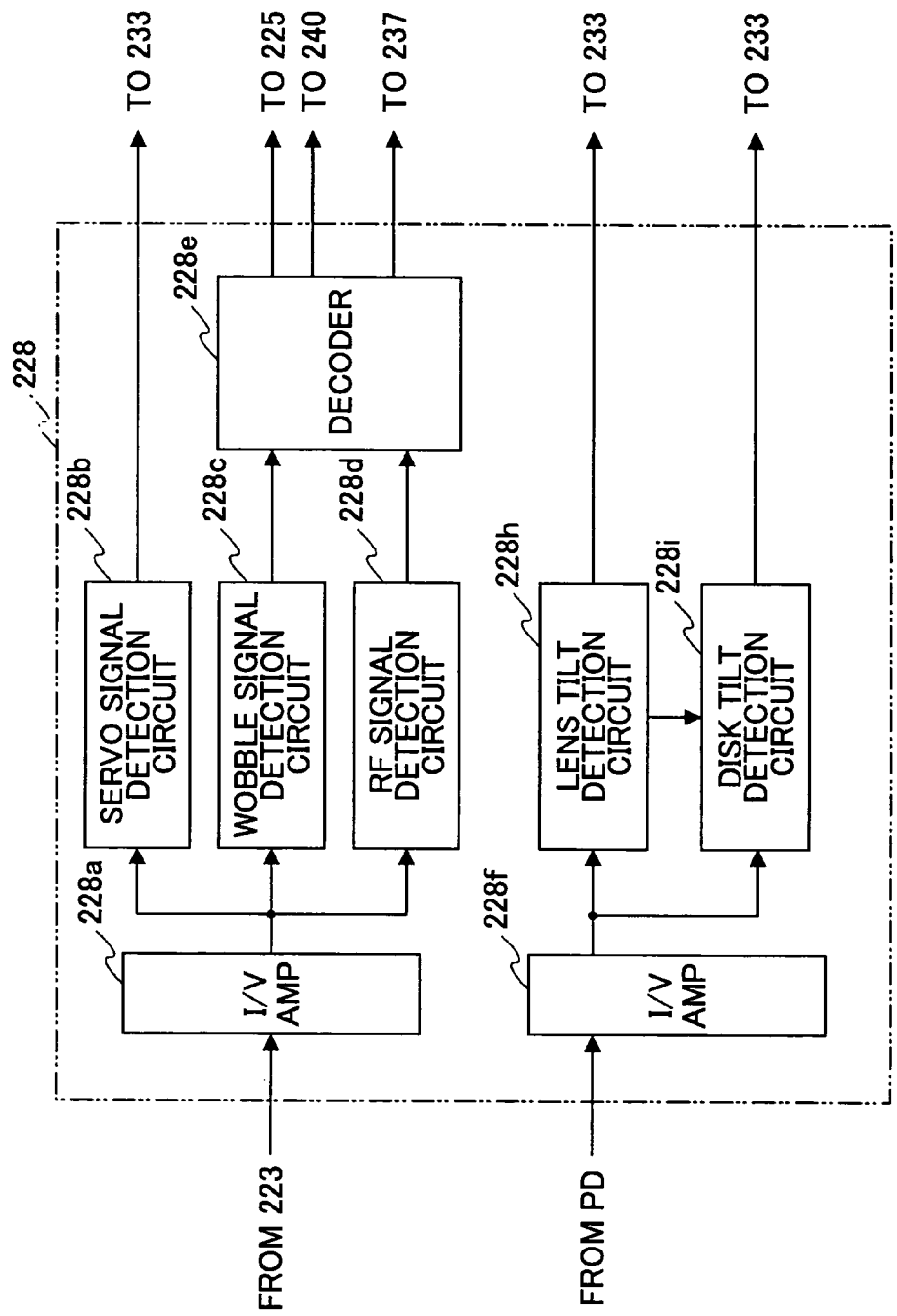
FIG. 59 is a block diagram for explaining the configuration of a reproduced signal processing circuit corresponding to the tilt sensor shown in FIG. 56.

As shown in FIG. 59, the tilt detection circuit 228g of the reproduced signal processing circuit 228 may be replaced with a lens tilt detection circuit 228h and a disk tilt detection circuit 228i.

Figure 60:
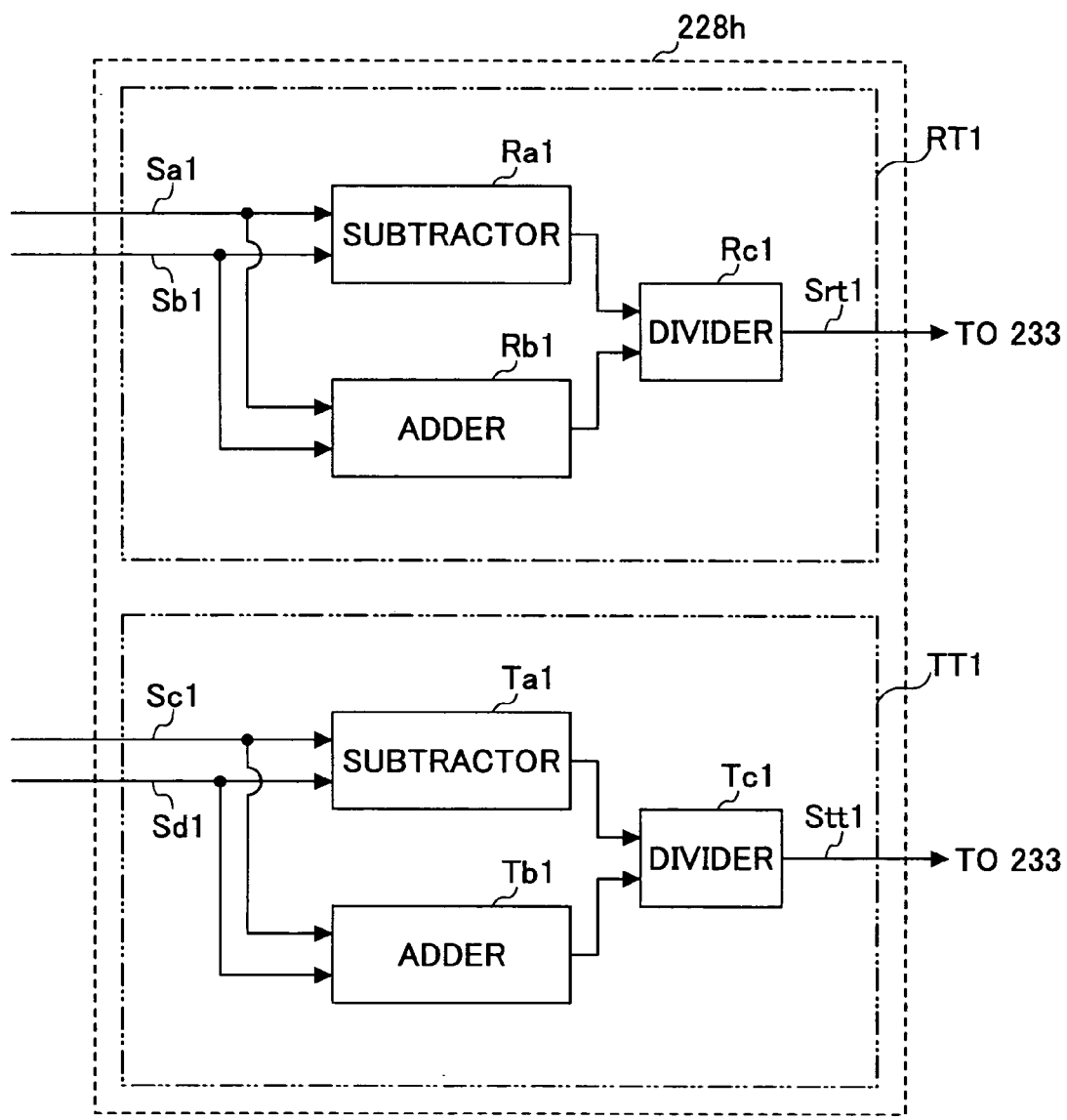
FIG. 60 is a block diagram for explaining the configuration of a lens tilt detection circuit shown in FIG. 59.

As shown in FIG. 60, the lens tilt detection circuit 228h includes a radial tilt detection circuit RT1 and a tangential tilt detection circuit TT1. The radial tilt detection circuit RT1 includes a subtractor Ra1, an adder Rb1, and a divider Rc1. The subtractor Ra1 generates a differential signal between a signal Sa1 and a signal Sb1. The adder Rb1 generates a summation signal of the signal Sa1 and the signal Sb1. The divider Rc1 generates a signal by dividing the output signal of the subtractor Ra1 with the output signal of the adder Rb1. The signal Sa1 is an output signal from the I/V amp 228f corresponding to the output signal of the photo detecting unit PDa1. The signal Sb1 is an output signal from the I/V amp 228f corresponding to the output signal of the photo detecting unit PDb1. A signal Srt1 generated by the divider Rc1 contains information related to the tilt of the object lens 260 in the radial directions, and is output to the servo controller 233.

The tangential tilt detection circuit TT1 includes a subtractor Ta1, an adder Tb1, and a divider Tc1. The subtractor Ta1 generates a differential signal between a signal Sc1 and a signal Sd1. The adder Tb1 generates a summation signal of the signal Sc1 and the signal Sd1. The divider Tc1 generates a signal by dividing the output signal of the subtractor Ta1 with the output signal of the adder Tb1. The signal Sc1 is an output signal from the I/V amp 228f corresponding to the output signal of the photo detecting unit PDc1. The signal Sd1 is an output signal from the I/V amp 228f corresponding to the output signal of the photo detecting unit PDd1. A signal Stt1 generated by the divider Tc1 contains information related to the tilt of the object lens 260 in the tangential directions, and is output to the servo controller 233.

Figure 61:
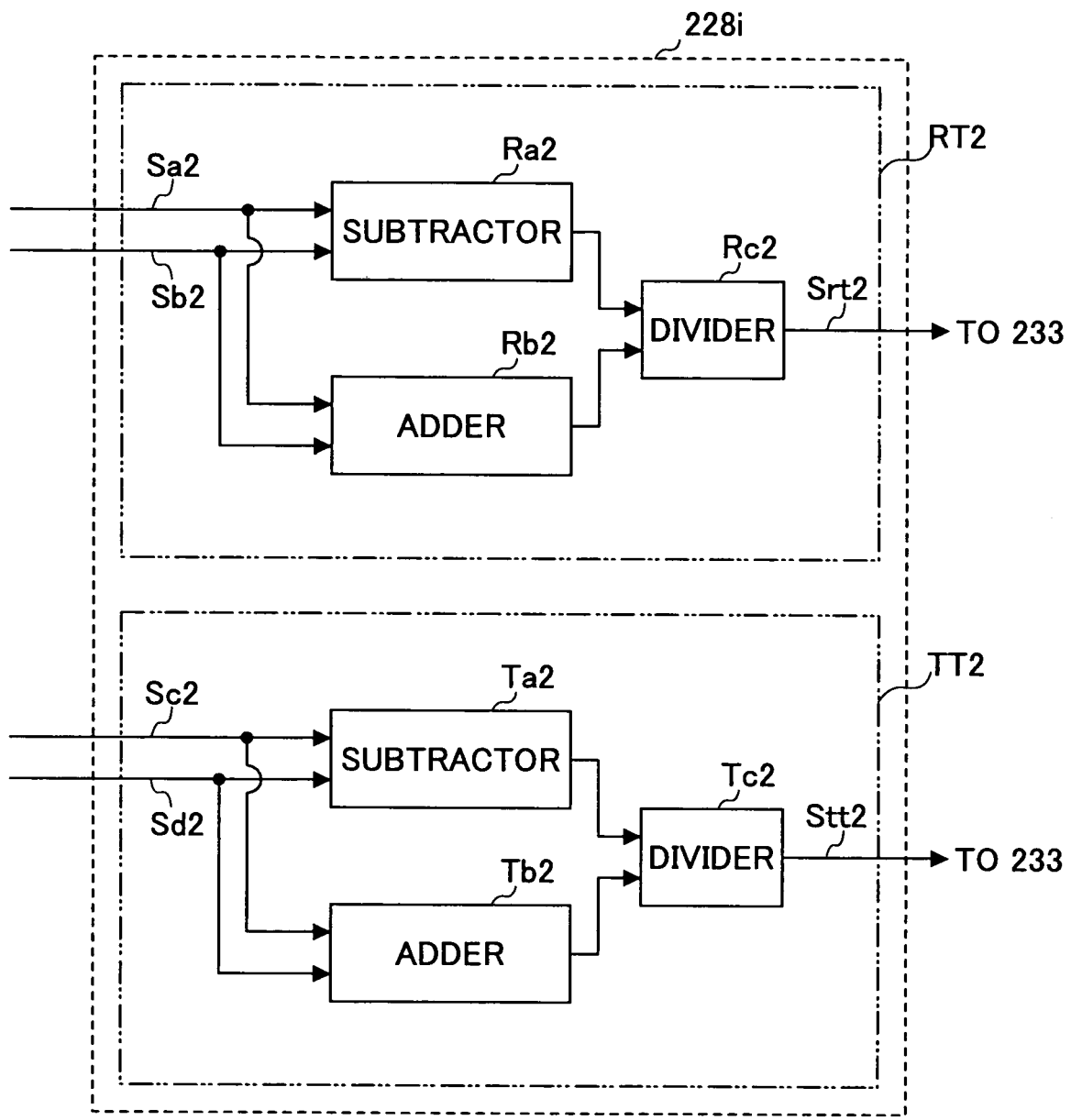
FIG. 61 is a block diagram for explaining the configuration of a disk tilt detection circuit shown in FIG. 59.

As shown in FIG. 61, the disk tilt detection circuit 228i includes a radial tilt detection circuit RT2 and a tangential tilt detection circuit TT2. The radial tilt detection circuit RT2 includes a subtractor Ra2, an adder Rb2, and a divider Rc2. The subtractor Ra2 generates a differential signal between a signal Sa2 and a signal Sb2. The adder Rb2 generates a summation signal of the signal Sa2 and the signal Sb2. The divider Rc2 generates a signal by dividing the output signal of the subtractor Ra2 with the output signal of the adder Rb2. The signal Sa2 is an output signal from the I/V amp 228f corresponding to the output signal of the photo detecting unit PDa2. The signal Sb2 is an output signal from the I/V amp 228f corresponding to the output signal of the photo detecting unit PDb2. A signal Srt2 generated by the divider Rc2 contains information related to the tilt of the optical disk 215 in the radial directions, and is output to the servo controller 233.

The tangential tilt detection circuit TT2 includes a subtractor Ta2, an adder Tb2, and a divider Tc2. The subtractor Ta2 generates a differential signal between a signal Sc2 and a signal Sd2. The adder Tb2 generates a summation signal of the signal Sc2 and the signal Sd2. The divider Tc2 generates a signal by dividing the output signal of the subtractor Ta2 with the output signal of the adder Tb2. The signal Sc2 is an output signal from the I/V amp 228f corresponding to the output signal of the photo detecting unit PDc2. The signal Sd2 is an output signal from the I/V amp 228f corresponding to the output signal of the photo detecting unit PDd2. A signal Stt2 generated by the divider Tc2 contains information related to the tilt of the optical disk 215 in the tangential directions, and is output to the servo controller 233.

The servo controller 233 generates a focus control signal and a tracking control signal in the same manner as the previous embodiment. The servo controller 233 generates a radial tilt control signal based on the radial tilt information signal Srt2 for controlling radial tilt, and generates a tangential tilt control signal based on the tangential tilt information signal Stt2 for controlling tangential tilt. The above control signals are output to the motor driver 227. The relation between the radial tilt information signal Srt2 and the radial tilt control signal and the relation between the tangential tilt information signal Stt2 and the tangential tilt control signal are obtained experimentally in advance, and are stored in the data region of the flash memory 239.

The servo controller 233 determines whether radial tilt has been compensated for based on the signal Srt1. If radial tilt has not been compensated for enough, the servo controller 233 adjusts the radial tilt control signal. Similarly, the servo controller 233 determines whether tangential tilt has been compensated for based on the signal Stt1. If tangential tilt has not been compensated for enough, the servo controller 233 adjusts the tangential tilt control signal. The relation between the signal Srtl and the tilt angle of the object lens 260 in the radial directions and the relation between the signal Stt1 and the tilt angle of the object lens 260 in the tangential directions are obtained experimentally in advance, and are stored in the data region of the flash memory 239.

The other portion such as the configuration of the optical pickup apparatus and the optical disk apparatus is almost the same as the previous embodiment described with reference with FIGS. 24 through 42.

The optical disk apparatus according to an embodiment described with reference to FIGS. 56 through 61 realizes a processing unit with the CPU 240 and a computer program executed by the CPU 240. The optical disk apparatus can record and reproduce data in the same manner as the optical disk apparatus according to an embodiment described with reference to FIGS. 24 through 42 does.

The lens tilt detection circuit 228h, the disk tilt detection circuit 228i, the servo controller 233, and the motor driver 227 realize an adjustment unit.

In the case of the tilt sensor 2120 according to an embodiment, a fraction of the light beam emitted by the semiconductor laser LD is reflected at the surface of the ¼ wavelength plate 255a, and the remaining fraction of the light beam is reflected by the optical disk 215. The hologram element 2121 diffracts the fraction reflected by the optical disk 215 in the radial directions DirR at a diffraction efficiency depending on the incident angle in the radial directions, and also diffracts the fraction reflected by the optical disk 215 in the tangential directions DirT at a diffraction efficiency depending on the incident angle in the tangential directions. The diffracted fraction is received by the photo detecting units LDa2, LDb2, LDc2, and LDd2. If the optical disk 215 is tilted to the reference plane in the radial directions, the amount of light received by the photo detecting units LDa2 and LDb2 change depending on the tilt angle. If the optical disk 215 is tilted to the reference plane in the tangential directions, the amount of light received by the photo detecting units LDc2 and LDd2 change depending on the tilt angle. That is, the amount of light received by the photo detecting units LDa2, LDb2, LDc2, and LDd2 does contain information related to the tilt of the optical disk 215 in the radial directions and the tangential directions.

The light beam reflected by the surface of the ¼ wavelength plate 255a is diffracted by the hologram element 2121 in the radial directions DirR at a diffraction efficiency depending on the incident angle in the radial directions and in the tangential directions DirT at a diffraction efficiency depending on the incident angle in the tangential directions. The diffraction light is received by the photo detecting units LDa1, LDb1, LDc1, and LDd1. If the movable unit is tilted to the reference plane in the radial directions, the amount of light received by the photo detecting units LDa1 and LDb1 change depending on the tilt angle. If the movable unit is tilted to the reference plane in the tangential directions, the amount of light received by the photo detecting units LDc1 and LDd1 change depending on the tilt angle. That is, the amount of light received by the photo detecting units LDa1, LDb1, LDc1, and LDd1 does contain information related to the tilt of the object lens 260 in the radial directions and the tangential directions. Accordingly, it is possible to output a signal containing information related to the tilt of the object lens 260 in the radial and tangential directions with high precision.

The tilt sensor according to the present embodiment can output a signal containing information related to the tilt of the two objects in the two directions with high precision.

The pickup apparatus 223 according to the present embodiment is provided with the tilt sensor 2120, and can output a signal containing information related to the radial tilt information and the tangential tilt information of the optical disk 215. Accordingly, the optical pickup apparatus 223 according to the present embodiment exhibits the same effect as the optical pick up 223 according to the previous embodiment described with reference to FIGS. 24 through 42.

The optical pickup apparatus 223 can output a signal containing information related to the tilt of the object lens 260 in the radial directions and information related to the tilt of the object lens 260 in the tangential directions with high precision. The optical pickup apparatus 223 realizes highly accurate closed loop control of radial tilt and tangential tilt.

The optical disk apparatus 220 according to the present embodiment can compensate for wave front aberration caused by media tilt before starting the recording and reproducing of data with high precision. Accordingly, the optical disk apparatus 220 according to the present embodiment can realize the same effect as the optical disk apparatus 220 according to the embodiments described with reference to FIGS. 24 through 44.

The optical pickup apparatus 223 can determine whether radial tilt and tangential tilt have been compensated for based on the signal containing information related to the tilt of the object lens 260 in the radial directions and information related to the tilt of the object lens 260 in the tangential directions. If the compensation for the radial tilt is not enough, the optical pickup apparatus 223 adjusts the radial tilt control signal, and if the compensation for the tangential tilt is not enough, the optical pickup apparatus 223 adjusts the tangential tilt control signal. According to the above arrangements, even if the relation between the radial tilt information signal Srt2 and the radial tilt control signal and the relation between the tangential tilt information signal Stt2 and the tangential tilt control signal change over time or due to temperature change, the optical disk apparatus 223 can adjust radial tilt and tangential tilt with high precision.

An exemplary embodiment has been described in which the hologram element 2121 having a diffraction grating of which a grating direction is perpendicular to the radial directions DirR and a diffraction grating of which a grating direction is perpendicular to the tangential directions DirT formed on the same surface. The present invention is not limited to such an embodiment. The hologram element 2121 may be replaced with a hologram element in which a diffraction grating of which direction is perpendicular to the radial directions DirR is formed, and a hologram element in which a diffraction grating of which direction is perpendicular to the tangential directions DirT is formed thereon.

An exemplary embodiment has been described in which the hologram element 2123 having a diffraction grating of which a grating direction is perpendicular to the radial directions DirR and a diffraction grating of which a grating direction is perpendicular to the tangential directions DirT formed on the same surface. The present invention is not limited to such an embodiment. The hologram element 2123 may be replaced with a hologram element in which a diffraction grating of which direction is perpendicular to the radial directions DirR is formed, and a hologram element in which a diffraction grating of which direction is perpendicular to the tangential directions DirT is formed thereon.

An exemplary embodiment has been described in which the hologram element 2121 and the hologram element 2123 are laminated, but the present invention is not limited to such an embodiment. The hologram element 2121 and the hologram element 2123 may be disposed separately.

A convergence lens may be disposed on the optical path between the hologram element 2123 and the photo detector LD. The photo detecting units can be reduced in size, and the tilt sensor can be made even more compact.

A polarization diffraction element may be disposed on the optical path between the hologram element 2123 and the photo detector PD. The tilt sensor can be made even more compact.

According to another embodiment, a LD control circuit may be provided in the servo controller 233 for controlling the driving signal of the semiconductor laser LD so that at least one of the output signal of the adder Rb1, the output signal of the above adder Tb1, the output signal of the above adder Rb2, and the output signal of the adder Tb2 becomes substantially equal. According to the arrangement, even if the reflection index of the optical disk 215 changes, the output signal of the tilt sensor 2120 can be maintained almost at the same level.

Figure 62:
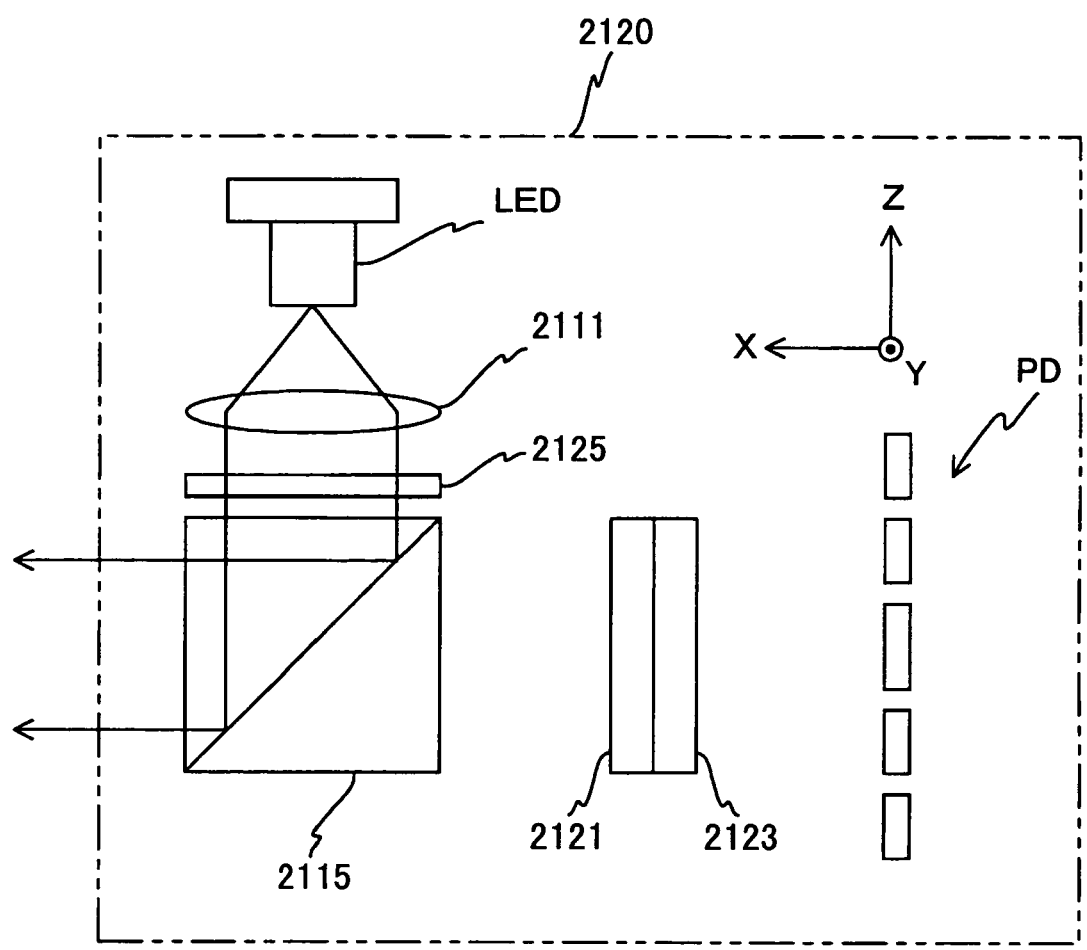
FIG. 62 is a schematic diagram for explaining a tilt sensor using an LED as a sensor light source according to an embodiment.

According to another embodiment, the semiconductor laser LD may be replaced with a light emitting diode LED as shown in FIG. 62. In such an embodiment, a polarization filter that transmits only P-polarized light beam is disposed on the optical path between the coupling lens 2111 and the beam splitter 2115.

An exemplary embodiment has been described in which the hologram elements are used as diffraction units, but the present invention is not limited to such an embodiment.

An exemplary embodiment has been described in which the ¼ wavelength plate 255a on which a reflective film is formed, but the present invention is not limited to such an embodiment. A half mirror independent of the ¼ wavelength plate 255a may be disposed separately, instead of the reflective film.

An exemplary embodiment has been described in which the radial tilt coil is provided for adjusting the radial tilt. The present invention is not limited to such an embodiment. If an optical element that gives optical phase shift to the light beam by means of electro-optic crystal or liquid crystal, for example, is provided on the optical path between the light source unit 251 and the object lens, the wave front aberration caused by radial tilt can be canceled. In such a case, the motor driver 227 applies a driving voltage to the optical element based on the radial tilt control signal.

An exemplary embodiment has been described in which the tangential tilt coil is provided for adjusting the tangential tilt. The present invention is not limited to such an embodiment. If an optical element that gives optical phase shift to the light beam by means of electro-optic crystal or liquid crystal, for example, is provided on the optical path between the light source unit 251 and the object lens, the wave front aberration caused by tangential tilt can be canceled. In such a case, the motor driver 227 applies a driving voltage to the optical element based on the tangential tilt control signal.

An exemplary embodiment has been described in which the lens holder 281 is supported by linear springs extending from the lens holder 281 to the +Y direction, and by linear springs extending from the lens holder 281 to the −Y direction. The present invention is not limited to such an embodiment. The lens holder 281 may be supported by linear springs extending at least one of the above directions.

An exemplary embodiment has been described in which the depth and the pitch of the grating are determined so that the Q-factor of the diffraction grating becomes $2 \leq Q < 10$. The present invention is not limited to such an embodiment. If the tilt sensor is designed so that the incident angle of the light beam changes in a range around the Bragg's angle, the Q-factor of the diffraction grating may exceed 10 to some extent.

An exemplary embodiment has been described in which the optical disk apparatus can record and reproduce information. The present invention is not limited to such an embodiment. The present invention is applicable to an optical disk apparatus that at least can reproduce information stored in an optical disk.

An exemplary embodiment has been described in which the optical disk 215 is a recording medium that supports laser light of 660 nm wavelength. The present invention is not limited to such an embodiment. The optical disk 215 may be a recording medium that supports laser light of 405 nm wavelength or 780 nm wavelength, for example.

An exemplary embodiment has been described in which the optical pickup apparatus is provided with only one semiconductor laser as a light source. The present invention is not limited to such an embodiment. The optical pickup apparatus may be provided with multiple semiconductor laser diodes that emit light beams of different wavelength. The optical pickup apparatus may include at lease one of a semiconductor laser that emits 405 nm wavelength light beam, a semiconductor laser that emits 660 nm wavelength light beam, and a semiconductor laser that emits 780 nm wavelength light beam. That is, the optical disk apparatus may support multiple kinds of optical disks in compliance with different standards.

An exemplary embodiment has been described in which the interface is in compliance with the ATAPI standard. According to another embodiment, the interface may be in compliance with ATA (at Attachment), SCSI (Small Computer System Interface), USB (Universal Serial Bus) 1.0, USB 2.0, IEEE 1394, IEEE 802.3, Serial ATA, or Serial ATAPI.

A tilt sensor according to an embodiment of the present invention can be used for detecting tilt of an object other than an optical disk. The tilt sensor according to an embodiment can be applied to a joystick, for example, of which tilt changes greatly. In such a case, if the Q-factor of a diffraction grating is reduced, the tilt sensor can detect the tilt in a wider range. The tilt sensor according to an embodiment can be used for detecting tilt of a wafer set in a stepper, for example. In such a case, it is possible to increase the detection sensitivity by increasing the Q-factor of the diffraction grating. The tilt sensor can detect even small angle.

Figure 63:
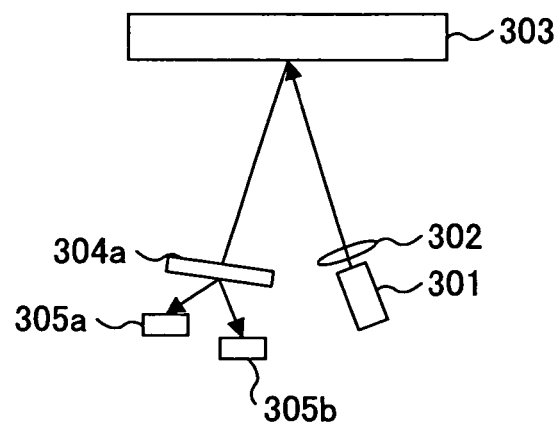
FIG. 63 is a schematic diagram showing the optical system of a tilt sensor according to an embodiment of the present invention.

FIG. 63 is a schematic diagram showing an optical system of a tilt sensor according to yet another embodiment of the present invention. As shown in FIG. 63, a light beam emitted by a light source 303 is made substantially parallel by a coupling lens 302, and is reflected by an object 303. Then, the light beam is diffracted by a diffraction element 304a that is provided with a diffraction grating that diffracts the light beam at a diffraction efficiency in accordance with the incident angle of the light beam. The light beam diffracted by the diffraction element 304a is received by photo detecting units 305a and 305b, and is converted into photo-electric signals. The light source is preferably a semiconductor laser.

It is not necessary to dispose the coupling lens 302. However, the light beam that hits the diffraction element 304a is preferably made parallel. The light beam emitted by the light source 301 is preferably made substantially parallel so that the distance between the object 303 and the tilt sensor can be extended or shortened freely.

Figure 64:
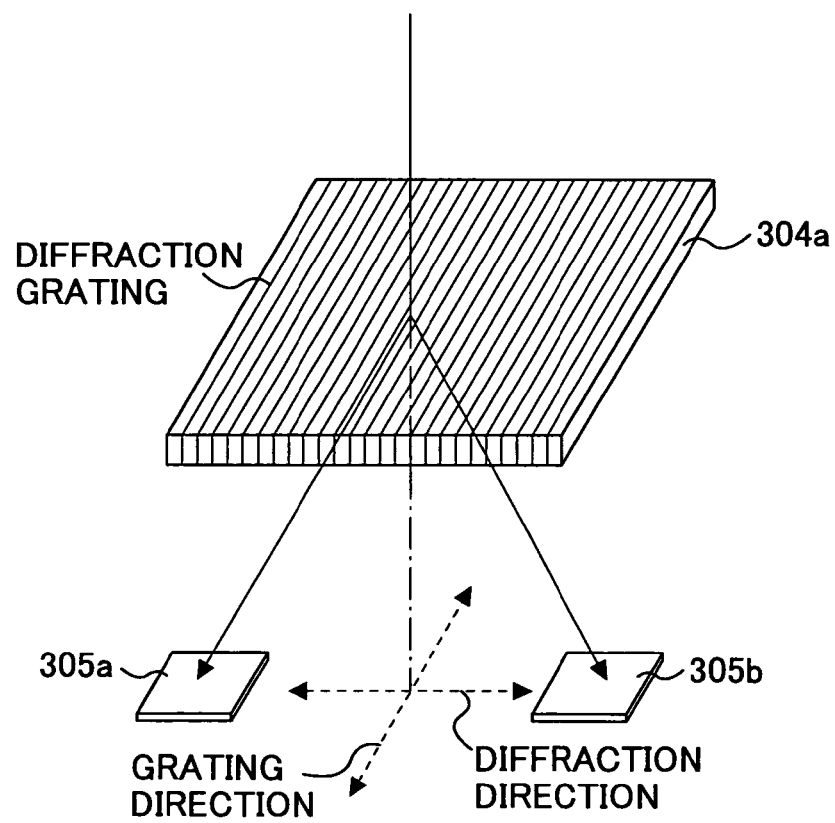
FIG. 64 is a schematic diagram showing a part of the optical system of FIG. 63.
Figure 65:
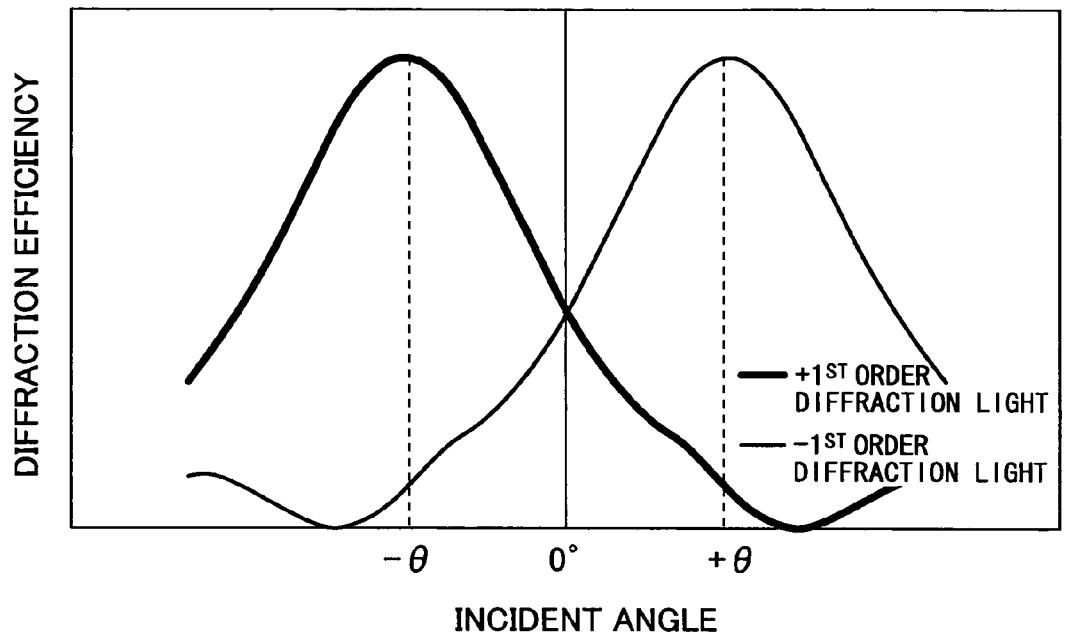
FIG. 65 is a graph showing the change in diffraction efficiency of the +1st order diffraction light and the −1st order diffraction light diffracted by a diffraction element.

The principle of determining the tilt of the object 303 is described below in detail. FIG. 64 is a schematic diagram showing a part of the optical system shown in FIG. 63. If the incident light beam is tilted in directions perpendicular to the grating directions of the diffraction grating, the diffraction efficiency of the of the +1st order diffraction light and the −1st order diffraction light of the diffraction grating 304a as shown in FIG. 65. In FIG. 65, an incident angle 0 degree corresponds to the light beam hitting the diffraction element 304a perpendicularly. The position and the attitude of the diffraction element 304a and the light source 301 are adjusted so that, when the object 303 is not tilted, the light beam reflected by the object 303 hits the diffraction element 304a perpendicularly.

Figure 66:
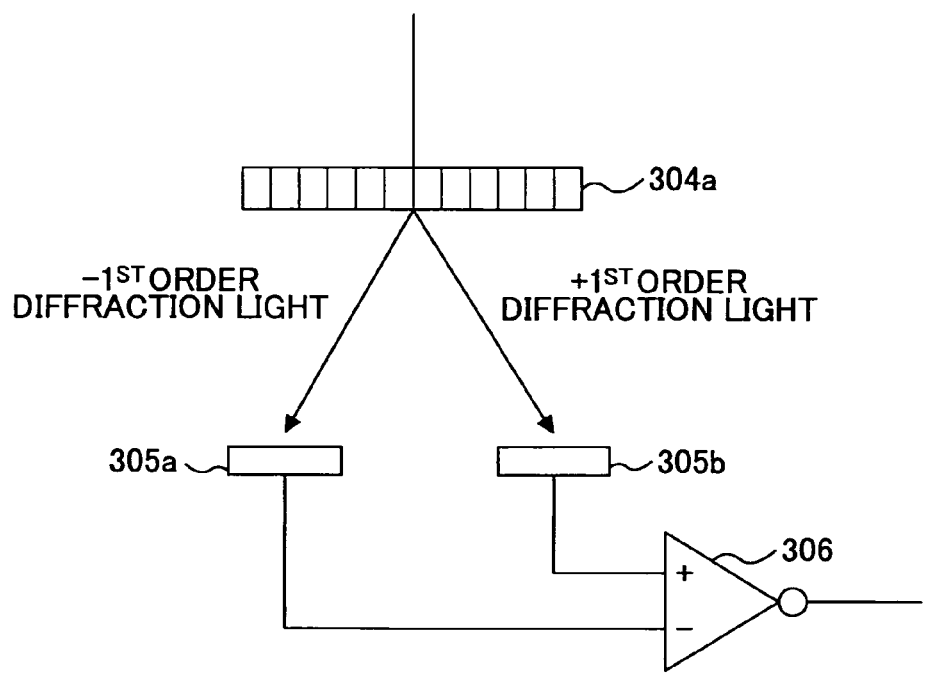
FIG. 66 is a schematic diagram for explaining a differential signal generation unit that generates differential signal of photo-electric signals output by photo detecting units.

According to the above arrangement, if the object 303 is not tilted, the diffraction efficiency of the +1st order diffraction light and the diffraction efficiency of the −1st order diffraction light are substantially equal, and the amount of diffraction light received by the photo detecting unit 305a and the amount of diffraction light received by the photo detecting unit 305b. However, if the object 303 is tilted, the diffraction efficiency of the +1st order diffraction light and the diffraction efficiency of the −1st order diffraction light become different, which results in difference between the amount of diffraction light received by the photo detecting unit 305a and the amount of diffraction light received by the photo detecting unit 305b. A differential signal generator 306 (shown in FIG. 66) can generate a signal containing information related to the tilt of the object 303 (shown in FIG. 67) by generating a differential signal between the photo-electric signal output by the photo detecting unit 305a and the photo-electric signal output by the photo detecting unit 305b.

Figure 67:
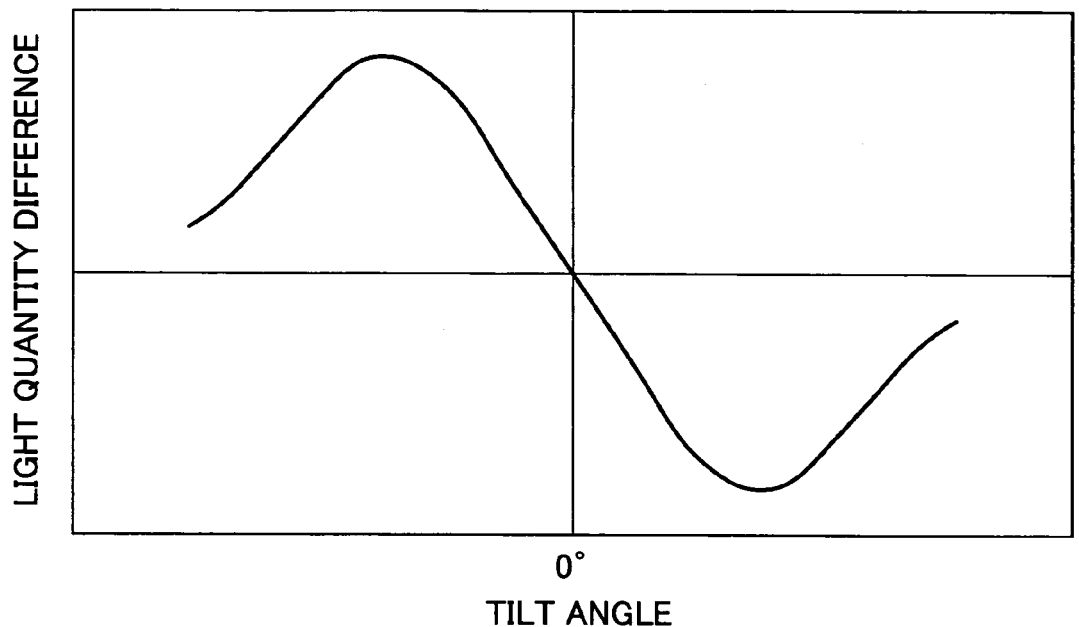
FIG. 67 is a graph showing a signal containing information related to the tilt of an object output by the differential signal generation unit according to an embodiment.

As shown in FIG. 67, the signal containing information related to the tilt of the object 303 changes substantially linearly in a range of tilt between a tilt corresponding to the maximum value of light amount difference and a tilt corresponding to the minimum value of light amount difference. The tilt corresponding to the maximum value of light amount difference and the tilt corresponding to the minimum value of light amount difference substantially match the incident angles ±θ, respectively, which are the Bragg's angle satisfying the following equation:

$$\sin \theta = \lambda/2\Lambda,$$

where λ is the wavelength of the light source, and Λ is the pitch of the diffraction grating. Accordingly, the tilt sensor is preferably set so that the range of tilt to be measured falls in the range between ±θ.

Figure 68:
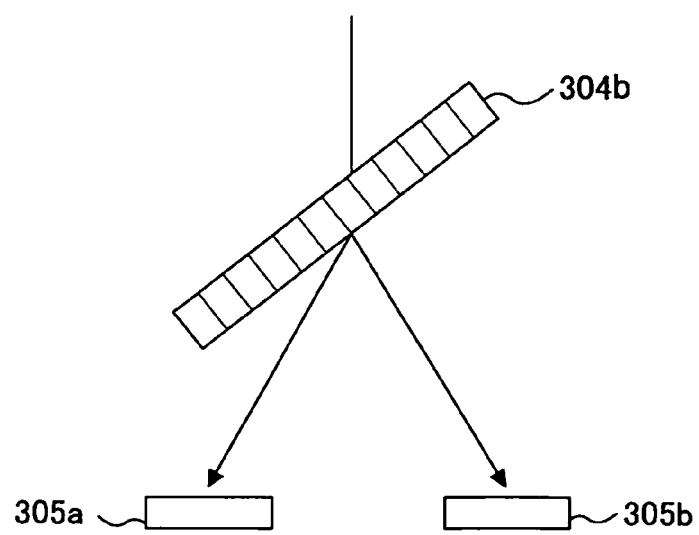
FIG. 68 is a schematic diagram showing a diffraction element tilted to a reflective light beam.
Figure 69:
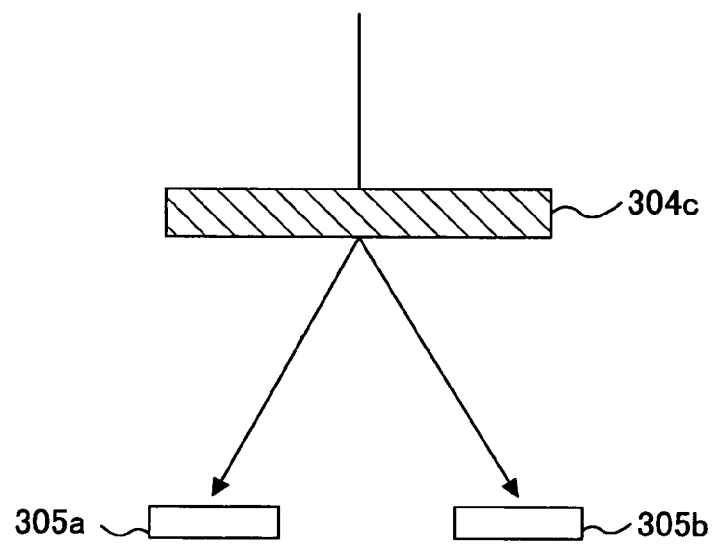
FIG. 69 is a schematic diagram showing an exemplary configuration of diffraction grating of a diffraction element.
Figure 70:
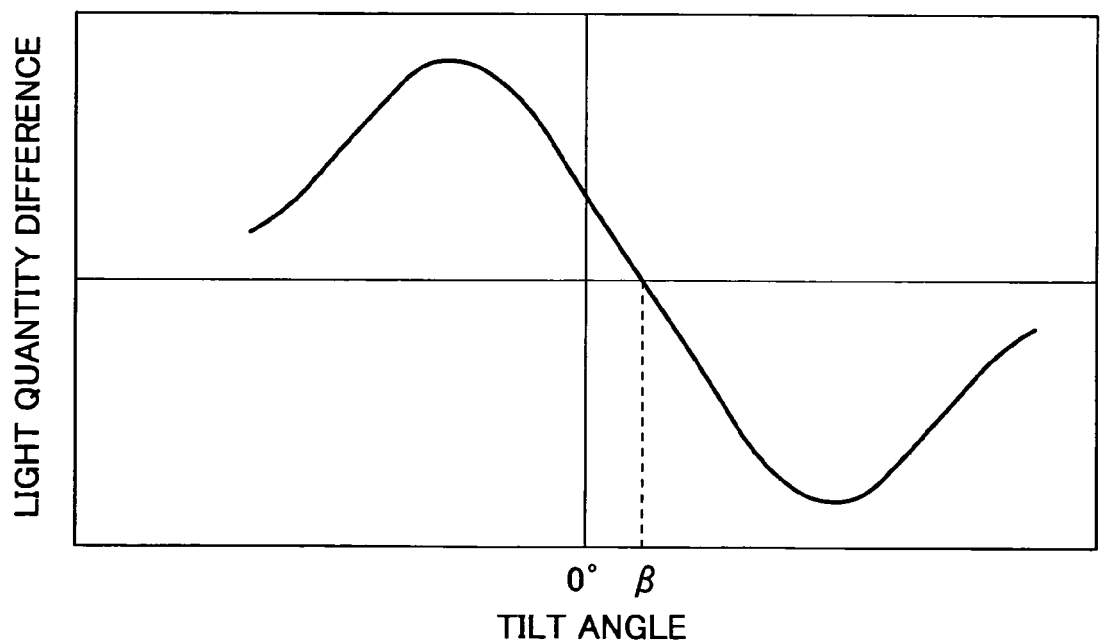
FIG. 70 is a graph showing a signal containing information related to the tilt of an object that varies in a range of incidental angle ±θ with a center angle β based on the diffraction element shown in FIGS. 68 and 69.

Occasionally, the center of the range of tilt to be measured by the tilt sensor may not be 0 degree. In such a case, the diffraction element 304b may be tilted to the light beam reflected by the object as shown in FIG. 68, or a tilted diffraction grating may be formed on a diffraction element 304c as shown in FIG. 69. According to the above arrangements, the tilt sensor can output a substantially linear signal containing information related to the tilt of an object in a range between ±θ degrees centered by a center angle β.

Figure 71:
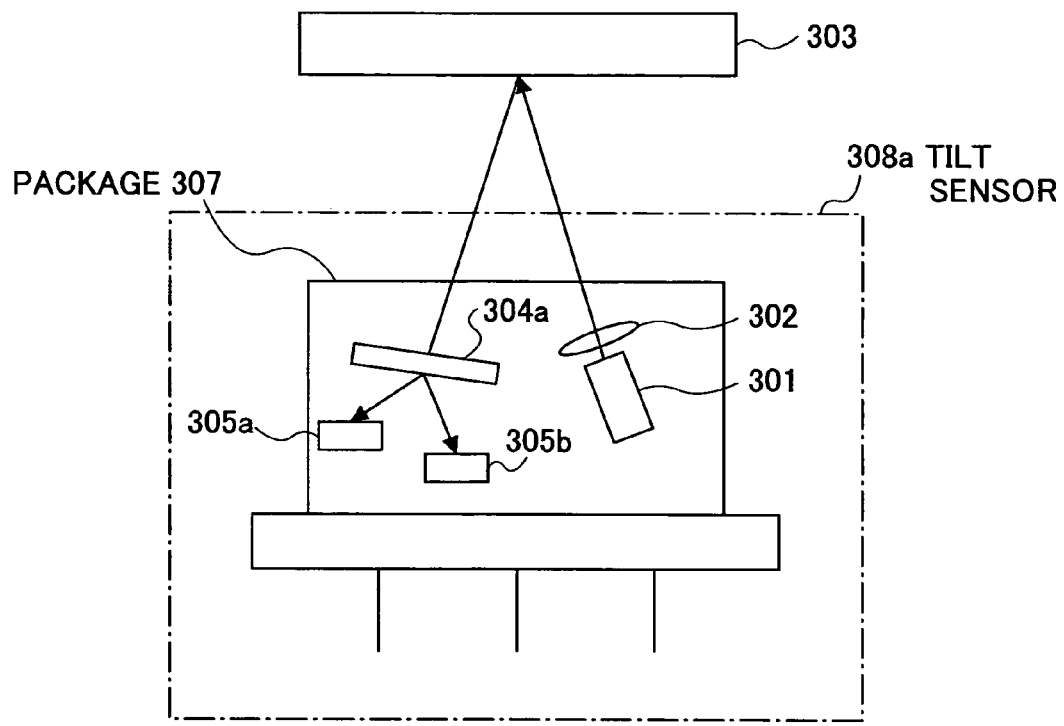
FIG. 71 is a schematic diagram showing a tilt sensor of which optical components are stored in a package.

An exemplary embodiment has been described in which a light source and a diffraction element, for example, are disposed separately in an appropriate manner. As shown in FIG. 71, the optical components may be arranged in a package 307 in advance as a completed tilt sensor 308a. The tilt sensor 308a becomes mass-producible.

Figure 72:
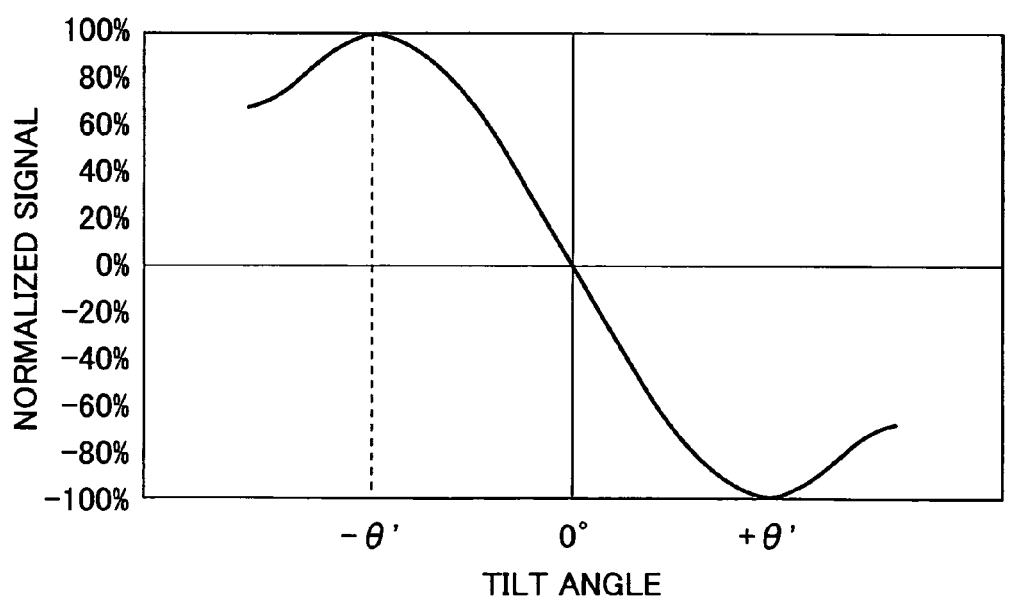
FIG. 72 is a graph showing a differential signal normalized by a summation signal according to an embodiment.

As described above, the signal (differential signal) may be generated based on the difference in the amount of received light by the photo detecting units 305a and 305b. The differential signal may be normalized by the total amount of received light by all photo detecting units. According to the arrangement, the normalized signal does not depend on the reflective index of the object and the light amount emitted by the light source (see FIG. 72). Angles ±θ' shown in FIG. 72 corresponds to the Bragg's angles ±θ shown in FIG. 65. The inventors found that, if the angles ±θ' are within 8 degree, that is, $$\Lambda \geq \frac{\lambda}{2 \sin 8°}$$

the detection sensitivity becomes 20%/degree, which is practically sufficient.

A detailed description of the diffraction grating formed on the diffraction element is given below. As described in the above reference, Koyama, J. and Nishihara, H., "Light Wave Electronics", Colona, 1978, the diffraction gratings are categorized into plane holograms and volume holograms. The plane holograms and the volume holograms can be identified based on the following parameter, Q-factor:

$$Q = \frac{2\pi\lambda d}{n\Lambda^2}$$

Figure 73:
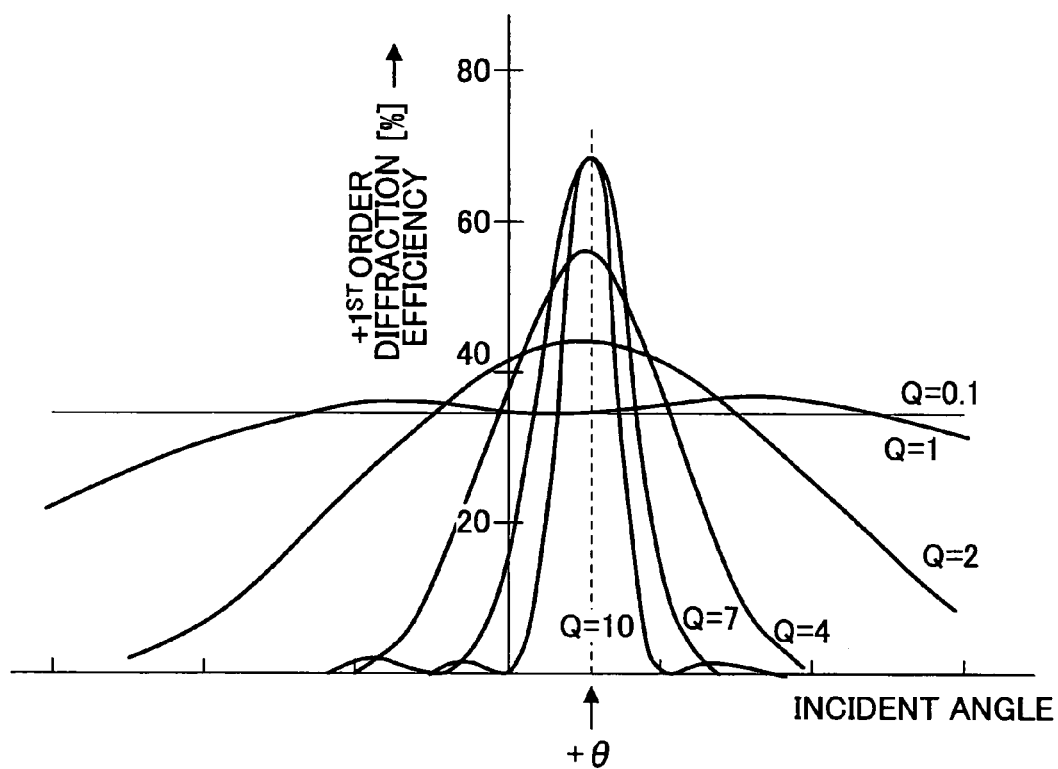
FIG. 73 is a graph showing the diffraction efficiency as a function of incident angle, which indicates a characteristics of a plate hologram and a volume hologram.

One of the differences in characteristic of the plane holograms and the volume holograms is whether the diffraction efficiency depends on the incident angle of incident light beam. For example, as shown in FIG. 73, the diffraction efficiency of plane holograms is substantially constant irrespective to the incident angle of incident light beam (the graph indicated as Q=0.1). If Q-factor is greater than 2, the diffraction efficiency depends on the incident angle, which is a characteristic of volume holograms.

If a hologram shows such a characteristic of volume hologram, the diffraction efficiency of a volume hologram becomes maximum at a specific incident angle θ (Bragg's angle). The diffraction grating shown in FIG. 65 shows a similar characteristic. Additionally, FIG. 73 shows that, if Q=10, the diffraction efficiency becomes 0 at the incident angle θ=0 degree. In the case where such a diffraction grating is used for the tilt sensor as described above, if the object is not tilted, the amount of received diffraction light becomes 0. Even if the object is a little tilted, the amount of received diffraction light may not be great enough compared with noise.

Accordingly, the Q-factor of a volume hologram is preferably 9 or less. It is preferable that the depth of diffraction grating satisfies:

$$\frac{n\Lambda^2}{\pi\lambda} \leq d \leq 4.5 \times \frac{n\Lambda^2}{\pi\lambda}$$

Figure 74:
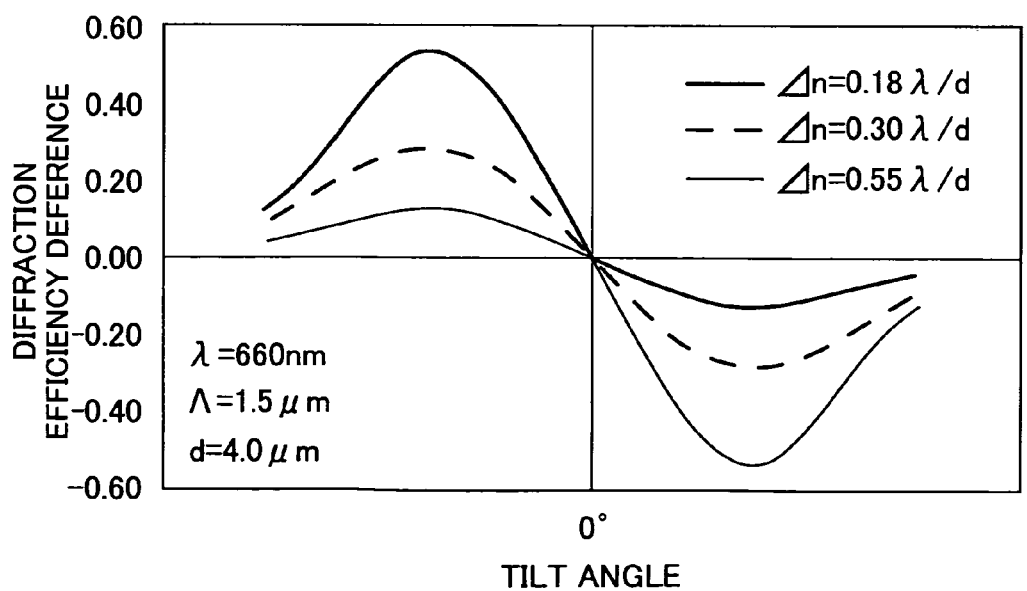
FIG. 74 is a graph showing the dependency of diffraction efficiency on incident angle of an exemplary diffraction grating.
Figure 75:
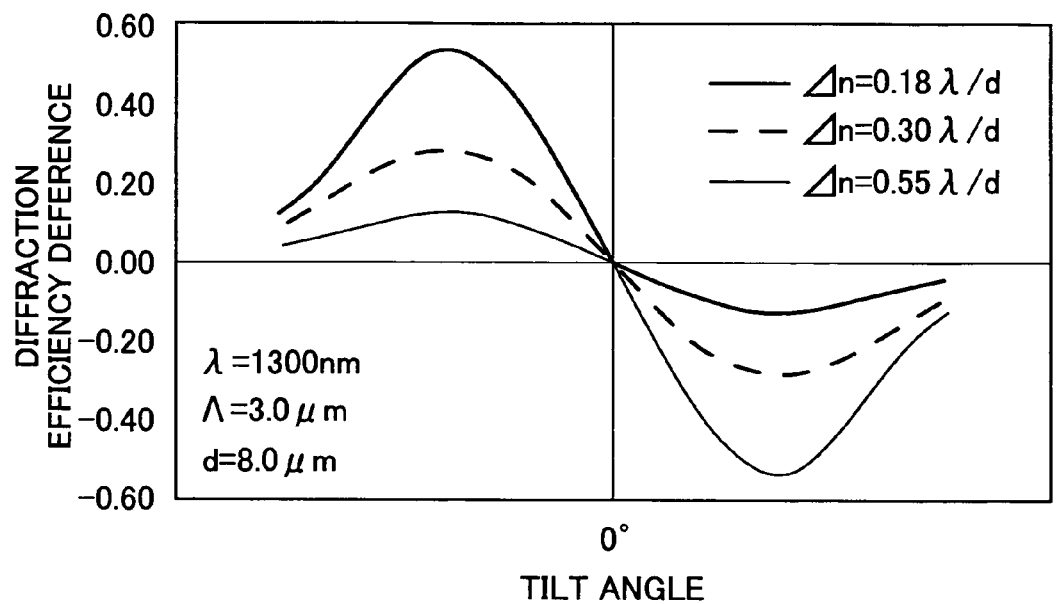
FIG. 75 is a graph showing the dependency of diffraction efficiency on incident angle of another exemplary diffraction grating.
Figure 76:
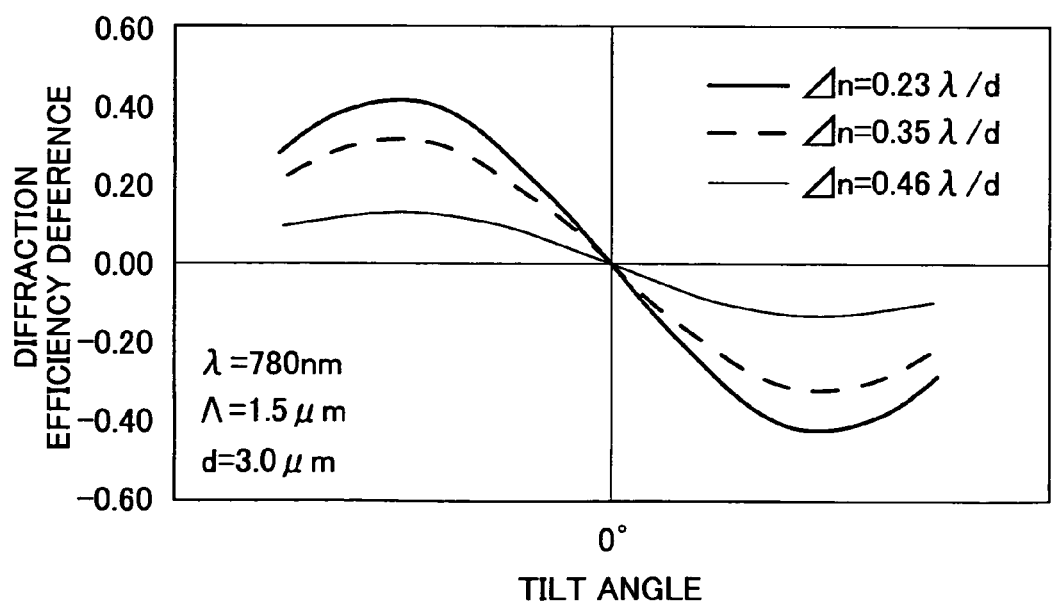
FIG. 76 is a graph showing the dependency of diffraction efficiency on incident angle of yet another exemplary diffraction grating.

Graphs in FIGS. 74 through 76 show the difference in diffraction efficiency as a function of incident angle designed as examples of the above embodiment. A diffraction grating is made of material forming the diffraction grating and material filling into the grating. The refraction index of the material forming the diffraction grating is denoted by n0, and the refraction index of the material filling the grating is denoted by n1. FIGS. 72 through 76 show that, if the difference between the refraction index n0 and the refraction index n1 satisfies:

$$\frac{\lambda}{4d} \le \Delta n \le \frac{\lambda}{d}$$

, the detection sensitivity becomes preferable.

Figure 77:
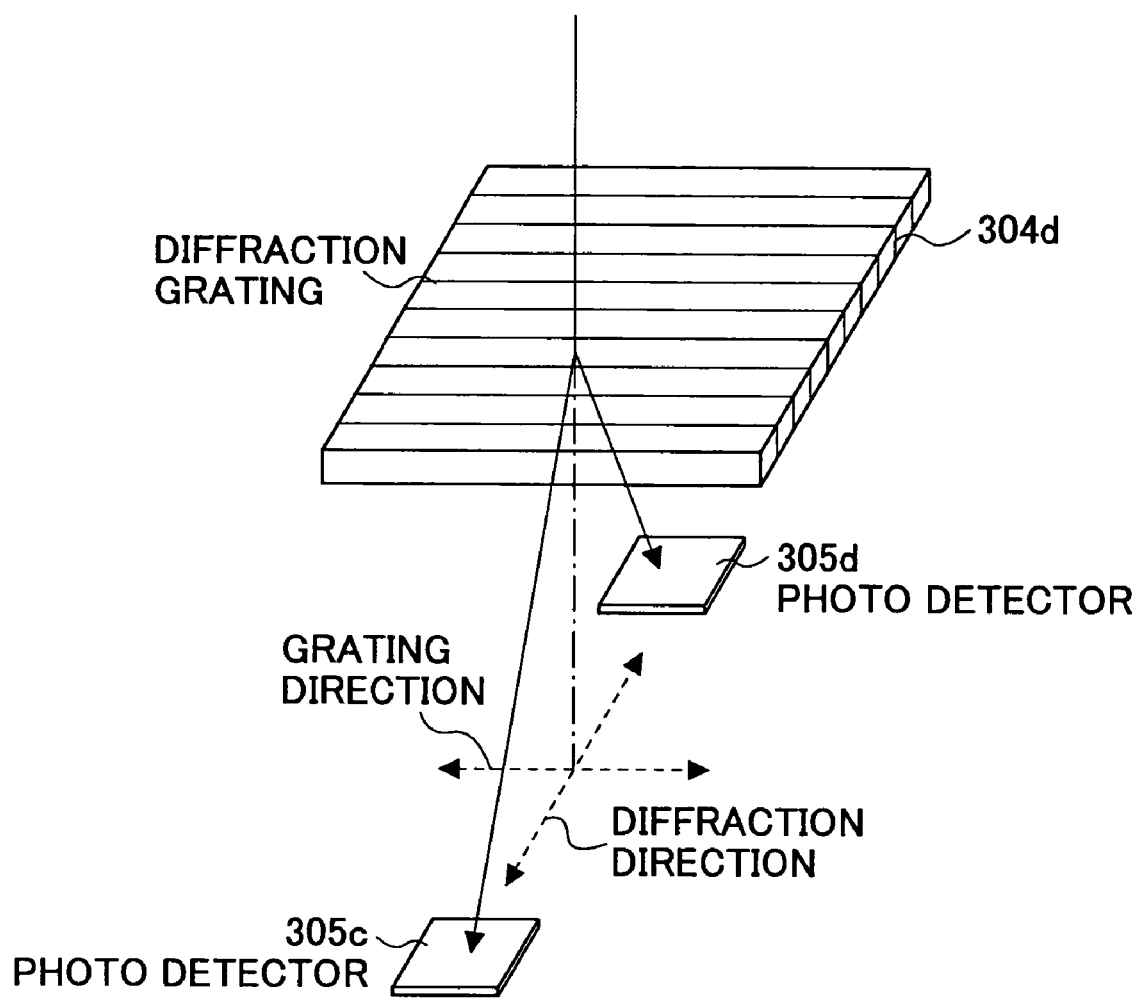
FIG. 77 is a schematic diagram showing a part of the optical system perpendicular to those shown in FIG. 64.

FIG. 77 is a schematic diagram showing an exemplary embodiment in which a diffraction element 304*d* having a diffraction grating of which directions is perpendicular to those of the diffraction element shown in FIG. 64. The +1st order diffraction light and the −1st order diffraction light are detected by photo detecting units 305*c* and 305*d* in the same manner as FIG. 64. That is, information related to the tilt of an object relative to specific directions can be detected with high sensitivity by setting the directions of diffraction grating formed in the diffraction element at directions perpendicular to the specific directions. Accordingly, if two diffraction gratings having appropriately different directions are formed in a diffraction element, the tilt sensor can detect the tilt of an object relative to two directions.

Figure 78:
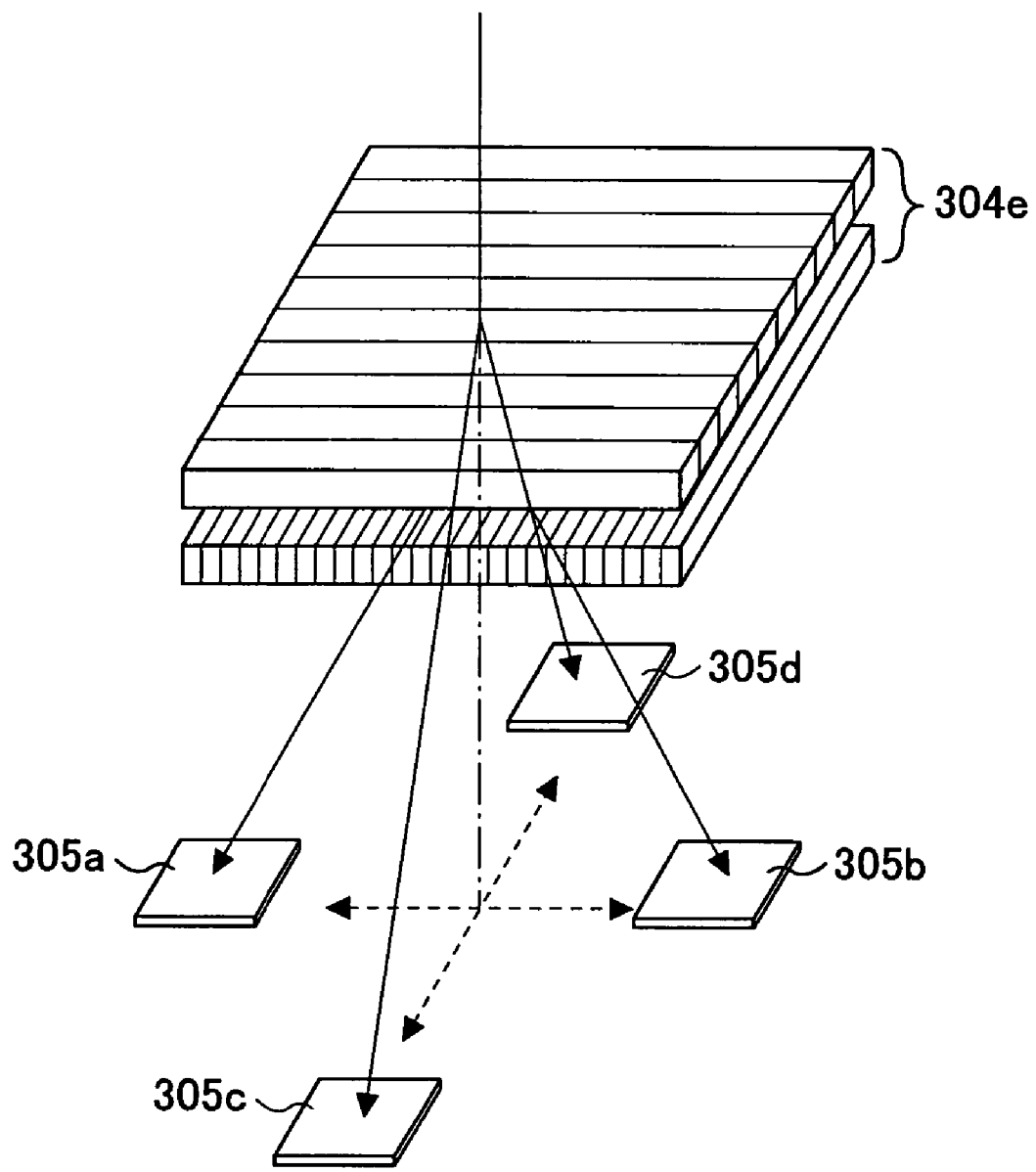
FIG. 78 is a schematic diagram showing two diffraction gratings of which directions are perpendicular to each other according to an embodiment.
Figure 79:
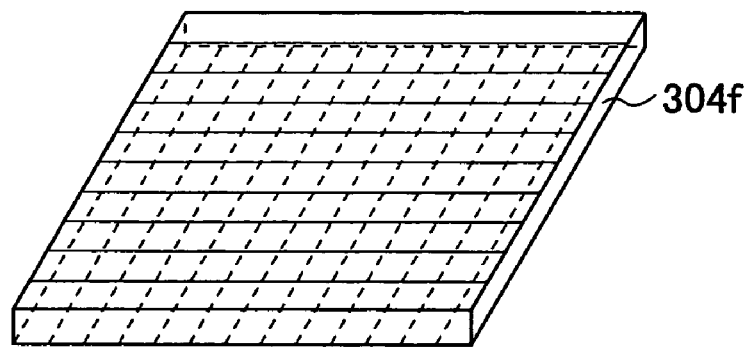
FIG. 79 is a schematic diagram showing a diffraction element in which two diffraction gratings are formed on the top face and the bottom face of a single substrate according to an embodiment.

FIG. 78 is a schematic diagram showing an exemplary embodiment in which two diffraction gratings of which directions are perpendicular to each other are formed in a diffraction element 304*e*. The tilt sensor having the diffraction element 304*e* can detect the tilt of an object relative to any directions with high sensitivity. The two diffraction gratings may be formed on different substrates, and the substrates may be stacked. According to another embodiment, the two diffraction gratings may be formed on both sides of a substrate as shown in FIG. 79. In such a case, a diffraction element 304*f* can be made thinner than the diffraction element 304*e* in which two substrates are stacked.

Figure 80:
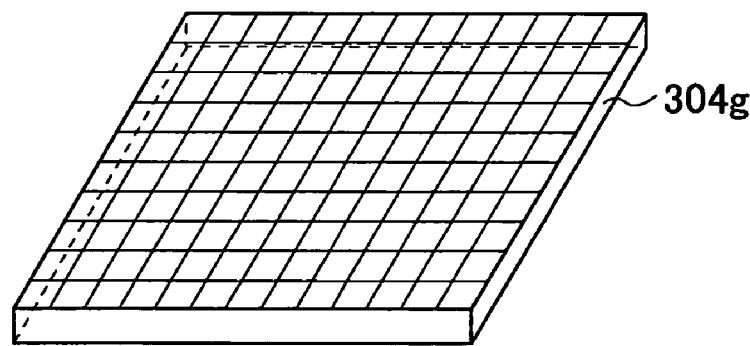
FIG. 80 is a schematic diagram showing a diffraction element in which two diffraction gratings are formed on the same face of a substrate according to an embodiment.

According to another embodiment, two diffraction gratings may be formed on one surface of a substrate as shown in FIG. 80. The two diffraction gratings can be formed simultaneously in a single exposure process and a single etching process of the fabrication process of semiconductor. As a result, the fabrication process of the diffractions element can be made simple and of low cost.

Figure 81:
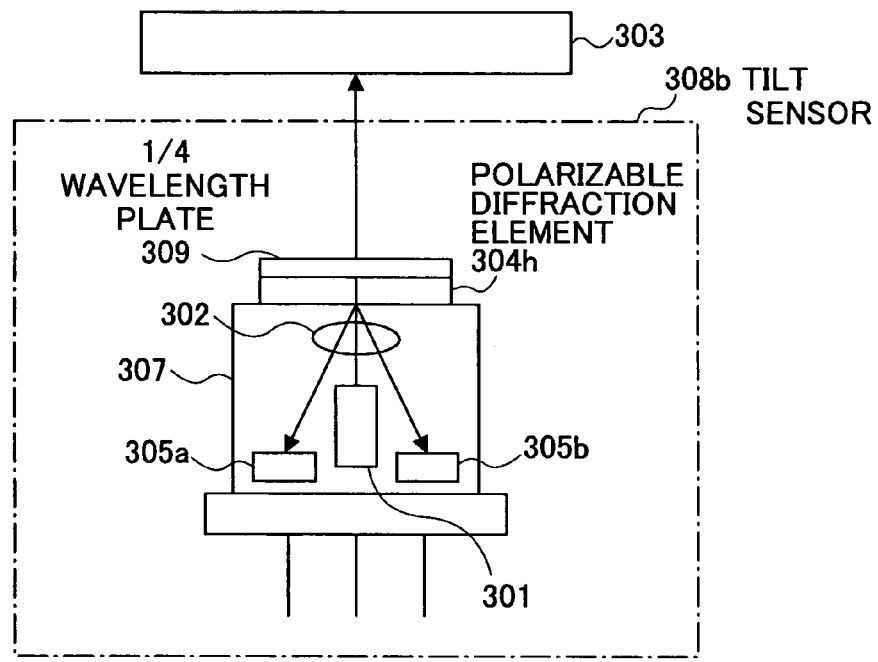
FIG. 81 is a schematic diagram showing an optical system of a tilt sensor according to another embodiment.

FIG. 81 is a schematic diagram showing the optical system of a tilt sensor according to another embodiment of the present invention. A tilt sensor 308*b* includes a diffraction element 304*h* of which diffraction efficiency depends on the incident angle of incident light beam, wherein the diffraction element 304*h* polarizes the incident light beam, and further includes a ¼ wavelength plate 309 disposed on the diffraction element 304*h* at the side of the object 303. A light source 301 emits a linearly polarized light beam. The light beam emitted by the light source 301 is made substantially parallel by a coupling lens 302, and transmits through the diffraction element 304*h*. The transmitting light beam is made circular polarized by the ¼ wavelength plate 309, and reflected by the object 303. The reflected light beam is made circular polarized in an opposite direction, and is made linear polarized by the ¼ wavelength plate 309 in perpendicular directions to the directions in which the light beam transmitting to the object 303 is polarized. The reflective light beam is diffracted by the diffraction element 304*h*. As described above, the diffraction element 304*h* is provided with a diffraction grating that diffracts the reflective light beam at a diffraction efficiency that is determined by the incident angle of the reflective light beam. The reflective light beam diffracted by the diffraction element 304*h* is received by the photo detecting units 305*a* and 305*b*, and converted into a photoelectric signal of which intensity is determined by the amount of received light. The light source 301 may be a semiconductor laser.

Since the diffraction element 304*h* prevents the light beam traveling to the object from being diffracted excessively by diffracting the light beam traveling to the object. As a result, the light beam emitted by the light source 301 can be used efficiently. Furthermore, if the light beam traveling to the object 3 is diffracted, the diffracted light is reflected by the object 303 and hits the photo detecting units 305*a* and 305*b*, and degrades the accuracy of detection. The tilt sensor 308*b* can avoid the degrading of the accuracy of detection by preventing the light beam traveling to the object 303 from being diffracted. In addition, the tilt sensor 308*b* shown in FIG. 81 can be made more compact than the tilt sensor shown in FIG. 71. Since the optical components of the tilt sensor 308*b* share the same optical axis, the optical components can be assembled easily.

Figure 82:
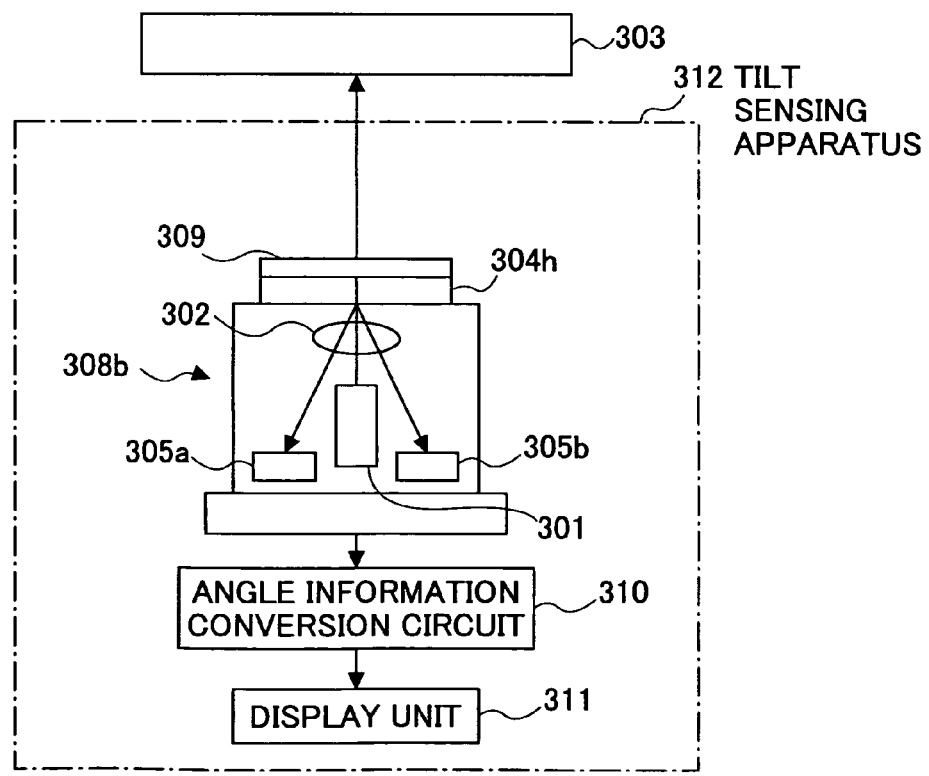
FIG. 82 is a schematic diagram showing a tilt sensing apparatus according to another embodiment.

FIG. 82 is a schematic diagram showing a tilt sensing apparatus 312 according to an embodiment of the present invention. The tilt sensing apparatus 312 includes the tilt sensor 308*b* shown in FIG. 81. According to another embodiment, the tilt sensing apparatus may include the tilt sensor 308*a*.

The tilt sensing apparatus 312 also includes an angle information conversion circuit 310 and a display unit 311. The angle information conversion circuit 310 converts information related to the tilt output by the tilt sensor 308*b* into angle information. Although the tilt sensing apparatus 312 is compact and inexpensive, the tilt sensing apparatus 312 can measure the tilt of an object with high precision. If the tilt sensing apparatus 312 does not need to display the angle information, the display unit may not be provided.

Figure 83:
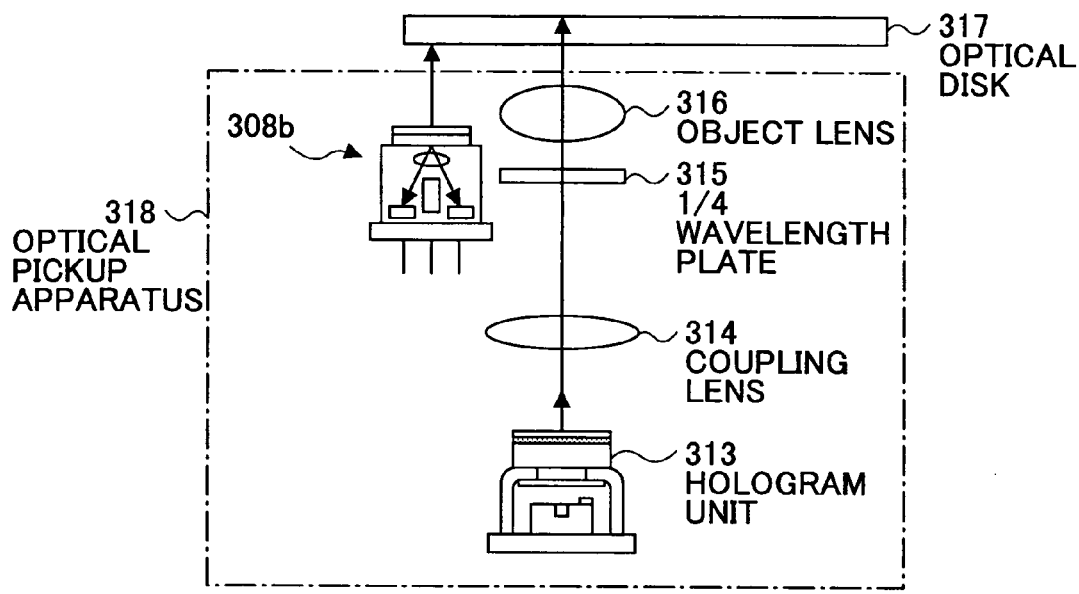
FIG. 83 is a schematic diagram showing an optical pickup apparatus according another embodiment.

FIG. 83 is a schematic diagram showing an optical pickup apparatus 318 according to an embodiment of the present invention. The optical pickup apparatus 318 includes a hologram unit 313 in which a light source a photo detector are disposed in a can. Such a hologram unit 313 is often used recently. A polarizing diffraction element (hologram) is used for diffracting an incident light beam. A light beam emitted by a semiconductor laser built in the hologram unit 313 is linearly diffracted, and transmits the polarizing diffraction element disposed on the hologram unit 313 without being diffracted. The light beam transmitted through the polarizing diffraction element enters the coupling lens 314, and is made substantially parallel coupled to the following optical system. The light beam is made circular polarized by the ¼ wavelength plate 315, is converged by the object lens 316 into a light spot on the recording surface of an optical disk 317.

The light beam reflected by the recording surface of the optical disk 317 is circular polarized in an opposite direction to the direction in which the light beam has been circular polarized before being reflected. The reflected light beam transmits through the object lens 316 and the ¼ wavelength plate 315, and is made linearly polarized in perpendicular directions to the directions in which the light beam traveling to the object is linearly polarized. The reflected light beam is converged by the coupling lens 314, and is diffracted by the diffraction element disposed on the hologram unit 313. The diffracted light beam hits the photo detector built in the hologram unit 313. The photo detector outputs a photo-electric signal containing wobble signal information, reproduced data signal information, focus error signal information, and tracking error signal information, for example.

The optical pickup apparatus 318 includes the tilt sensor 308*b*, and detects information related to the tilt of the optical disk 317 using the tilt sensor 308b. The tilt sensor 308a may be used instead of the tilt sensor 308b. Although the optical components are packaged as an unit of the tilt sensor 308b, the optical components may be disposed in the optical pickup apparatus 318 separately, and the light beam emitted by the light source built in the hologram unit 313 may be used as a light beam for the tilt sensor 308b. The optical pickup apparatus 318 can detects information related to the tilt of the object lens 316 if the above tilt sensor is provided.

The optical pickup apparatus 318 can acquire a signal containing information needed for controlling the position of the optical pickup apparatus 318 and the object lens 316.

Figure 84:
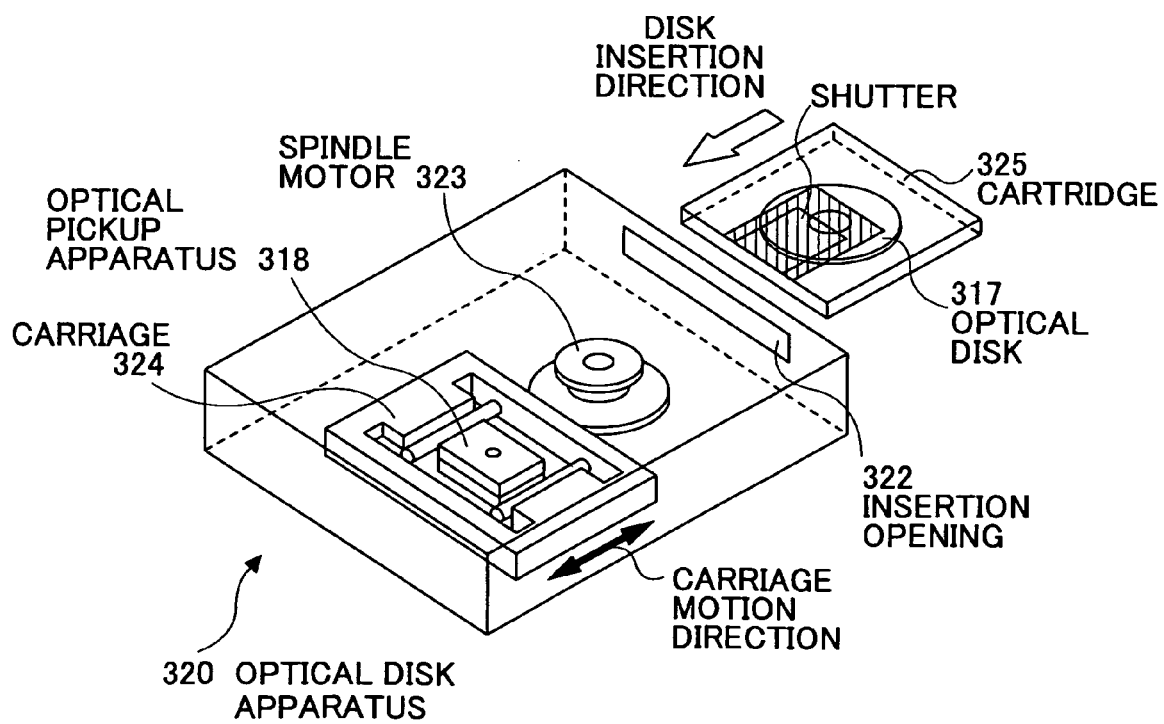
FIG. 84 is a schematic diagram showing an optical disk apparatus according to another embodiment.

FIG. 84 is a schematic diagram showing an optical disk apparatus 320 according to an embodiment of the present invention. As shown in FIG. 84, the optical disk apparatus 320 uses the optical pickup apparatus 318 activated by a carriage 324 in the radius directions of the optical disk 317, and performs at least one of the writing, reproducing, and erasing of information. The optical disk 317 is stored in a cartridge 325, which is a protective case. The optical disk 317 stored in the cartridge 325 is inserted from an insertion opening 322 in a direction indicated as "insert disk", and is rotated by a spindle motor 323. The optical pickup apparatus 318 records, reproduces, or erases information.

The optical disk apparatus 320 can appropriately use the above optical pickup apparatus and the tilt sensor. The optical disk apparatus 320 also includes an adjusting unit that adjusts the shape of a light spot formed on the recording surface based on the output signal from the tilt sensor. The optical disk apparatus 320 further includes an information processing unit that performs at least one of the recording, reproducing, and erasing of information based on the signal output by the optical pickup apparatus 318. Accordingly, the optical disk apparatus can stably access the optical disk 317 with high precision.

The present invention is not limited to these embodiments, but various variations and modifications may be made without departing from the scope of the present invention.

This patent application is based on Japanese Priority Patent Applications No. 2003-070509 filed on Mar. 14, 2003, No. 2003-292010 filed on Aug. 12, 2003, and No. 2003-340394 filed on Sep. 30, 2003, the entire contents of which are hereby incorporated by reference.

What is claimed is:

1. A tilt sensor for determining information related to a tilt of an object to a reference plane, comprising:

a diffraction element disposed at a position on an optical path of a light beam from the object, the light beam entering the diffraction element at an incident angle, the position of the diffraction element determined in accordance with a positional relation with the object, wherein the diffraction element diffracts diffraction light at a diffraction efficiency that varies in accordance with the incident angle of the light beam; and a photo detector that receives the diffraction light diffracted by said diffraction element and outputs a photoelectric signal, wherein the diffraction element has a Q-factor described by a first equation:

$Q=2\pi\lambda T/(nP^2)\geq 0.5$, wherein $\lambda$ indicates a wavelength of an incident light, T indicates a groove depth of a grooved grating of the diffraction element, n indicates a refractive index of the diffraction element, and P indicates a groove pitch of the grooved grating of the diffraction element.

2. The tilt sensor as claimed in claim 1, wherein the Q-factor of the diffraction element is further described by a second equation:

$Q\geq 5$.

3. The tilt sensor as claimed in claim 1, wherein the diffraction element is a volume hologram.

4. The tilt sensor as claimed in claim 1, wherein an order of the diffraction light received by said photo detector is that of a diffracted light of a greatest intensity.

5. The tilt sensor as claimed in claim 1, wherein said diffraction element is set so that the relation between the intensity of the diffraction light and the incident angle is substantially linear on a predetermined range of the incident angle.

* * * * *

UNITED STATES PATENT AND TRADEMARK OFFICE
CERTIFICATE OF CORRECTION

PATENT NO. : 7,577,076 B2  Page 1 of 1
APPLICATION NO. : 10/798362
DATED : August 18, 2009
INVENTOR(S) : Ogata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Seventh Day of September, 2010

David J. Kappos
*Director of the United States Patent and Trademark Office*